US009098805B2

(12) United States Patent
Ellis et al.

(10) Patent No.: US 9,098,805 B2
(45) Date of Patent: Aug. 4, 2015

(54) PREDICTION PROCESSING SYSTEM AND METHOD OF USE AND METHOD OF DOING BUSINESS

(71) Applicant: Koodbee, LLC, West Orange, NJ (US)

(72) Inventors: Leonard H. Ellis, New York, NY (US); Andrew D. Ellis, West Orange, NJ (US); Mans K. Angantyr, Brooklyn, NY (US)

(73) Assignee: Koodbee, LLC, West Orange, NJ (US)

( * ) Notice: Subject to any disclaimer, the term of this patent is extended or adjusted under 35 U.S.C. 154(b) by 196 days.

(21) Appl. No.: 14/018,828

(22) Filed: Sep. 5, 2013

(65) Prior Publication Data

US 2014/0089233 A1  Mar. 27, 2014

Related U.S. Application Data

(63) Continuation-in-part of application No. 13/787,648, filed on Mar. 6, 2013.

(60) Provisional application No. 61/750,906, filed on Jan. 10, 2013, provisional application No. 61/607,478, filed on Mar. 6, 2012.

(51) Int. Cl.
*G06F 17/00* (2006.01)
*G06N 5/02* (2006.01)
(Continued)

(52) U.S. Cl.
CPC .............. *G06N 5/02* (2013.01); *G06Q 20/0655* (2013.01); *G06Q 30/06* (2013.01); *G07F 17/323* (2013.01);
(Continued)

(58) Field of Classification Search
USPC ......................................................... 706/46
See application file for complete search history.

(56) References Cited

U.S. PATENT DOCUMENTS 6,108,493 A   8/2000  Miller et al.
6,606,615 B1  8/2003  Jennings et al.
(Continued)

FOREIGN PATENT DOCUMENTS

WO   WO2005071579   4/2005

OTHER PUBLICATIONS

A source code analyzer for performance prediction, Kuhnemann, M.; Rauber, T.; Runger, G. Parallel and Distributed Processing Symposium, 2004. Proceedings. 18th International Year: 2004 p. 262, DOI: 10.1109/IPDPS.2004.1303333.*

(Continued)

*Primary Examiner* — Michael B Holmes
(74) *Attorney, Agent, or Firm* — Holland & Hart LLP

(57) ABSTRACT

A prediction processing system, method, and method for doing business is disclosed. The prediction processing system can collect, process, and publish event-outcome information. The prediction processing system can dynamically filter participants into groupings and iteratively optimize odds calculations over time. A proposal framework consisting of a various abstract proposal types can model and settle propositions. Game propositions can be automatically generated based on event categorization relationships, and users can themselves automatically establish their own game proposition and programs. The prediction processing system can provide game players or others with access to collective intelligence, including prediction information and information derived from prediction information. The prediction processing system can create groupings of better-performing predictors and provide them with information not generally available or additional stakes to increase the weight of their predictions in odds calculations. The prediction processing system can provide access to event-outcome information on a for-fee subscription basis.

20 Claims, 114 Drawing Sheets

(51) Int. Cl.
*G06Q 30/06* (2012.01)
*G07F 17/32* (2006.01)
*G06Q 20/06* (2012.01)
*G06Q 50/34* (2012.01)

(52) U.S. Cl.
CPC ........ *G07F 17/3218* (2013.01); *G07F 17/3223* (2013.01); *G07F 17/3239* (2013.01); *G07F 17/3244* (2013.01); *G07F 17/3276* (2013.01); *G07F 17/3288* (2013.01); *G06Q 50/34* (2013.01)

(56) References Cited

U.S. PATENT DOCUMENTS

| | | | |
|---|---|---|---|
| 7,819,747 B2 | 10/2010 | Kane et al. | |
| 8,088,000 B2 | 1/2012 | Ginsberg et al. | |
| 8,095,480 B2 | 1/2012 | Kristal et al. | |
| 8,182,328 B2 | 5/2012 | Odom et al. | |
| 8,250,009 B1 | 8/2012 | Breckenridge et al. | |
| 8,262,466 B2 | 9/2012 | Anderson et al. | |
| 8,285,656 B1* | 10/2012 | Chang et al. | 706/15 |
| 8,458,035 B2* | 6/2013 | Verbil | 705/14.69 |
| 8,499,066 B1* | 7/2013 | Zhang et al. | 709/223 |
| 8,634,943 B2* | 1/2014 | Root | 700/92 |
| 8,751,616 B2* | 6/2014 | Karklins et al. | 709/223 |
| 8,812,646 B1* | 8/2014 | Zhang et al. | 709/223 |
| 2002/0169660 A1 | 11/2002 | Taylor et al. | |
| 2003/0041042 A1 | 2/2003 | Cohen et al. | |
| 2003/0078829 A1 | 4/2003 | Chen et al. | |
| 2004/0058731 A1 | 3/2004 | Rossides | |
| 2004/0133393 A1 | 7/2004 | Misium | |
| 2006/0192334 A1 | 8/2006 | Wittwer | |
| 2006/0197024 A1 | 9/2006 | Manber | |
| 2006/0218179 A1 | 9/2006 | Gardner et al. | |
| 2007/0102877 A1 | 5/2007 | Personius et al. | |
| 2009/0054127 A1 | 2/2009 | Sweary et al. | |
| 2009/0055433 A1 | 2/2009 | Freedman | |
| 2009/0061978 A1 | 3/2009 | Ahlin | |
| 2009/0076939 A1 | 3/2009 | Bert et al. | |
| 2009/0076974 A1 | 3/2009 | Berg et al. | |
| 2009/0163269 A1 | 6/2009 | Yamagishi | |
| 2009/0170584 A1 | 7/2009 | Tan et al. | |
| 2009/0186679 A1 | 7/2009 | Irvine et al. | |
| 2009/0254475 A1 | 10/2009 | Pennock et al. | |
| 2009/0270155 A1 | 10/2009 | Glass et al. | |
| 2009/0313203 A1 | 12/2009 | Bourne | |
| 2010/0255449 A1 | 10/2010 | Fadde | |
| 2011/0014974 A1 | 1/2011 | Torf | |
| 2011/0066534 A1 | 3/2011 | Davie et al. | |
| 2011/0111821 A1 | 5/2011 | Kane et al. | |
| 2011/0118009 A1 | 5/2011 | Bone et al. | |
| 2011/0208328 A1 | 8/2011 | Cairns et al. | |
| 2011/0208687 A1 | 8/2011 | Dube et al. | |
| 2011/0218033 A1 | 9/2011 | Englman et al. | |
| 2011/0239229 A1 | 9/2011 | Meijer et al. | |
| 2011/0246412 A1 | 10/2011 | Skelton | |
| 2011/0275425 A1 | 11/2011 | Asher et al. | |
| 2012/0058813 A1 | 3/2012 | Amaitis et al. | |
| 2012/0074650 A1 | 3/2012 | Templeman | |
| 2012/0179478 A1 | 7/2012 | Ross | |
| 2012/0209756 A1 | 8/2012 | El-Sakkout et al. | |
| 2012/0214575 A1 | 8/2012 | Amaitis et al. | |

OTHER PUBLICATIONS

Programming complex robot tasks by prediction: experimental results, Dixon, K.R.; Khosla, P.K. Intelligent Robots and Systems, 2003. (IROS 2003). Proceedings. 2003 IEEE/RSJ International Conference on Year: 2003, vol. 4 pp. 3150-3155 vol. 3, DOI: 10.1109/IROS.2003.1249641.*

Predicting software complexity by means of evolutionary testing Nogueira, A.F. Automated Software Engineering (ASE), 2012 Proceedings of the 27th IEEE/ACM International Conference on Year: 2012 pp. 402-405, DOI: 10.1145/2351676.2351759.*

Efficient data race prediction with incremental reasoning on time-stamped lock history Ganai, M.K. Automated Software Engineering (ASE), 2013 IEEE/ACM 28th International Conference on Year: 2013 pp. 37-47, DOI: 10.1109/ASE.2013.6693064.*

International Search Report and Written Opinion of The International Searching Authority for International Application PCT/US2013/029454, mailed May 9, 2013.

C.T. Brown and R.N. Davis; Computerization of the Betting Industry; International Journal of Information Management; 1990.

Thomas L. Griffiths and Joshua B. Tenenbaum, Optimal Predictions in Everyday Cognition; Association for Psychological Science; 2006; vol. 17—No. 9.

Paul W. Rhode and Koleman S. Strumpf; Historical Prediction Markets: Wagering on Presidential Elections; UNC Chapel Hill and NBER; Nov. 2003.

Martin Spann and Bernd Skiera; Sports Forecasting: A Comparison of the Forecast Accuracy of Prediction Markets, Betting Odds and Tipsters; Journal of Forcasting; Sep. 5, 2008.

International Search Report and Written Opinion of The International Searching Authority for International Application PCT/US2014/054345, mailed Dec. 30, 2014.

* cited by examiner

501

| Crowd::Badge | |
|---|---|
| ☐ badgings | Badging |
| ☐ users | User |
| ☐ badge_type | string |
| ☐ description | string |
| ☐ name | string |
| ☐ observes | string |
| ☐ permalink | string |
| ☐ state | boolean |
| ☐ value | integer |
| ☐ icon_file_name | string |
| ☐ icon_content_type | string |
| ☐ icon_file_size | integer |
| ☐ icon_updated_at | datetime |

| Crowd::User | |
|---|---|
| ☐ activities | Activity |
| ☐ avatar | Avatar |
| ☐ badges | Badge |
| ☐ badgings | Badging |
| ☐ comments | Comment |
| ☐ invitation | SiteInvitation |
| ☐ owned_groups | Group |
| ☐ profile | Profile |
| ☐ recent_activities | TimelineEvent |
| ☐ recent_events | TimelineEvent |
| ☐ sent_game_invitations | Invitation |
| ☐ sent_group_invitations | Invitation |
| ☐ sent_invitations | Invitation |
| ☐ system_invitations | SystemInvitation |
| ☐ user_invitations | UserInvitation |
| ☐ email | string |
| ☐ image | string |
| ☐ language | string |
| ☐ location | string |
| ☐ name | string |
| ☐ permalink | string |
| ☐ remember_token | string |
| ☐ signature | string |
| ☐ time_zone | string |

Figure 4B

Crowd::Badging — 503
- badge — Badge
- user — User
- badge_id — integer
- user_id — integer
- value — integer

Figure 4C

Crowd::Profile — 504
- user — User
- country_id — integer
- name — string
- user_id — integer

Figure 4D

Crowd::Comment — 505
- user — User
- comment — text
- commentable_id — integer
- commentable_type — string
- title — string
- user_id — integer

Figure 4E

Crowd::SystemInvitation — 506
- user_invitations — UserInvitation
- users — User
- activated_at — datetime
- email — string
- invitatable_id — integer
- invitatable_type — string
- name — string
- note — text
- receiver_id — integer
- sender_id — integer
- sent_at — datetime
- status — string
- token — string
- type — string

Figure 4F

Crowd::SiteInvitation — 507
- receiver — User
- activated_at — datetime
- email — string
- invitatable_id — integer
- invitatable_type — string
- name — string
- note — text
- receiver_id — integer
- sender_id — integer
- sent_at — datetime
- status — string
- token — string
- type — string

Figure 4G

Crowd::Activity — 508
- user — User
- activity_type — string
- data — text
- object_id — integer
- user_id — integer

Figure 4H

| Crowd::Avatar | |
|---|---|
| ☐ imagable_id | integer |
| ☐ imagable_type | string |
| ☐ image_content_type | string |
| ☐ image_file_name | string |
| ☐ image_file_size | string |
| ☐ image_updated_at | datetime |

| Crowd::Facebookinvitation | |
|---|---|
| ☐ activated_at | datetime |
| ☐ email | string |
| ☐ invitatable_id | integer |
| ☐ invitatable_type | string |
| ☐ name | string |
| ☐ note | text |
| ☐ receiver_id | integer |
| ☐ sender_id | integer |
| ☐ sent_at | datetime |
| ☐ status | string |
| ☐ token | string |
| ☐ type | string |

| Crowd::Group | |
|---|---|
| ☐ invitations | Invitation |
| ☐ members | User |
| ☐ memberships | Membership |
| ☐ recent_activities | TimelineEvent |
| ☐ users | User |
| ☐ avatar | string |
| ☐ comments_count | integer |
| ☐ description | text |
| ☐ image_content_type | string |
| ☐ image_file_name | string |
| ☐ image_file_size | integer |
| ☐ image_updated_at | datetime |
| ☐ members_count | integer |
| ☐ name | string |
| ☐ permalink | string |
| ☐ private | boolean |
| ☐ searchable | boolean |

Crowd::UserInvitation — 512
- system_invitation: SystemInvitation
- user: User
- activated_at: datetime
- ignore: boolean
- invitation_id: integer
- sent_at: datetime
- user_id: integer

Figure 4L

Crowd::Invitation — 513
- receiver: User
- sender: User
- activated_at: datetime
- email: string
- invitatable_id: integer
- invitatable_type: string
- name: string
- note: text
- receiver_id: integer
- sender_id: integer
- sent_at: datetime
- status: string
- token: string
- type: string

Figure 4M

Crowd::Membership — 514
- group: Group
- user: User
- confirmed: boolean
- group_id: integer
- owner: boolean
- user_id: integer

Figure 4N

TimelineEvent — 515
- event_type: string
- subject_id: integer

Crowd::Credential
| user_id | integer |
| username | string |
| password_digest | string |

Crowd::Identity
| credential | Credential |
| user | User |
| auth_hash | text |
| last_logged_in | datetime |
| provider | string |
| uid | string |
| user_id | integer |

Crowd::Page
| ancestry | string |
| content | text |
| summary | text |
| title | string |

Crowd::Friendship
| friend | User |
| user | User |
| confirmed | boolean |
| friend_id | integer |
| user_id | integer |

Crowd::Followship
| follower | User |
| following | User |

Crowd::RewardsObserver

CROWD_INVITATIONS
- id
- name
- email
- sender_id
- receiver_id
- invitatable_type
- invitatable_id
- note
- status
- type
- token
- sent_at
- activated_at
- created_at
- updated_at

CROWD_GROUPS
- id
- name
- description
- permalink
- private
- created_at
- updated_at
- members_count
- comments_count
- image_file_name
- image_file_size
- image_content_type
- image_updated_at
- avatar
- searchable

CROWD_BADGES
- id
- name
- description
- permalink
- state
- value
- observes
- badge_type
- icon_file_name
- icon_content_type
- icon_file_size
- icon_updated_at
- created_at
- updated_at

CROWD_USERS
- id
- name
- email
- image
- location
- time_zone
- language
- permalink
- created_at
- updated_at
- signature
- remember_token

Figure 6D

CROWD_TIMELINE_EVENTS — 554

- id
- event_type
- subject_type
- actor_type
- secondary_subject_type
- expression
- subject_id
- actor_id
- secondary_subject_id
- created_at
- updated_at

Figure 6E

CROWD_PAGE_TRANSLATIONS — 555

- id
- crowd_page_id
- locale
- title
- summary
- content
- ancestry
- created_at
- updated_at

Figure 6F

CROWD_AVATARS — 556

- id
- image_file_name
- image_file_size
- image_content_type
- image_updated_at
- imagable_id
- imagable_type
- created_at
- updated_at

Figure 6G

CROWD_USER_INVITATIONS — 557

- id
- user_id
- invitation_id
- activated_at
- sent_at
- created_at
- updated_at
- ignore

Figure 6H

TAGGINGS — 558

- id
- tag_id
- taggable_id
- taggable_type
- tagger_id
- tagger_type
- context
- created_at

Figure 6I

CROWD_IDENTITIES — 559

- id
- user_id
- provider
- uid
- auth_hash
- created_at
- updated_at
- last_logged_in

CROWD_COMMENTS
- id
- title
- comment
- commentable_id
- commentable_type
- user_id
- created_at
- updated_at

CROWD_PAGES
- id
- title
- summary
- content
- ancestry
- created_at
- updated_at

CROWD_ACTIVITIES
- id
- user_id
- activity_type
- object_id
- data
- created_at
- updated_at

CROWD_MEMBERSHIPS
- id
- user_id
- group_id
- owner
- confirmed
- created_at
- updated_at

CROWD_CREDENTIALS
- id
- user_id
- username
- password_digest
- created_at
- updated_at
- remember_token

CROWD_FRIENDSHIPS
- id
- user_id
- friend_id
- confirmed
- created_at
- updated_at

Figure 6P

```
┌─────────────────────────────────────────────┐ ┌─────────────────────────────────────────────┐
│ 701                                         │ │ 704                                         │
├─────────────────────────────────────────────┤ ├─────────────────────────────────────────────┤
│ ⓠ Play::ProposalWillWinWithHigherPercentageOn│ │ ⓠ Play::ProposalCoverSpreadOn              │
│ ☐ ancestry                          string  │ │ ☐ ancestry                          string  │
│ ☐ configuration                     text    │ │ ☐ configuration                     text    │
│ ☐ description                       text    │ │ ☐ description                       text    │
│ ☐ name                              string  │ │ ☐ name                              string  │
│ ☐ type                              string  │ │ ☐ type                              string  │
└─────────────────────────────────────────────┘ └─────────────────────────────────────────────┘
                  Figure 7A                                      Figure 7D
```

```
┌─────────────────────────────────────────────┐ ┌─────────────────────────────────────────────┐
│ 702                                         │ │ 705                                         │
├─────────────────────────────────────────────┤ ├─────────────────────────────────────────────┤
│ ⓠ Play::ProposalCompareOn                   │ │ ⓠ Play::ProposalWillWinInRangeOn            │
│ ☐ ancestry                          string  │ │ ☐ ancestry                          string  │
│ ☐ configuration                     text    │ │ ☐ configuration                     text    │
│ ☐ description                       text    │ │ ☐ description                       text    │
│ ☐ name                              string  │ │ ☐ name                              string  │
│ ☐ type                              string  │ │ ☐ type                              string  │
└─────────────────────────────────────────────┘ └─────────────────────────────────────────────┘
                  Figure 7B                                      Figure 7E
```

```
┌─────────────────────────────────────────────┐ ┌─────────────────────────────────────────────┐
│ 703                                         │ │ 706                                         │
├─────────────────────────────────────────────┤ ├─────────────────────────────────────────────┤
│ ⓠ Play::ProposalFirstWithDifference         │ │ ⓠ Play::ProposalWillBeFirstWhenSortedOn     │
│ ☐ ancestry                          string  │ │ ☐ ancestry                          string  │
│ ☐ configuration                     text    │ │ ☐ configuration                     text    │
│ ☐ description                       text    │ │ ☐ description                       text    │
│ ☐ name                              string  │ │ ☐ name                              string  │
│ ☐ type                              string  │ │ ☐ type                              string  │
└─────────────────────────────────────────────┘ └─────────────────────────────────────────────┘
                  Figure 7C                                      Figure 7F
```

707

Play::ProposalWillTie
| ancestry | string |
| configuration | text |
| description | text |
| name | string |
| type | string |

Play::ProposalWillWin
| ancestry | string |
| configuration | text |
| description | text |
| name | string |
| type | string |

Play::ProposalWillWinInRange
| ancestry | string |
| configuration | text |
| description | text |
| name | string |
| type | string |

Play::ProposalParlay
| parlayables | Parlayable |
| picks | Pick |
| predictions | Prediction |
| propositions | Proposition |
| tickets | Ticket |
| ancestry | string |
| configuration | text |
| description | text |
| name | string |
| type | string |

Play::ProposalOperationalCompare
| ancestry | string |
| configuration | text |
| description | text |
| name | string |
| type | string |

Play::Proposal
| propositions | Proposition |
| ancestry | string |
| configuration | text |
| description | text |
| name | string |
| type | string |

Play::Proposition
| pools | Pool |
| predictions | Prediction |
| position | integer |
| program_id | string |
| proposable_id | integer |
| proposable_type | string |

Figure 7M

Play::Game — 714

| | | |
|---|---|---|
| ☐ picks | | Pick |
| ☐ tickets | | Ticket |
| ☐ area_id | | integer |
| ☐ category_id | | integer |
| ☐ comments_count | | integer |
| ☐ description | | text |
| ☐ ends_on | | date |
| ☐ host_id | | integer |
| ☐ host_type | | string |
| ☐ name | | string |
| ☐ program_id | | integer |
| ☐ stake | | integer |
| ☐ starts_on | | date |
| ☐ state | | string |
| ☐ window_close_time | | datetime |
| ☐ winner_announce_time | | datetime |

Figure 7N

Play::Prediction — 715

| | |
|---|---|
| ☐ picks | Pick |
| ☐ proposition | Proposition |
| ☐ tickets | Tickets |
| ☐ fan_confidence | integer |
| ☐ odds | string |
| ☐ pool | integer |
| ☐ predictable_id | integer |
| ☐ predictable_type | string |
| ☐ proposition_id | integer |
| ☐ run_id | integer |
| ☐ satisfied | boolean |

Figure 7O

Play::Pool — 716

| | |
|---|---|
| ☐ proposition | Proposition |
| ☐ amount | integer |
| ☐ proposition_id | integer |
| ☐ race_id | integer |
| ☐ winners_pool | integer |

| Play::Tickets | |
|---|---|
| accuracy | integer |
| bonus | integer |
| decile | integer |
| game_id | integer |
| placement | integer |
| score | integer |
| state | string |
| user_id | integer |
| stack | integer |

| Play::Pick | |
|---|---|
| correct | boolean |
| payout | decimal |
| prediction_id | integer |
| state | string |
| ticket_id | integer |
| weight | integer |

| Play::Expertise | |
|---|---|
| accuracy | decimal |
| category_id | integer |
| correct_picks_count | integer |
| total_picks_count | integer |
| user_id | integer |

| Play::Fandom | |
|---|---|
| accuracy | decimal |
| correct_picks_count | integer |
| fan_id | integer |
| idol_id | integer |
| total_picks_count | integer |

| Play::PredictionObserver |
|---|

| Play::ProgramObserver |
|---|

| Play::RaceObserver |
|---|

| Play::Standing | |
|---|---|
| bonus | integer |
| decile | integer |
| games_played | integer |
| placement | integer |
| score | decimal |
| user_id | integer |
| wallet | integer |

| Play::Parlayable | |
|---|---|
| prediction | Prediction |

Figure 7Y

PLAY_GAMES — 750
- id
- stake
- program_id
- created_at
- updated_at
- name
- host_id
- host_type
- category_id
- area_id
- starts_on
- ends_on
- window_close_time
- winner_announce_time
- state
- comments_count
- description

Figure 9A

PLAY_PREDICTIONS — 751
- id
- proposition_id
- run_id
- satisfied
- fan_confidence
- pool
- created_at
- updated_at
- odds
- predictable_type
- predictable_id

Figure 9B

PLAY_TICKETS — 752
- id
- user_id
- game_id
- placement
- score
- decile
- accuracy
- bonus
- state
- created_at
- updated_at
- stack

PLAY_STANDINGS
- id
- user_id
- games_played
- score
- placement
- decile
- bonus
- wallet
- created_at
- updated_at

PLAY_PICKS
- id
- ticket_id
- prediction_id
- weight
- correct
- payout
- created_at
- updated_at
- state

PLAY_PROPOSALS
- id
- name
- description
- type
- created_at
- updated_at
- configuration
- ancestry

PLAY_EXPERTISES
- id
- user_id
- category_id
- accuray
- correct_picks_count
- total_picks_count
- created_at
- updated_at

PLAY_FANDOMS
- id
- fan_id
- idol_id
- accuray
- correct_picks_count
- total_picks_count
- created_at
- updated_at

PLAY_POOLS
- id
- race_id
- proposition_id
- amount
- winners_pool
- created_at
- updated_at

PLAY_PROPOSITIONS
- id
- program_id
- proposable_id
- proposable_type
- created_at
- updated_at
- position

Figure 9J

Competition::Tour — 601

| Field | Type |
|---|---|
| area | Area |
| areas | Area |
| category | Category |
| competitions | Competition |
| tourables | Tourable |
| area_id | integer |
| category_id | integer |
| name | string |
| permalink | string |
| source_type | string |
| source_uid | string |
| type | string |

Figure 10A

Competition::Category — 602

| Field | Type |
|---|---|
| areas | Area |
| categorizations | Categorization |
| competitions | Competition |
| players | Runner |
| programs | Program |
| runners | Runner |
| teams | Runner |
| tours | Tour |
| ancestry | string |
| competitions_count | integer |
| name | string |
| permalink | string |
| programs_count | integer |
| runners_count | integer |
| source_uid | string |
| type | string |

| Competition::Area | |
|---|---|
| ☐ areazations | Areazation |
| ☐ categories | Category |
| ☐ competitions | Competition |
| ☐ location | Location |
| ☐ players | Player |
| ☐ runners | Runner |
| ☐ teams | Team |
| ☐ ancestry | string |
| ☐ categories_count | integer |
| ☐ code | string |
| ☐ competitions_count | integer |
| ☐ gcm_id | integer |
| ☐ name | string |
| ☐ permalink | string |
| ☐ programs_count | integer |
| ☐ runners_count | integer |
| ☐ type | string |

| Competition::Player | |
|---|---|
| ☐ country_of_birth | Area |
| ☐ runs | Run |
| ☐ teamings | Teaming |
| ☐ teams | Team |
| ☐ ancestry | string |
| ☐ category_id | integer |
| ☐ country_of_birth_id | integer |
| ☐ date_of_birth | date |
| ☐ full_name | string |
| ☐ gender | string |
| ☐ image_url | string |
| ☐ name | string |
| ☐ nationality_id | integer |
| ☐ notes | text |
| ☐ permalink | string |
| ☐ reference_url | string |
| ☐ source_uid | string |
| ☐ type | string |

| Competition::Competition | |
|---|---|
| ☐ area | Area |
| ☐ category | Category |
| ☐ programs | Program |
| ☐ seasons | Season |
| ☐ tourables | Tourable |
| ☐ tours | Tour |
| ☐ area_id | integer |
| ☐ category_id | integer |
| ☐ format | string |
| ☐ full_name | string |
| ☐ international | boolean |
| ☐ name | string |
| ☐ permalink | string |
| ☐ source_uid | string |
| ☐ women | boolean |

Figure 10E

```
┌─ 606
│ ⊙ Competition::Team
├─────────────────────────────────────┤
│ ☐ country_of_birth          Area    │
│ ☐ players                   Player  │
│ ☐ teamings                  Teaming │
├─────────────────────────────────────┤
│ ☐ ancestry                  string  │
│ ☐ category_id               integer │
│ ☐ country_of_birth_id       integer │
│ ☐ date_of_birth             date    │
│ ☐ full_name                 string  │
│ ☐ gender                    string  │
│ ☐ image_url                 string  │
│ ☐ name                      string  │
│ ☐ nationality_id            integer │
│ ☐ notes                     text    │
│ ☐ permalink                 string  │
│ ☐ reference_url             string  │
│ ☐ source_uid                string  │
│ ☐ type                      string  │
└─────────────────────────────────────┘
```

Figure 10G

```
┌─ 607
│ ⊙ Competition::Categorization
├──────────────────────────────────┤
│ ☐ category            Category   │
│ ☐ categorizable_id    integer    │
│ ☐ categorizable_type  string     │
│ ☐ category_id         integer    │
└──────────────────────────────────┘
```

Figure 10F

```
┌─ 608
│ ⊙ Competition::Teaming
├─────────────────────────────┤
│ ☐ player           Player   │
│ ☐ team             Team     │
│ ☐ player_id        integer  │
│ ☐ team_id          integer  │
└─────────────────────────────┘
```

| Competition::Tourable | |
|---|---|
| competition | Competition |
| tour | Tour |
| competition_id | integer |
| tour_id | integer |

| Competition::Season | |
|---|---|
| competition | Competition |
| programs | Prorgam |
| area_id | integer |
| category_id | integer |
| competition_id | integer |
| ends_on | datetime |
| full_name | string |
| name | string |
| permalink | string |
| source_uid | string |
| starts_on | datetime |

Figure 10J

| Competition::Program | |
|---|---|
| competition | Competition |
| racables | Racable |
| races | Race |
| season | Season |
| ancestry | string |
| area_id | integer |
| categoty_id | integer |
| ends_on | datetime |
| format | string |
| full_name | string |
| international | boolean |
| name | string |
| permalink | string |
| publication_date | datetime |
| racables_count | integer |
| seasons_id | interger |
| source_uid | string |
| split_logic | string |
| split_type | string |
| starts_on | datetime |
| state | string |
| type | string |
| window_close_time | datetime |
| window_open_time | datetime |
| women | boolean |

| Competition::Race | |
|---|---|
| ☐ area | Area |
| ☐ category | Category |
| ☐ labels | Label |
| ☐ location | Location |
| ☐ programs | Program |
| ☐ racables | Racable |
| ☐ runners | Runner |
| ☐ runs | Run |
| ☐ area_id | integer |
| ☐ categories_count | integer |
| ☐ categoty_id | integer |
| ☐ competitions_count | integer |
| ☐ ends_at | datetime |
| ☐ full_name | string |
| ☐ name | string |
| ☐ permalink | string |
| ☐ runners_count | integer |
| ☐ source_uid | string |
| ☐ starts_at | datetime |
| ☐ state | string |
| ☐ tie | boolean |

Figure 10L

| Competition::Racable | |
|---|---|
| ☐ program | Program |
| ☐ race | Race |
| ☐ program_id | integer |
| ☐ race_id | integer |

Figure 10M

| Competition::Label | |
|---|---|
| ☐ labelable_id | integer |
| ☐ labelable_type | string |
| ☐ name | string |

Figure 10N

| Competition::Location | |
|---|---|
| ☐ address | string |
| ☐ gmaps | boolean |
| ☐ latitude | float |
| ☐ labelable_id | integer |
| ☐ labelable_type | string |
| ☐ longitude | float |

| Competition::Runner | |
|---|---|
| ☐ area | Area |
| ☐ category | Category |
| ☐ country_of_birth | Area |
| ☐ nationality | Area |
| ☐ races | Race |
| ☐ runs | Run |
| ☐ ancestry | string |
| ☐ category_id | integer |
| ☐ country_of_birth_id | integer |
| ☐ date_of_birth | date |
| ☐ full_name | string |
| ☐ gender | string |
| ☐ image_url | string |
| ☐ name | string |
| ☐ nationality_id | integer |
| ☐ notes | text |
| ☐ permalink | string |
| ☐ reference_url | string |
| ☐ source_uid | string |
| ☐ type | string |

| Competition::Run | |
|---|---|
| ☐ areas | Area |
| ☐ category | Category |
| ☐ parent_runner | Runner |
| ☐ player | Player |
| ☐ race | Race |
| ☐ run_data | RunData |
| ☐ runner | Runner |
| ☐ team | Team |
| ☐ area_id | integer |
| ☐ category_id | integer |
| ☐ parent_runner_id | integer |
| ☐ placement | integer |
| ☐ race_id | integer |
| ☐ runner_id | integer |
| ☐ score | integer |
| ☐ state | string |
| ☐ tie | boolean |
| ☐ winner | boolean |

| Competition::RunData | |
|---|---|
| ☐ run | Run |
| ☐ data | text |
| ☐ run_id | integer |

Figure 10R

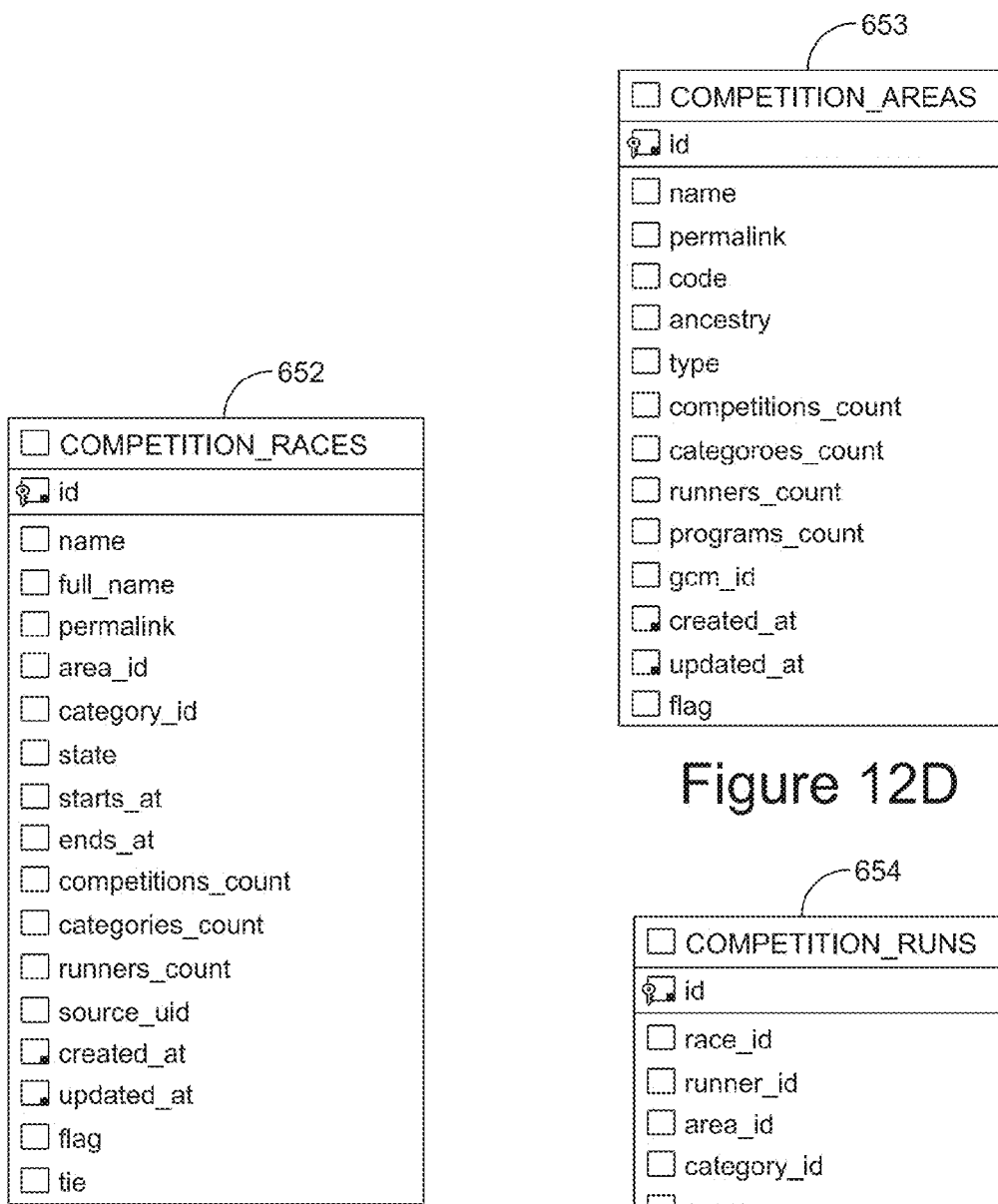
Figure 12D
Figure 12C
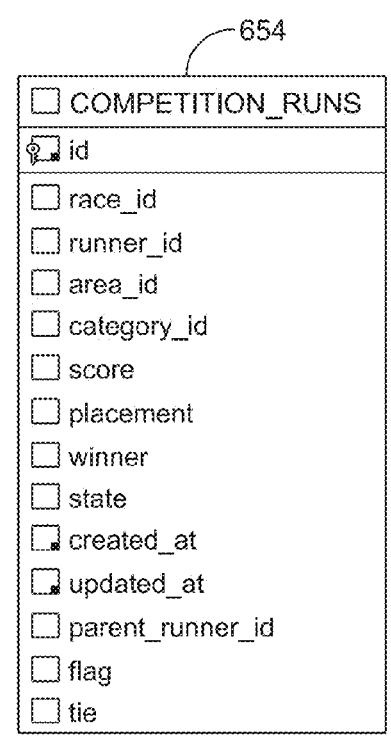
Figure 12E

COMPETITION_SEASONS — 655
- id
- name
- full_name
- permalink
- area_id
- category_id
- starts_on
- ends_on
- competition_id
- source_uid
- created_at
- updated_at
- flag

Figure 12F

COMPETITION_COMPETITIONS — 656
- id
- name
- full_name
- permalink
- category_id
- area_id
- women
- international
- format
- source_uid
- created_at
- updated_at
- flag

Figure 12G

COMPETITION_CATEGORIES — 657
- id
- name
- permalink
- type
- ancestry
- source_uid
- created_at
- updated_at
- runners_count
- competitions_count
- programs_count
- flag

Figure 12H

COMPETITION_TOURS — 658
- id
- name
- permalink
- type
- category_id
- area_id
- source_type
- source_id
- created_at
- updated_at
- flag

COMPETITION_CATEGORIZATIONS
- id
- categorizable_type
- categorizable_id
- category_id
- created_at
- updated_at

COMPETITION_AREAZATIONS
- id
- areable_type
- areable_id
- area_id
- created_at
- updated_at

COMPETITION_TOURABLES
- id
- tour_id
- competition_id
- created_at
- updated_at

COMPETITION_TEAMINGS
- id
- player_id
- team_id
- created_at
- updated_at

COMPETITION_RACABLES
- id
- program_id
- race_id
- created_at
- updated_at

TAGS
- id
- name
- flag
- taggings_count

Figure 12S

┌─ 224
ANALYTICS_PROPOSITION_POOLS
- id
- amount
- group_id
- proposition_id
- race_id
- created_at
- updated_at

Figure 14A

┌─ 226
ANALYTICS_PREDICTION_POOLS
- id
- amount
- odds
- proposition_pool_id
- prediction_id
- created_at
- updated_at

Figure 14B

┌─ 228
ANALYTICS_MEMBERSHIPS
- id
- user_id
- group_id
- created_at
- updated_at

Figure 14C

┌─ 230
ANALYTICS_GROUPS
- id
- type
- created_at
- updated_at
- program_id

Figure 14D

┌─ 232
ANALYTICS_USERS
- id
- name
- email
- created_at
- updated_at

Figure 14E

┌─ 234
ANALYTICS_PROGRAMS
- id
- created_at
- updated_at
- program_id

Figure 14F

```xml
<Vote xmlns="http://ap.org/schemas/eml" ElectionDate="2008-11-04" Test="0"
Timestamp="2008-11-19T01:15:42Z">
  <Race ID="3" Type="General" TypeID="G" OfficeID="H" OfficeName="U.S. House"
SeatName="District 1" SeatNum="1">
    <ReportingUnit StatePostal="NV" Name="Nevada" Level="state">
      <Precincts Reporting="486" Total="486"/>
      <Candidate ID="16" Party="Dem" Incumbent="1" First="Shelley" Last="Berkley"
PolID="489" VoteCount="154227" Winner="X"/>
      <VoteCount="64688"/>
      <Candidate ID="18" Party="GOP" First="Kenneth" Last="Wegner" PolID="51987"
VoteCount="4678"/>
      <Candidate ID="15" Party="IAP" First="Caren" Last="Alexander" PolID="59545"
VoteCount="4511"/>
      <Candidate ID="17" Party="Lib" First="Raymond" Last="Duensing" PolID="51373"
    </ReportingUnit>
  </Race>
</Vote>
```

Figure 17A

```
<gsmrs version="2.0" sport="baseball" lang="en" last_generated="2011-10-25 16:26:04">
  <method method_id="1102" name="get_matches">
    <parameter name="detailed" value="no"/>
    <parameter name="id" value="4"/>
    <parameter name="lang" value="en"/>
    <parameter name="type" value="season"/>
  </method>
  <competition competition_id="1" name="MLB" teamtype="default" display_order="10"
type="club" area_id="203" area_name="United States"
countrycode="USA"last_updated="2011-10-25 07:54:17">
    <season season_id="4" name="2011" start_date="2011-02-24" end_date="2011-11-05"
    service_level="" last_updated="2011-10-25 07:54:17">
      <round round_id="8" name="Regular Season" start_date="2011-03-31"
      end_date="2011-09-29" type="table" ordermethod="2"
      groups="6"has_outgroup_matches="yes" last_updated="2011-10-22 16:49:07">
        <match match_id="3228" date_utc="2011-03-31" time_utc="17:05:00"
        date_london="2011-03-31" time_london="18:05:00" team_A_id="1" team_A_name="New
        York Yankees" team_A_country="USA" team_B_id="7" team_B_name="Detroit Tigers"
        team_B_country="USA" status="Played" gameweek="" winner="team_A"
        fs_A="6"fs_B="3" p1s_A="0" p1s_B="0" p2s_A="0" p2s_B="1" p3s_A="3" p3s_B="0"
        p4s_A="0" p4s_B="1" p5s_A="0" p5s_B="1" p6s_A="0" p6s_B="0" p7s_A="2"
        p7s_B="0"p8s_A="1" p8s_B="0" p9s_A="0" p9s_B="0" pets1_A="" pets1_B=""
        pets2_A="" pets2_B="" pets3_A="" pets3_B="" pets4_A="" pets4_B="" pets5_A=""
        pets5_B=""pets6_A="" pets6_B="" pets7_A="" pets7_B="" pets8_A="" pets8_B=""
        pets9_A="" pets9_B="" pets10_A="" pets10_B="" last_updated="2011-04-01
        17:36:24"/>
      </round>
    </season>
  </competition>
</gsmrs>
```

Figure 17B

```xml
<game>
  <name>NFL 2012/2013 Regular Season: Week15</name>
  <races>
    <race>
      <starts_at>13 Dec 20:20</starts_at>
      <team>
        <name>Cincinnati Bengals</name>
        <odds>2.13</odds>
      </team>
      <team>
        <name>Philadelphia Eagles</name>
        <odds>4.00</odds>
      </team>
    </race>
    <race>
      <starts_at>16 Dec 13:00</starts_at>
      <team>
        <name>Green Bay Packers</name>
        <odds>1.76</odds>
      </team>
      <team>
        <name>Chicago Bears</name>
        <odds>5.00</odds>
      </team>
    </race>
  </races>
</game>
```

Figure 35A

```xml
<game id="987">
   <area id="123">United States</area>
   <category id="456">American Football</category>
   <name>Regular Season: Week 14</name>
   <stake>20</stake>
   <starts-on type="date" nil="true"/>
   <window-close-time type="datetime" nil="true"/>
   <state>pending</state>
   <propositions>
      <proposition id="654">
         <races>
            <race id="321">
               <name>New York Jets vs. Minnesota Vikings</name>
               <starts-at>2013-02-10 00:30:00</starts-at>
               <state>pending</state>
               <runners>
                  <runner id="159" type="Team">
                     <name>New York Jets</name>
                     <odds>3.21</odds>
                  </runner>
                  <runner id="753" type="Team">
                     <name>Minnesota Vikings</name>
                     <odds>1.23</odds>
                  </runner>
               </runners>
            </race>
         </races>
      </proposition>
   </propositions>
</game>
```

Figure 35B

```
"game": {
  "id": "987",
  "area": {
    "id": "123",
    "name": "United States"
  },
  "category": {
    "id": "456",
    "name": "American Football"
  },
  "name": "Regular Season: Week 14",
  "stake": "20",
  "starts-on": {
    "type": "date",
    "nil": "true"
  },
  "window-close-time": {
    "type": "datetime",
    "nil": "true"
  },
  "state": "pending",
  "propositions": {
    "proposition": {
      "id": "654",
      "races": {
        "race": {
          "id": "321",
          "name": "New York Jets vs. Minnesota Vikings",
          "starts-at": "2013-02-10 00:30:00",
          "state": "pending",
          "runners": {
            "runner": [
              {
                "id": "159",
                "type": "Team",
                "name": "New York Jets",
                "odds": "3.21"
              },
              {
                "id": "753",
                "type": "Team",
                "name": "Minnesota Vikings",
                "odds": "1.23"
              }
            ]
```

Major League Baseball 2011

Week of Monday, May 13

Game closes in 15 hours, 23 minutes, and 14 seconds. 5701

| Time and Place | Game | Odds | | Expert Odds | | | Fan Odds | | | Your Picks |
|---|---|---|---|---|---|---|---|---|---|---|
| Monday, June 12 Citifield | Mets Yankees | 5:2 6:7 | | 6:3 5:7 | ◄ ► | +23% -37% | 8:5 4:6 | ◄ ► | +14% -25% | ○ ○ ○ ○ |
| Monday, June 12 Jacobs Field | Redsox Indians | 5:2 6:7 | | 6:3 5:7 | ◄ ► | +23% -37% | 5:2 6:7 | ◄ ► | +14% -25% | ○ ○ The most accurate fans of this team |
| Tuesday, June 13 Citifield | Cardinals Braves | 5:2 6:7 | | 6:3 5:7 | ◄ ► | +23% -37% | 5:2 6:7 | ◄ ► | +14% -25% | ○ ○ |
| Wednesday, June 14 Citifield | Marlins Reds | 5:2 6:7 | | 6:3 5:7 | ◄ ► | +23% -37% | 5:2 6:7 | ◄ ► | +14% -25% | ○ ○ |
| Thursday, June 15 Citifield | Dodgers Twins | 5:2 6:7 | | 6:3 5:7 | ◄ ► | +23% -37% | 5:2 6:7 | ◄ ► | +14% -25% | ○ ○ |

KOODBEE

News 2013
February 13 through March 31

| Question | Odds | Your Picks |
|---|---|---|
| The trial of Julian Asange, CEO of Wikileaks, for violating the State Secrets Act is over. The jury's decision will be: | | |
| guilty on all counts | 2.45 | O |
| guilty on at least one count | 1.32 | O |
| not guilty on all counts | 4.87 | O |
| Michael Jackson's "Neverland" estate will be sold at auction for: | | |
| less than $10 million | 2.45 | O |
| $10 million to $12 million | 1.32 | O |
| more than $12 million | 4.87 | O |
| The attempt to break the record at the Coney Island Hot Dog Eating Contest will: | | |
| Succeed | 1.56 | O |
| Fail | 3.32 | |

Status Information
Players 12,654
Predictions 118,357
Picks Closes May 13, 2011.
Game Closes May 20, 2011.

Your Available Balance
O O O O O O
O O O O O O
O O O O O O
O O O

Your Potential Payout: 23

You must make predictions on at least 3 more categories to submit your picks

Save    Submit

Figure 61

KOODBEE http://www.koodbee.com

United States > Elections > 2008 > General > U.S. House > New York

Mary, Member

Election 2008
General, U.S. House, New York, NY

| Seat | Candidate | Party | Odds | Your Picks |
|---|---|---|---|---|
| District 15 | Charles Rangel | Dem | 2.45 | O |
|  | Edward Daniels | GOP | 1.32 | O |
|  | Martin Koppel | SWP | 4.87 | O |
|  | Craig Schley | Ind | 1.63 |  |
| District 16 | Jose E. Serrano | Dem | 2.45 | O |
|  | Ali Mohamed | GOP | 1.32 |  |
| District 17 | Eliot Engel | Dem | 2.45 | O |
|  | Robert Goodman | GOP | 1.32 | O |
| District 18 | Nita Lowey | Dem | 2.45 | O |
|  | Jim Russel | GOP | 1.32 | O |
| District 19 | John Hall | Dem | 2.45 | O |
|  | Kieran Lalor | GOP | 1.32 |  |

Status Information
Players     12,654
Predictions     118,357
Picks Closes     May 13, 2011.
Game Closes     May 20, 2011.

Your Available Balance
O O O O O O O
O O O O O O O
O O O O O O
O O O O

Your Potential Payout: 23

You must make predictions on at least 3 more categories to submit your picks

[ Save ]    [ Submit ]

Figure 63

KOODBEE http://www.koodbee.com

United States > Business > 2013 > Q2

Business 2013
February 13 through March 31

| Question | Odds | Your Picks |
|---|---|---|
| The new CEO of Bleeding Edge Technologies Inc. will be: | | |
| Bob Bigshot | 2.45 | O |
| David Dollarwise | 1.32 | O |
| Ira Insider | 4.87 | O |
| Max Makegoode | 1.63 | O |
| The new Chairman of the Board at Bleeding Edge Technologies Inc. will be: | | |
| the incoming CEO | 2.45 | O |
| the outgoing CEO | 1.32 | O |
| other member of the board | 4.87 | O |
| ACME Explosives will make its initial public offering before March 31, 2013 | | |
| Yes | 1.56 | O |
| No | 3.32 | |

6501

Status Information
Players          12,654
Predictions      118,357
Picks Closes     May 13, 2011.
Game Closes      May 20, 2011.

Your Available Balance
O O O O O O O O
O O O O O O O O
O O O O O O O O
O O

Your Potential Payout: 23

You must make predictions on at least 3 more categories to submit your picks

[Save]  [Submit]

Figure 65

KOOOBEE

United States > Business > 2013 > Q2

Prospect Park Little League 2012

Week of Monday, May 13

| Time and Place | Game | Odds | Your Picks |
|---|---|---|---|
| Monday, June 12<br>Smith Field | Titans<br>Flamingos | 5:2<br>6:7 | ○ ○ ○<br>○ |
| Monday, June 12<br>Nedellec Field | Jaguars<br>Bombers | 5:2<br>6:7 | ○ |
| Tuesday, June 13<br>Victor Field | Backlash<br>Las Fuertes | 5:2<br>6:7 | |
| Wednesday, June 14<br>Some Field | Thunder<br>Phoenix | 5:2<br>6:7 | ○ ○ ○ |
| Thursday, June 15<br>Elsewhere Field | Rebels<br>Crescendo | 5:2<br>6:7 | ○ ○ |

Status Information

Players 12,654
Predictions 118,357
Picks Closes May 13, 2011.
Game Closes May 20, 2011.

Your Available Balance
○ ○
○ ○ ○ ○
○ ○ ○ ○
○ ○ ○ ○
○ ○ ○ ○
○

Your Potential Payout: 23

You must make predictions on at least 3 more categories to submit your picks

[Save] [Submit]

Share: Post  Embed  Email

Post a link to this game to a social network of your choice. Or copy the link and use your own way.

http://kood.be/OmTBV9H7dbA

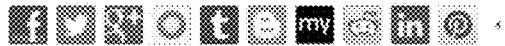

⟶ 7001

Share: Post  Embed  Email

Embed this leaderboard as a widget in your own web page. Select a size that works best for your page layout.

```
<iframe width="200" height="300"
src="http://www.koodbee.com/embed/3g3h5k3gsk55"
frameborder="0" allowfullscreent></iframe>
```

Widget size: 200 x 300 ▼

⟶ 7002

Share: Post  Embed  Email

To john@example.com

Additional note

Check out the odds on tonight's game!

Message preview:

John has shared this page with you on Koodbee:

"Check out the odds on tonight's game!"

"Football | NFL | 2013 | Regular Season | Week 17

Send Email

Create A New Game

This game is based on the following program:
Golf | PGA | 2013 | Masters | Round 2

Name
Round 2
Will be used as name instead original name

Description
It's getting crowded at the top as four titans battle it out.
Will be used as description on the game page.

Stake
24
Automatically calculated. Change with care.

Area
Sweden ▶
Based on program area. Change with care.

State
Pending ▶
Set to opened to make visible to players

Window Closes
07/13/2013 4:30 PM
Change if different from program start time

[Create Game] or Cancel  ~7201

Propositions
Choose which of the following propositions should be available for making predictions on.

☑ Will Win
☐ Will Tie
☑ Will Finish in Top 2
☐ Will Finish in Top 5
☑ Will be 30 under par

~7202

Instructions and Hints

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

- Duis aute irure dolor in reprehenderit in voluptate
- velit esse cillum dolore eu fugiat nulla pariatur.

Excepteur sint occaecat cupidatat non proident, sunt in culpa qui officia deserunt mollit anim id est laborum.

Create A New Program

Assign Competition

Program Properties
- Assign Area
- Assign Category
- Add Competition
- Set dates and times
- Enter Program
- Build Races
- Add Runners Select a existing competition: 7902
[ Select one ... ▼ ]

-- or --

Create a new competition: 7904
[ Prospect Park Little League ]

This competition is recurring ... 7906
[ One time only ▼ ]
Yearly
Monthly
Weekly Enter name of this season:
[ 2014 ]
7908

Create new runners
- Create new team
- Create new player

Program Propositions
- Edit propositions
- Create new proposition

Description and Examples

Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat.

- Duis aute irure dolor in reprehenderit in voluptate velit esse cillum dolore eu fugiat nulla pariatur.

Excepteur sint occaecat cupidatat non proident, sunt in culpa qui officia deserunt mollit anim id est laborum.

[ Next >> ] 7912

PREDICTION PROCESSING SYSTEM AND METHOD OF USE AND METHOD OF DOING BUSINESS

CROSS-REFERENCE TO RELATED APPLICATIONS

The present application is a continuation-in part of, and claims priority through, the applicants' prior nonprovisional patent application of same title, filed Mar. 6, 2013, Ser. No. 13/787,648, which claims priority through the applicants' prior U.S. provisional patent applications, entitled:
1. Prediction Gathering, Publishing and/or Processing Systems, Methods of Use, and Methods of Doing Business, Ser. No. 61/607,478, filed Mar. 6, 2012; and
2. Prediction Gathering, Publishing and/or Processing Systems, Methods of Use, and Methods of Doing Business, Ser. No. 61/750,906, filed Jan. 10, 2013; all of which prior patent applications are hereby incorporated by reference in their entirety.

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights

FIELD OF INVENTION

The technology of the present application relates to a prediction system and method, and more particularly to a system and method for collecting, optimizing and distributing collective intelligence.

BACKGROUND

Politicians, financial managers, attorneys, and all manner of individuals, both professional and private, have long been concerned with, and interested in, obtaining and discussing probabilities relating to the outcome of real-world events. See, e.g., James Surowiecki, *Wisdom of the Crowds* (2004). Past approaches to collecting and publishing such collective intelligence has suffered from a variety of shortcomings and resulted in difficulties with both the collecting of prediction data and ensuring the accuracy and quality of the data derived from the collected prediction data.

One classic approach to collecting predictions from individuals has been through the use of polling procedures, and in particular, face-to-face polling. Such an approach is limiting in that its scalability is a function of the number of available pollsters at a given time and in a given location. Similarly, it is dependent on the willingness and availability of a polling subject to participate in the polling activity at that same given time and given location. This has resulted in simplified survey questions and shortened overall surveys.

Mail-based surveys have attempted to address this limitation by providing the polling subject with the ability to answer polling questions at a time convenient for the subject. While this partially addressed the issue of convenience, there is typically very little motivation for the subject to go to the trouble of answering questions and returning the answers to the pollster. Telephone solicitation has attempted to reintroduce the pressure of direct communication, but this approach suffers the disadvantages too, such as annoying subjects with unexpected interruptions, resulting in limited response volume.

With the advent of the Internet long ago, it has long been possible to reach mass numbers of potential subjects in a less-intrusive manner than through direct interaction. Initially, polling was provided through email and email widgets. While this can be initially entertaining to email users, it often quickly becomes an annoyance, suffering the same dismissive fate of physical mail surveys.

Online surveys that displayed basic results, particularly within the context of a social network application or service such as Facebook®, were introduced relatively long ago as yet another way to try and entice individuals into participating in surveys and polls. These polls are typically very simple and short, as, again, there is little motivation for the subject to invest time and thought into engaging in trying to provide accurate information. In this context, polling tends to be extremely simple, and the prediction information produced is limited in terms of depth, accuracy and reliability.

Commercial prediction markets also have emerged, in part, as an attempt to address the lack of motivation for individuals to participate in thoughtful prediction behaviors. Many of these systems consist of a speculative market where the current market price of a prediction is interpreted as the probability of an event occurring in the future. The use of real money in these commercial markets has run afoul of various laws and regulations, resulting in such systems being entirely banned in at least some countries. In addition, the focus on trading activity rather than improving the accuracy and precision of the information derived resulted in the introduction of bias and sub-optimal derivation data.

In an effort to remove the commercial bias from the data collection activities, virtual prediction markets also have been introduced. These systems tend to be narrow in their focus and traditionally are relegated to specific niche markets. They are limited in the types of predictions they can host and manage, lack the necessary incentives to encourage lasting engagement by users, and generally offer no way for end users or groups to create their own private solutions without the help of costly third-party consulting. In addition, these systems also have typically required post-collection consulting services for data interpretation and relied on ad-hoc settlement methods, making it time consuming and costly to understand the resulting data and to extend the system to new markets.

Gamification of virtual prediction markets has been used as a mechanism to try and increase interest and participation in the use of such systems. These gamified systems tend to be very simplistic with extremely limited types of predictions and with a focus tending towards the game aspects of the system. They have typically adopted the trading model, suffering from the same disadvantages of the commercial predictive market solutions mentioned previously. The simplistic systems, along with the absence of broad and customizable integration with external services such as blogs, feed readers, search engines, and analytics systems, have not provided sufficient motivation for extended high-volume participation. As a result, there has been a lack of sufficient participation to generate useful aggregated collective probabilities, a lack of demand for the publication of such data, and therefore an inability to substantially monetize data publication.

Further, prior prediction generating or gathering systems are typically rigidly structured by the system provider. They have provided little if any ability for end users or other users of the systems to provide input into establishing a prediction generating, gathering, or reporting program.

BRIEF SUMMARY OF SOME ASPECTS OF THE DISCLOSURE

The applicants believe that they have discovered at least one or more of the problems and issues with prior art systems noted above as well as one or more advantages provided by differing embodiments of the system disclosed in this specification.

Briefly and in general terms, the present invention provides for novel prediction gathering, publishing and/or processing systems, methods of use of such systems, and methods of doing business with such systems. In some embodiments, the system is implemented as a game where at least some of the game players provide predictions about future events. The system can collect, process, and/or publish prediction data, and/or derivation data based on predictions made by participants; and in some embodiments participants can receive certain rewards based on their performance or for other reasons, such as non-performance-based awards to incentivize participation for example.

In certain embodiments, an automated prediction gathering, publishing and/or processing system allows third parties to create their own prediction games. Access to these third party games can be limited to a subset of users, players and/or observers. In certain of these embodiments, these private games can be used to generate odds based solely on the players participating in the private game. In some applications, private and public games that share races, runners and proposition in common can be rolled up into a general odds statistic. Some systems can provide an easy mechanism for creating and joining private games can promote membership generally and increase motivation to participate based on visibility within a familiar group of participants. In some applications, a fee can be assessed for the privilege to exclude private game data from publication and/or global odds calculations.

In some instances, various competitive formats are enabled, such as, for example, equalizing player resources and/or requiring all players to submit a minimum number of predictions. Some of these formats can avoid distortions introduced as a result of disparate weighting by a subset of players controlling disproportionate stakes. Some can require a minimum set of predictions which can help incentivize a player to give greater thought to the selection of seemingly-lower probability picks. In some applications this can possibly improve odds data for a given race.

In certain instances, users are permitted a single ticket for submitting picks. In some of these instances, the ticket cost can vary, but the stakes for all tickets in the game can remain equal. This can, in some applications, avoid disproportionate weighting that can occur as a result of players submitting multiple tickets, while enabling the users to enjoy risking amounts consistent with their interests without impacting the integrity of the odds calculations.

In some instances, the prediction processing system can provide game players or others with access to prediction and/or derivation data. In some embodiments, the derivation data can provide an identification of game players or characteristics of game players, such as for example, those among the game players who are best at making predictions. If desired, game players who are better at making predictions can be provided additional stakes that weight their predictions relative to other players. These additional stakes can be distributed in uniform amounts or in disparate amounts depending upon the performance level of the player as compared to other players, such as other high-achieving players as but one example. The additional application of these stakes by a player can, if desired, weight the predictions of the high-achieving participants, which can result in better-optimized derivative data such as, for example, odds calculations for a particular event.

In some embodiments, the prediction processing system can provide a master game instance. In some embodiments, the master game instance can serve as a template for the generation of a global game instance available to all users of the system. In certain instances, the template game can further serve to support the instantiation of one or more hosted game instances available to identified groups of game players. In some instances, these hosted instances can be private to the identified groups of game players. The prediction data and derivation data related to one or more of the private games of some applications can be combined with the prediction data and derivation data of the global group to generate odds information comprehensive of players participating in the game.

In certain instances, game generation occurs automatically in response to an incoming data feed containing event data and/or in response to users manually providing game configuration information. Enabling automated game generation and user-generated games can, in certain instances, increase the number of available games across different game categories, thus increasing participation levels. Allowing user-generated private games can increase initial membership, which in turn can increase overall participation in the system generally.

In some instances, the prediction processing system can collect and process prediction data, and/or derivation data based on predictions made by game players or identified groups of games players, and provide game players, identified groups of game players, and/or others with access to such prediction or derivation data. In certain embodiments, the derivation data can provide an identification of game players or characteristics of game players, such as for example those among the game players who are best at making predictions.

In some embodiments, the members of groups are dynamically changed, such as for example, when the members of the group representing those among the game players who are the best at making predictions are modified in response to changes in one or more members' prediction accuracy, performance in previous programs, and/or degree of participation. Prediction data and derivation data in some applications can be generated based on predictions made by members of these dynamically changed groups, and doing so may provide greater accuracy than the same data generation based on all game players.

In some embodiments, the prediction processing system allows game players to predict the performance of other game players. In some applications, a given game player's rating can be influenced and/or determined by one or more other game players making predictions about that given game player's prediction performance. In some applications, this rating can be further influenced and/or determined by the weight that one or more players place on their predictions of that given game player's prediction performance. These types of predictions on game players can, in certain instances, facilitate participation through deeper engagement and/or provide more immediate gratification to players, thus encouraging increased overall participation.

In certain instances, the prediction processing system includes one or more feedback mechanisms, which, in certain applications, impact the quality of odds generation such as, for example, by providing to an identified group of game players additional prediction and derivation information derived, in whole or in part, from one or more of the following:
1. predictions made by game players with an accuracy level above a certain threshold;

2. predictions made by game players who are self-identified fans of a category, event, or event participant;
3. predictions made by game players who are self-identified fans of a category, event, or event participant with an accuracy level above a certain threshold;
4. predictions made by game players who have preformed at or above an identified level in recent games; and/or
5. predictions made by game players who have achieved a game player rating, such as, for example, a peer confidence index, at or above an identified level.

In some embodiments, multiple sets of odds can be generated based on the predictions made by identified groups of players. For example, there could be one set of odds based on predictions made by all users, then another set of odds based on predictions made only by experts, and yet another set of odds based on predictions made by the combination of experts and fans. Still another type of information might include weighted odds where the odds calculation weights each participant's prediction differently based on their historical accuracy. The ability to see the various sets of odds is itself additional information that can be made available, if desired, to the high-achieving participants. This process of dynamically grouping participants based on performance, supplying the better-performing participants with additional information, generating more precise and accurate odds as a result of the better-performing participants having better information, and feeding this information back to the better-performing participants can, in at least some systems, create a positive-feedback system that can improve the accuracy of odds calculations over time, and may enable better-performing players to obtain increasing levels of predictive accuracy.

In certain instances, the feedback mechanisms can include supplemental prediction weighting by game players among the group of game players who are the best at making predictions and/or by members of the identified group of game players receiving additional prediction and derivation information. In some embodiments, this supplemental weighting can increase the impact of the predictions made by better-performing players, possibly improving the accuracy of the prediction and derivation data.

In some of these systems, players can purchase a premium level designation that includes access to additional prediction and/or derivation information. In some instances, players can be promoted to the premium level based on exceeding a score threshold in a defined number of previous programs within a defined set of programs. Players can be demoted to a standard level by failing to meet the threshold, or by failing to participate in a required number of programs within a defined set of programs. This and/or other types of tiered level of play can, in some systems, generate odds based only, or at least more so, on predictions made by those participating in the premium level game. In some applications, these types of odds may be more accurate than those generated using the standard level pool. Further, in some applications, this achievement-base tier provides additional motivation to participate and compete, thus increasing the depth, breadth, and duration of participation. In some instances, premium level players can be granted access to exclusive premium level comment threads; and in some applications this can further cultivate the sense of exclusivity and/or promote the desire to achieve.

In some embodiments, the prediction processing system includes a proposal framework that can represent, store, process, and settle a broad set of predictions. This framework can be specific to types of predictions, such as for example, the performance of one or more event participants, the outcome of an event, and/or a combination of predictions across one or more events. The presence of such a modeling framework can, in some embodiments, support the settling of various types of conventional and custom predictions in a systematic and extensible manner, avoiding reliance on ad hoc structures and methods to represent and settle predictions. A further advantage of improved extensibility is the ability to rapidly and broadly offer games that reach underserved markets. This can solicit and empower the related fan base, both in terms of engaging them in game activities, as well as offering them news of interest generally ignored by traditional media. These types of activities and resources can be offered to underserved fans for a fee.

In some instances, the system allows for the creation and association of categories with programs. In some of these embodiments, categories are further associated with one or more template proposals. Propositions specific to a particular event can be automatically generated based on one or more of the template proposals associated with the category of the event. This supports simplified game creation for end users and for feed generated games. In some applications, the system can publish collective intelligence data, such as, for example, prediction information and/or derivative information, to consumers. These consumers can include, for example, individuals, businesses, schools, blogs, social networks, mailing lists, newsreaders, search engines, and/or analytics systems. In certain of these instances, this information can be published as a data feed available to subscribing consumers, thereby providing, in some applications, real-time information and/or updates concerning real-world events. In certain instances, these feeds can be structured data streams, such as, for example, XML feeds, providing a format that is easily received, parsed, processed, and/or displayed by consumer systems.

In some embodiments, the system can provide a Do-It-Yourself ("DIY") interface in which end users and others can establish their own custom prediction program, prediction race, and runners for the race. Some DIY systems allow the user to further establish teams and identify players of a prediction game provided by the system.

Certain DIY applications allow the user to make the status and outcome of a given prediction game publicly viewable or to instead allow only teams and game players of a custom game with access to observing the status and outcome of the game to view the game. Some DIY systems can provide pre-determined types or aspects of prediction programs, such as pre-determined categories of game types from which the user may choose.

In some DIY systems, the user can establish relationships between different runners in differing races or between differing teams within a prediction program. Certain DIY systems allow the user to provide game players with varying types of information about teams and other players, such as links to web pages providing information about a team or player.

All of these and other aspects of the systems and methods disclosed herein can be utilized as a business and, if desired, to generate revenue. Such revenue sources can include, for example:
1. subscriptions to prediction information and related derivative information;
2. in-game purchases;
3. for-fee access to a premium level of play and information;
4. hosted private instances for business, government, non-profits, and others;
5. advertising;
6. for-fee private game play; and 7. fees for DIY prediction program services and/or data reporting.

It is to be understood that this Brief Summary recites some aspects of the present specification, but neither the Background nor this Brief Summary are intended to be limiting. There are many other novel and advantageous aspects of specification; and they will become apparent as this specification proceeds. In this regard, the scope of an issued claim based on this specification is to be determined by the claim as issued and not by whether it addresses an issue noted in the Background or provides a feature, problem solution, or advantage recited in this Brief Summary.

BRIEF DESCRIPTION OF THE DRAWINGS

The applicants' preferred and other embodiments are disclosed in the accompanying drawings in which:

FIGS. 4A through 4U are a series of class diagram of various classes of the crowd service of FIG. 3;

FIGS. 7A through 7Y are a series of class diagram of various classes of the game service of FIG. 3;

FIGS. 9A through 9J are a series of diagrams of various tables of the game database of FIG. 3;

FIGS. 14A through 14F are a series of diagrams of various tables of the analytics database of FIG. 3;

FIG. 17A is a sample inbound Associated Press® XML feed for processing by the feed service of FIG. 3;

FIG. 17B is a sample inbound Global Sports Media® XML feed for processing by the feed service of FIG. 3;

FIG. 35A is an example of an simple xml data feed publication generated by the feed service of FIG. 3 appropriate for RSS readers and desktop widgets;

FIG. 35B is an example of a data-rich xml data feed generated by the feed service of FIG. 3 appropriate for API publication;

FIG. 35C is an example of a JSON data feed generated by the feed service of FIG. 3 appropriate for API publication;

FIG. 41 is a screen capture of a list of members as generated by the crowd service of FIG. 3;

FIG. 44 is a screen capture of a public group page as generated by the crowd service of FIG. 3;

FIG. 46 is a screen capture of a closed game page as generated by the game service of FIG. 3;

FIG. 47 is a screen capture of a ticket page for an active game as generated by the game service of FIG. 3;

FIG. 49A is a screen capture of a group creation page as generated by the crowd service of FIG. 3;

FIG. 49B is a wireframe of a group edit page as generated by the crowd service of FIG. 3;

FIG. 54 is a screen capture of a private games page as generated by the crowd service of FIG. 3;

FIG. 56 is a screen capture showing a submitted set of picks for the scheduled game of FIG. 55;

FIG. 57 is a wireframe of an active game page displaying a series of Will Win Propositions for a sporting event as generated by various services of FIG. 3;

FIG. 58 is a wireframe of an active game page displaying a series of Will Win and Will Win In Range On Propositions for a sporting event as generated by various services of FIG. 3;

FIG. 59 is a wireframe of an active game page displaying a series of Will Win, Will Win In Range On, and Will Win When Sorted On and Propositions for a sporting event as generated by various services of FIG. 3;

FIG. 61 is a wireframe of an active game page displaying a series of Will Win and Compare On Propositions for news events as generated by various services of FIG. 3;

FIG. 63 is a wireframe of an active game page displaying a series of Will Win Propositions for Election events as generated by various services of FIG. 3;

FIG. 65 is a wireframe of an active game page displaying a series of Will Win Propositions for business events as generated by various services of FIG. 3;

FIG. 66 is a wireframe of an active Game page displaying a series of Will Win Propositions for custom events as generated by various services of FIG. 3;

FIG. 67 is a wireframe of a comment thread involving the placing and settling of a side bet according to the an exemplary embodiment disclosed herein;

FIG. 69 is a wireframe of various options for sharing system content;

FIG. 70 is a wireframe showing the creation of a new proposition and assignment of the proposition to one or more categories;

FIG. 71 is a wireframe showing the creation of a new game and the selection of propositions from the set of available propositions for games in the applicable category;

FIG. 73 is a screen capture of a system administrator interface, which is generated by the crowd service of FIG. 3, for creation of a program for an End User;

FIG. 74 is a screen capture of the system administrator interface for adding races and runners to the program created through the FIG. 73 screen capture;

FIG. 75 is screen capture of the system administrator interface for adding a team to the program created through the FIG. 73 screen capture;

Figure 76:
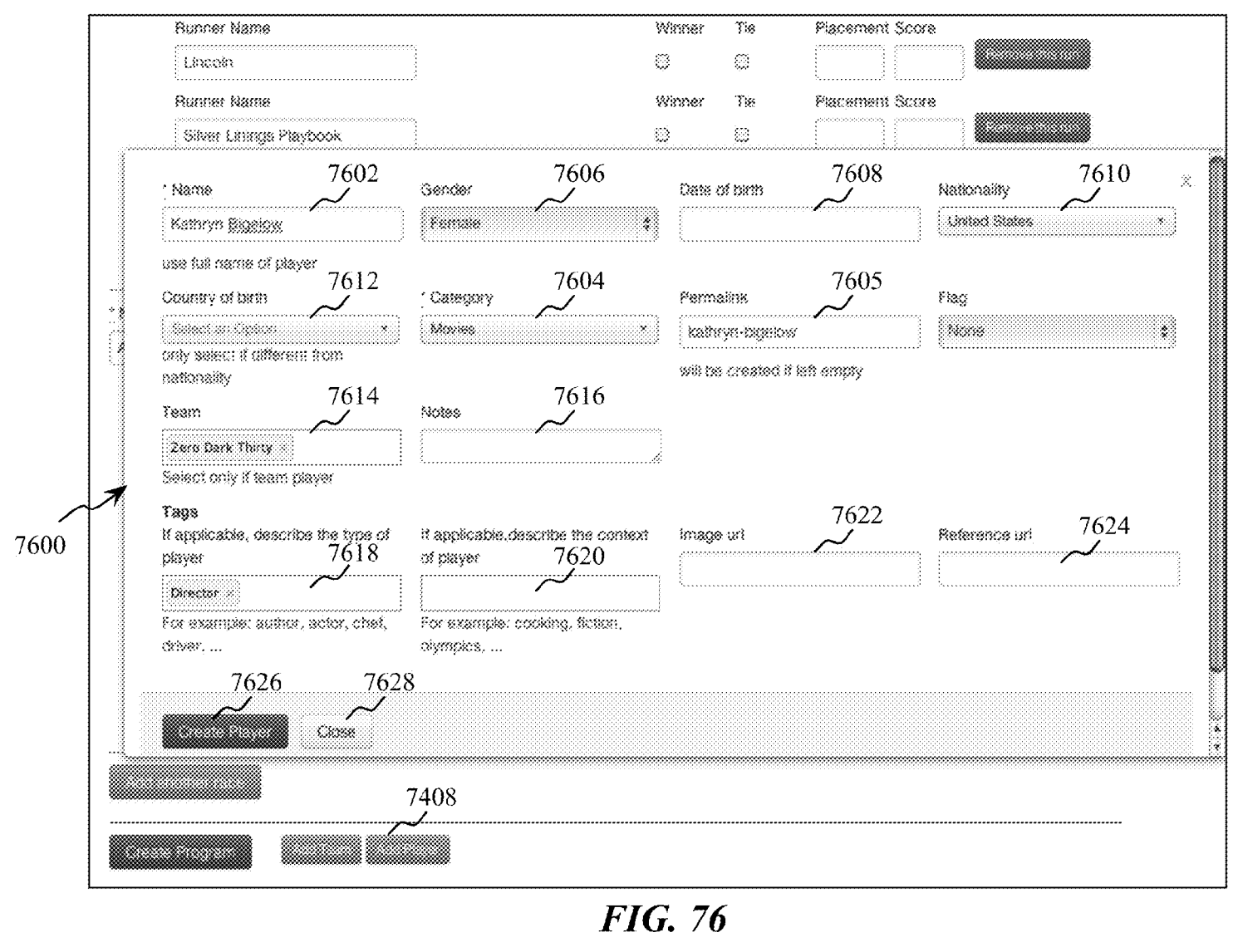

FIG. 76 is a screen capture of the system administrator interface for adding a player to a program created through the FIG. 73 screen capture;

FIG. 79 is a wireframe of the End User DIY interface for assigning a competition to an End User's program;

FIG. 83 is a wireframe of the End User DIY interface for adding runners to an End User's prediction program;

FIG. 86 is a wireframe of the End User DIY interface for creating a new player for an End User's program.

DETAILED DESCRIPTION OF THE PREFERRED AND OTHER EMBODIMENTS

Figure 1:
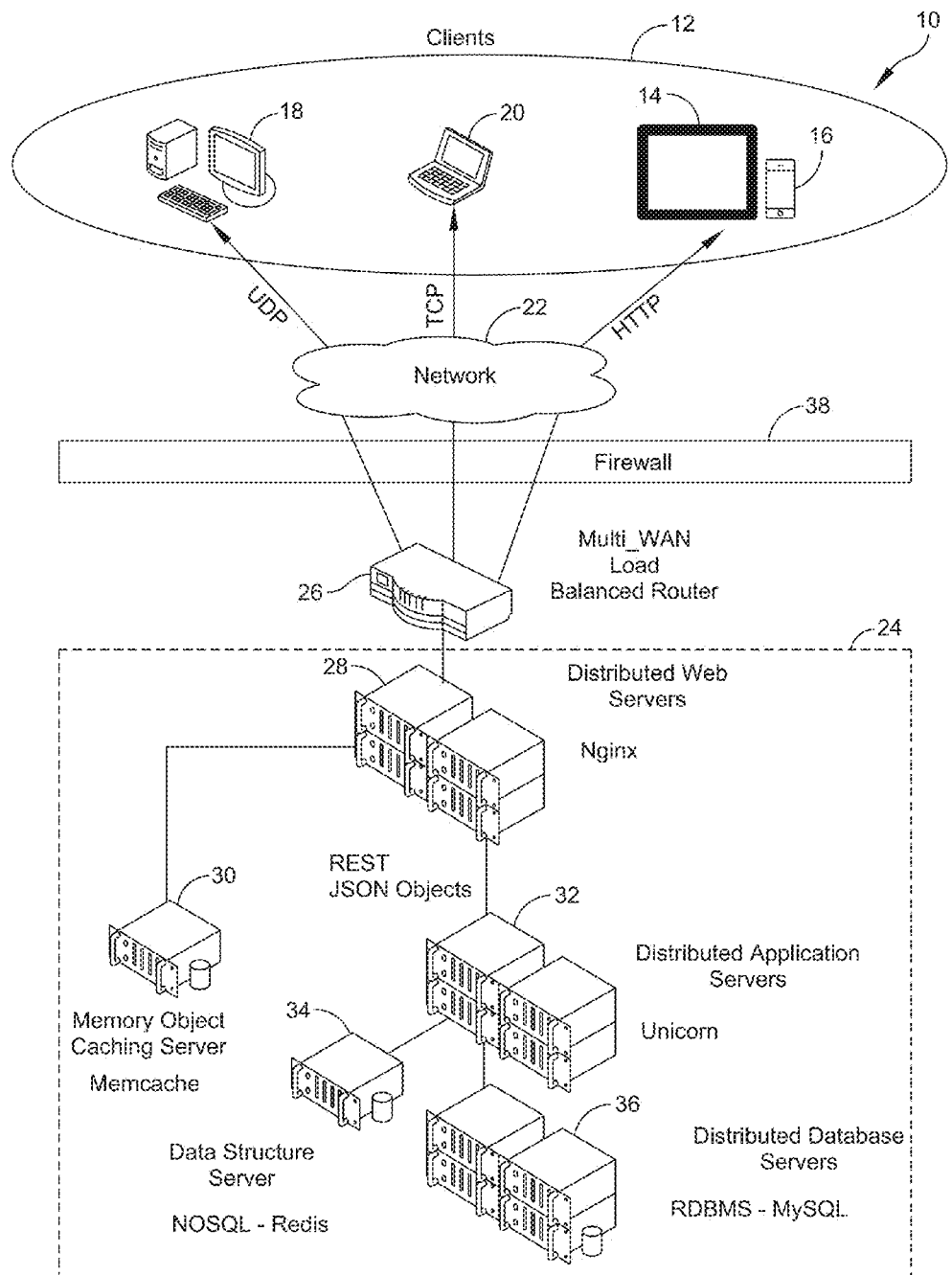
FIG. 1 is a computer network or similar digital processing environment in which a prediction processing system can be implemented according to an exemplary embodiment.

Broadly, this disclosure is directed towards a prediction gathering, publishing and/or processing system, method of use of such systems, and methods of doing business with such systems. The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The following is an alphabetically sorted glossary of terms used in this patent application:

| Term | Definition |
| --- | --- |
| Accuracy | A percentage measuring predictive quality, calculated by dividing the number of correct Predictions by the number of all Predictions. |
| Badge | An indicia used as a reward in the system. |
| Bonus | A reward of In-Game Currency based on the performance of a Game Player. |
| Bonus Coins | A reward of In-Game Currency that can be used in more than one Game. |
| Category | A label associated with one or more Programs and/or Runners. |
| Category Accuracy Percentage | A percentage measuring predictive skill, calculated by dividing the number of correct Predictions by a Player by the number of all Predictions made by one or more Players on Races in a given Category |
| Coin | An In-Game Currency unit of value. |
| Confidence | A percentage for a Game outcome, calculated by dividing the number of unweighted Predictions on that outcome by the number of unweighted Predictions on all outcomes. |

-continued

| Term | Definition |
|---|---|
| Demotion | Changing a Player's designation from a higher designation to a lower designation. |
| Derivation Data | The data derived from Prediction data or Prediction data in combination with other data. |
| End User | A User who uses the prediction system but not, at the time of such use, in a prediction system administrative capacity (i.e, not having access to the prediction system back-end); can include, for example, Members, moderators, Players, Observers, and/or Subscribers. |
| Event | A perceivable occurrence. |
| Expert | A system-determined User designation for a Player whose Accuracy is above a defined performance level. |
| Expert Odds | The odds on a given Prediction, calculated using the weighted Predictions of Players designated as Experts. |
| Expert Threshold | A performance level - for example, a level of Accuracy that triggers the Expert designation. |
| Expert's Accuracy | The number of correct Predictions by a Player as a percentage of all Predictions made by that Player on a defined set of Runs, Races, or Programs. |
| Experts' Confidence | A percentage for a Game outcome, calculated using the Confidence of Players designated as Expert. |
| Fan | Association of a Player with one or more Runners. |
| Fan's Accuracy | The number of correct Predictions by a Player as a percentage of all Predictions made by that Player on a Runner of whom the Player is a Fan on a defined set of Runs, Races, or Programs. |
| Fans' Confidence | A percentage for a Game outcome, calculated using the Confidence of Players designated as Fans. |
| Fans' Odds | The odds on a given Prediction, calculated using the weighted Predictions of one or more Players designated as Fans. |
| Follower | A user association in which a user subscribes to an information feed or report associated with a particular Player. |
| Friend | A user association in which two Users in the system mutually agree to a Follower association. |
| Game | A playable instance of a Program. |
| Game Player | See "Player." |
| Game Stake | An amount of In-Game Currency for weighting Predictions in a given Game. |
| Global Level | The game tier of a Program to which all Players have access. |
| Global Odds | The odds on a given Prediction, calculated using the weighted Predictions or Picks made by all Players on a given Runner in a given Race. |
| Group | A set of Users. |
| Group Pool | A sub-pool of the Proposition Pool as defined by a subset of Players with Picks associated with said Proposition Pool. |
| Group Level Odds | Odds calculation for a subset of all Players of a given Game. |
| In-Game Currency | The mediums of exchange for the system. |
| In-World Currency | Money in any form that is in actual use or circulation and functions as a medium of exchange. |
| Medal | An indicia relating to Player performance used in the reward system. |
| Member | A User of the system with an associated User profile and access to social functions within the system. |
| Observer | A User that is observing one or more Games. |
| Participant | See "Player." |
| Peer Confidence Index | A rating of a player's ability to perform well as a function of picks placed on that player as a Runner by other members. |
| Pick | A Prediction weighted by an amount of In-Game Currency taken from a Player Stake. A Player can make Picks on Runs by Runners in Races, and on Programs. Picks in a real money gambling context would commonly be knows as bets. |
| Player | A User that that participates in one or more Games. |
| Pool | An amount of In-Game currency. |
| Prediction | A statement that a given Proposition will be true for a given Run, Race or Program. |
| Prediction Odds | A ratio, calculated by dividing the Proposition Pool by the Prediction Pool. |
| Prediction Pool | Total amount of the In-Game Currency used to weight one Prediction for a given Proposition. Global Odds can be calculated by dividing the Prediction Pool by the Proposition Pool. |
| Prediction Program | See "Program" |
| Premium Information | Information useful for making accurate Predictions and skillful Picks provided to a subset of Players. |
| Premium Level Players | Players given access to Premium Information. These can be players that have purchased a premium designation, and/or players of a program whose score in previous programs in the same category exceeds a defined threshold. |
| Private Odds | The odds calculation for a particular private Game based on Predictions made by Players participating in the Private game. |
| Program | One or more Races and associated attribute values. Programs may also include other Programs. |
| Promotion | Changing a Player's designation from a lower designation to a higher designation. |
| Proposal | An abstract structure and method for storing, processing and settling Predictions. |
| Proposition | A statement about a knowable result of a Race. |
| Proposition Pool | The total amount of In-Game Currency used to weight the set of all Predictions for a given Proposition. Global Odds can be calculated by dividing the Prediction Pool by the Proposition Pool. |
| Race | A competitive context where there exist mutually exclusive outcomes. It can include one or more Runs by one or more Runners. |
| Real-World Event | See "Event." |
| Runner | A thing, User, Group, competitor, or team that takes part in a Race, and can be the subject of a Proposition. |
| Run | A single occurrence of a Runner participating in a Race. |
| Search Tag | The metadata describing and/or representing searchable content that is itself a search term. |
| Side Bet | An ad-hoc bet made between at least two Players and/or Observers. |
| Stack | The amount of In-Game Currency available to a particular Player for a particular Game. |
| Stake | A specified amount of In-Game Currency for weighting predictions. |
| Standard Player | A Player without access to Premium Information. |
| Subscriber | A User that receives direct output from the system. |
| Ticket | The structure storing information relating to a Player's Picks for a Game. |
| User | A person or external system that interacts with and/or receives direct output from the prediction system which can include, for example, Members, administrators, moderators, Players, Observers, and/or Subscribers. |
| Virtual Currency | See "In-Game Currency." |
| Virtual Good | An in-game non-physical object. |
| Wallet | The total amount of In-Game Currency associated with a Member. |
| Window | A period of time, in which Players are allowed to submit Predictions for a particular Game. |

-continued

| Term | Definition |
| --- | --- |
| Winner's Pool | An amount of In-Game currency designated for distribution to one or more Players as a result of settling a Proposition. |

Certain embodiments of the prediction processing system and methods are described with reference to methods, apparatus (systems), and computer program products that can be implemented by computer program instructions. These computer program instructions can be provided to a processor of a general purpose computer, special purpose computer, mobile computing device, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices such as, for example, a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a computer terminal. In the alternative, the processor and the storage medium can reside as discrete components in a computer terminal Depending on the embodiment, certain acts, events, or functions of any of the methods described herein can be performed in a different sequence, can be added, merged, or left out all together (e.g., not all described acts or events are necessary for the practice of the method). Moreover, in certain embodiments, acts or events can be performed concurrently such as, for example, through multi-threaded processing, interrupt processing, or multiple processors or processor cores, rather than sequentially. Moreover, in certain embodiments, acts or events can be performed on alternate tiers within the architecture.

With reference now to FIG. 1, a computer network or similar digital processing environment 10 in which the system and method disclosed can be implemented. The present systems and methods can also run on different architectures that include a LAN, WAN, stand-alone PC, stand-alone mobile device, a stand-alone, clustered, or networked mini or mainframe computers, etc. The prediction processing system and method of use can be distributed on multiple computers and devices 12, 24.

FIG. 1 is representative of many specific computing arrangements that can support the system and method disclosed. In one embodiment, the software implementing the prediction processing system runs in the Linux® environment. In another embodiment, the software is implemented to run in other environments, such as Windows®, UNIX°, or in any hardware having enough power to support timely operation of software such as that identified in FIG. 1. In some implementations of the prediction processing system, the Ubuntu® 12.04 LTS Linux distribution is deployed on one or more server computers 24. In an alternate embodiment, computers are deployed as virtual instances rather than physical computers.

A load balancing router 26, such as for example, the Peplink® Multi Wan Router can distribute traffic inside a firewall 38 to and from web server computers 28. In some deployments, these webservers 28 are distributed instances of an Nginx web server distribution. A memory object server 30 deploying a caching model such as, for example, memcache, and one or more distributed application servers 32 are communicatively coupled to one or more of the distributed web servers 28. In some deployments, the distributed application servers 32 are running instances of application servers such as, or example, Unicorn®. The application servers 32 are communicatively coupled to computers 34, 36 hosting one or more persistent data stores. This data stores can be distributed databases such as, for example, MySQL° or Postgres and/or high-performance key/value stores such as Redis®, which can be used to queue queries and to store nodes and derivative data generated by the analytics service 88 of FIG. 3.

Client computers of various types 12 can connect to a remote server infrastructure 24 via a network 22 over a communication protocol. All computers can pass information as unstructured data, structured files, structured data streams such as, for example, XML, structured data objects, and/or structured messages. Client computers 18, 20, 14, 16 may communicate over various protocols such as, for example, UDP, TCP/IP, and/or HTTP.

Client computers and devices 18, 20, 14, 16 and server computers 24 provide processing, storage, and input/output devices executing application programs. Client computers 12 can also be linked through communications network 22 to other computing devices, including other client devices/processes 12 and server computers 24. In some embodiments, server computers 30, 34, 36 run software to implement centralized persistent data storage and retrieval. The network 22 can be a local area network and/or a wide area network that is part of a remote access network, a global network (e.g., the Internet), a worldwide collection of computers, and/or gateways that currently use respective protocols (TCP/IP, UDP, etc.) to communicate with one another. Multiple client computer devices 12 may each execute and operate instances of the applications accessing the prediction processing system servers.

On reading this disclosure, those of skill in the art will recognize that many of the components discussed as separate units may be combined into one unit and an individual unit may be split into several different units. Further, the various functions could be contained in one computer or spread over several networked computers and/or devices. The identified components may be upgraded and replaced as associated technology improves and advances are made in computing technology.

Figure 2:
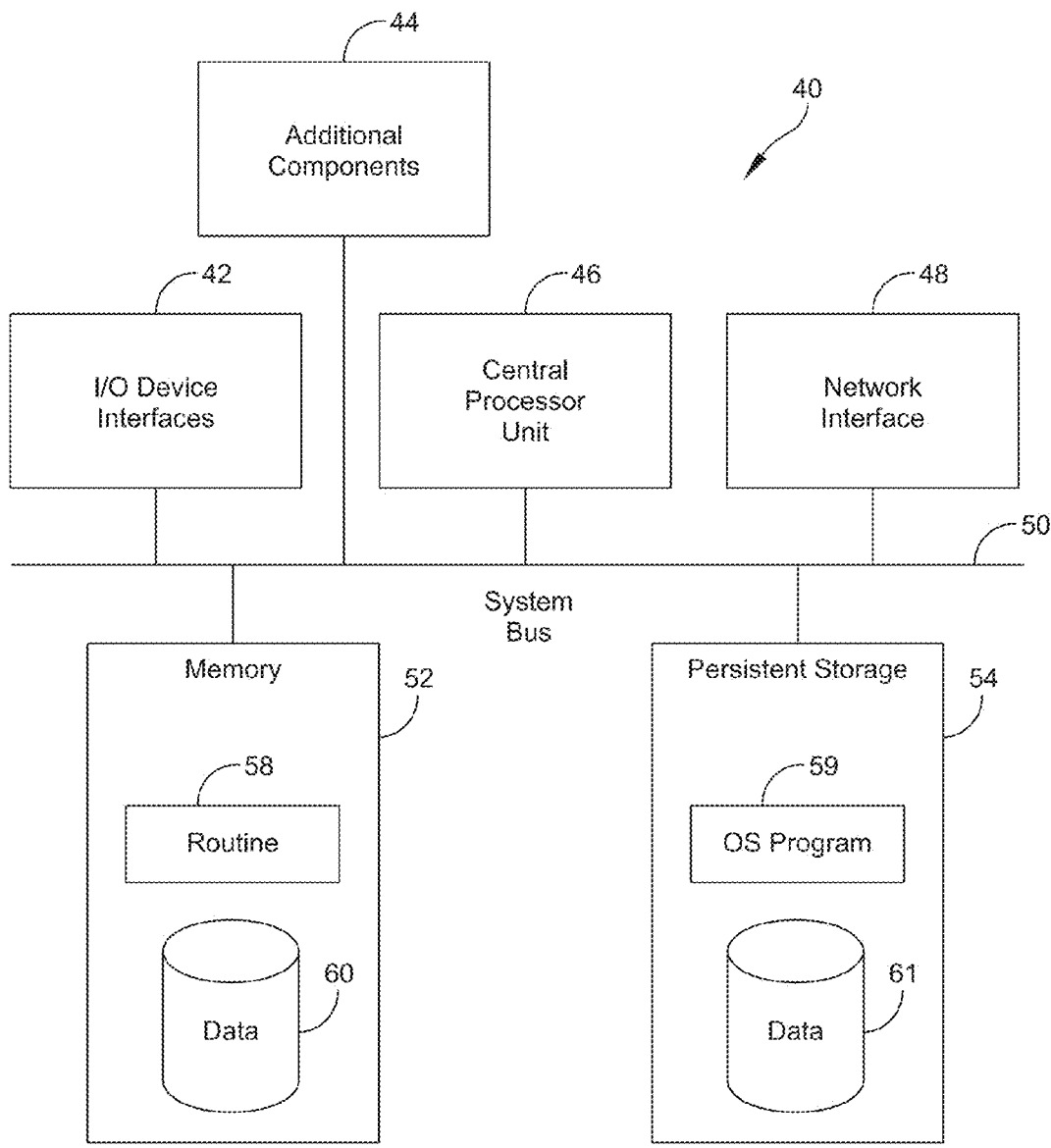
FIG. 2 is a block diagram of the internal structure of a computer used in the computer network of FIG. 1.

With reference to FIG. 2, each component of the system 40 is connected to a system bus 50, providing a set of hardware lines used for data transfer among the components of a computer or processing system. Also connected to the bus 50 are additional components 44 of the prediction processing system, such as additional memory storage, digital processors, network adapters, and I/O devices. The bus 50 is essentially a shared conduit connecting different elements of a computer system (e.g., processor, disk storage, memory, input/output ports, network ports, etc.) and enabling transfer of information between the elements. An I/O device interface 42 is attached to system bus 50 in order to connect various input and output devices (e.g., keyboards, mouses, touch-screens, displays, printers, speakers, etc.) to the prediction processing system. A network interface 48 allows the computer to connect to various other devices attached to a network (e.g., network 22 of FIG. 1). A memory 52 provides volatile storage for computer software instructions 58 and data 60 used to implement methods employed by the system disclosed herein. Disk storage 54 provides non-volatile storage for computer software instructions 59 and data 61 used to implement an embodiment of the present disclosure. A central processor unit 46 is also attached to system bus 50 and provides for the execution of computer instructions.

In one embodiment, the processor routines 58 and data 60 are a computer program product, including a computer readable medium (e.g., a removable storage medium such as one or more DVDROM's, CD-ROM's, diskettes, tapes, etc.) that provides at least a portion of the software instructions for the system. A computer program product that combines routines 58 and data 60 may be installed by any suitable software installation procedure, as is well known in the art. In another embodiment, at least a portion of the software instructions may also be downloaded over a cable, communication, and/or wireless connection.

Figure 3:
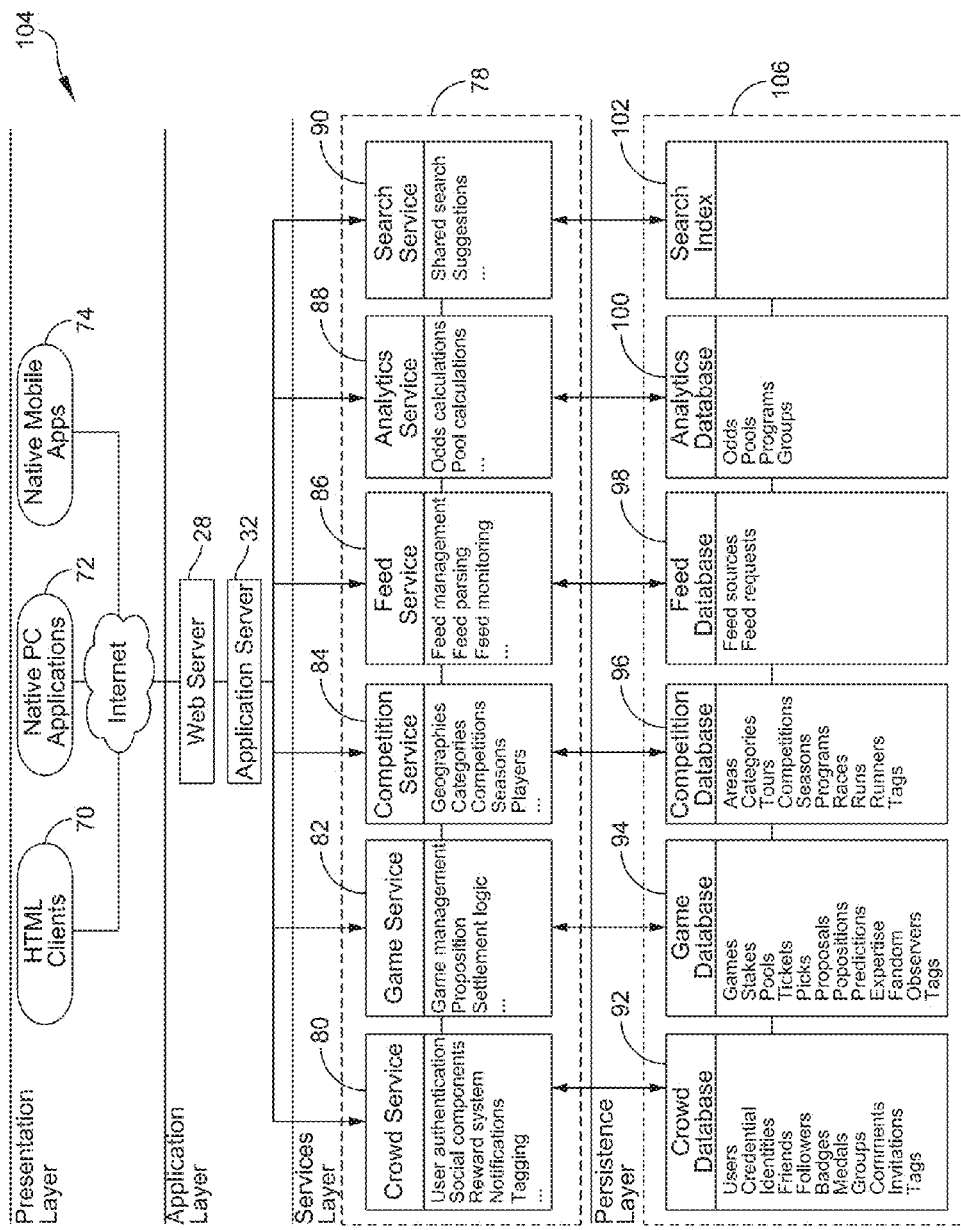
FIG. 3 is an application layer diagram of the prediction processing system in the embodiment of FIG. 1.
Figure 5:
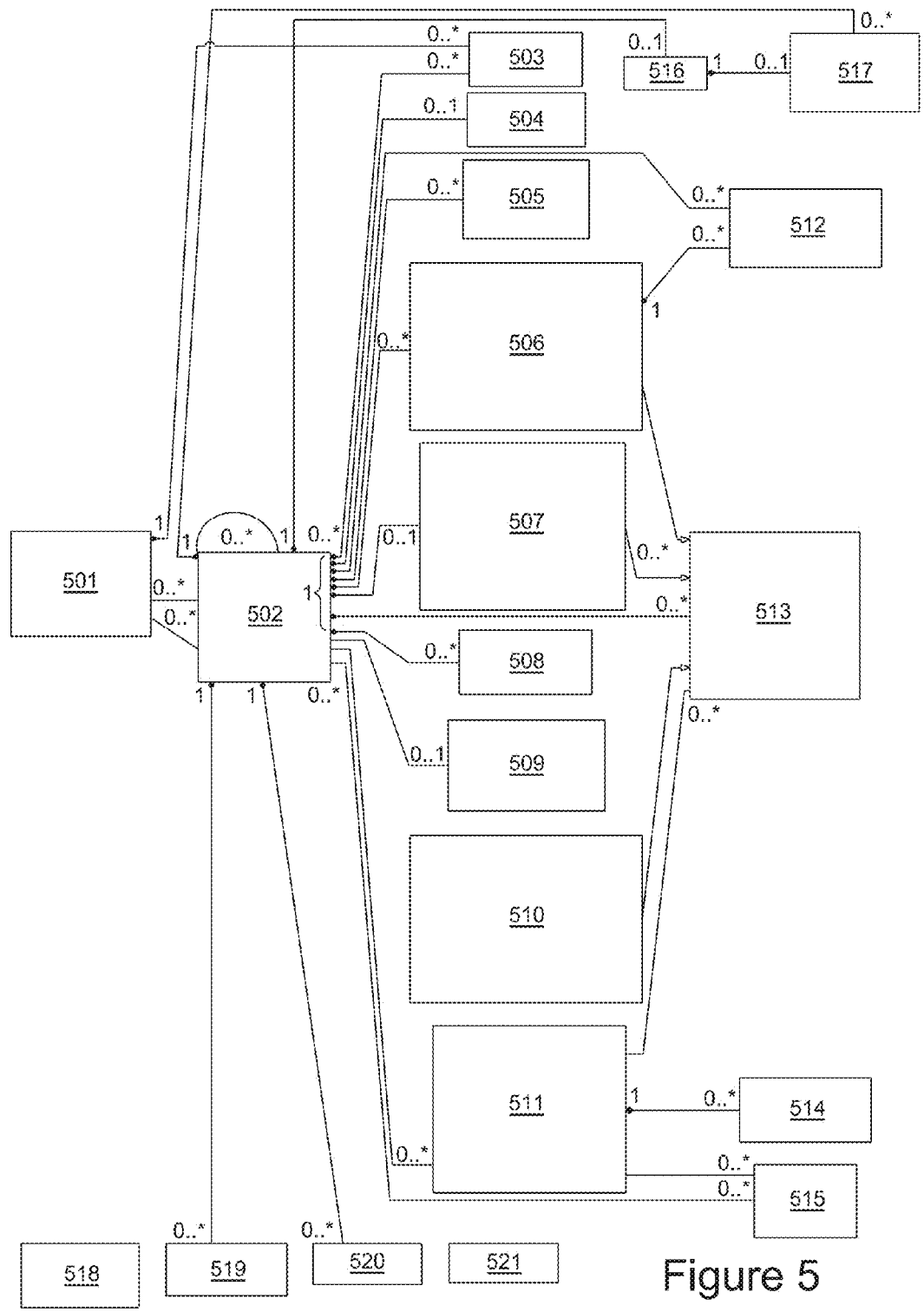
FIG. 5 is a relational class diagram for the classes supporting the crowd service of FIG. 3.

With reference now to FIG. 3, client devices can provide user interfaces to the functions of the prediction processing system services 78. Such interfaces can be browser-based and/or application-based. In some embodiments, these applications can include application containers such as html clients 70, native computer applications 72, and/or native mobile apps 74.

The prediction processing system architecture 104 can include a services layer 78 that exposes a variety of discreet services accessible to authorized clients 70, 72, 74. It is through these services that information can be added to, and retrieved from, the databases found in the persistence layer 106. The services layer 78, together with the persistence layer 106, can, in part, consist of a collection of distributed classes and data stores providing the prediction processing system functionality.

In some embodiments, the crowd service 80 provides classes and associated methods and data structures for prediction processing system social functionality and user-centric functionality. These classes are supported by data and data relations stored in a crowd database 92.

The game service 82 provides classes and associated methods and data structures for prediction processing system game operation functionality. These classes are supported by data and data relations stored in a game database 94.

The competition service 84 provides classes and associated methods and data structures for prediction processing system competition management functionality. These classes are supported by data and data relations stored in a competition database 96.

The feed service 86 provides classes and associated methods and data structures for prediction processing system data feed processing functionality. These classes are supported by data and data relations stored in a feed database 98.

The analytics service 88 provides classes and associated methods and data structures for prediction processing system calculation and reporting functionality. These classes are supported by data and data relations stored in a analytics database 100. In some embodiments, the analytics service 88 extracts data from other services as part of the calculation functionality.

The search service 90 provides search-related functionality for the prediction processing system. One or more search indices 102 provide support for the search service 90.

Figure 6Q:
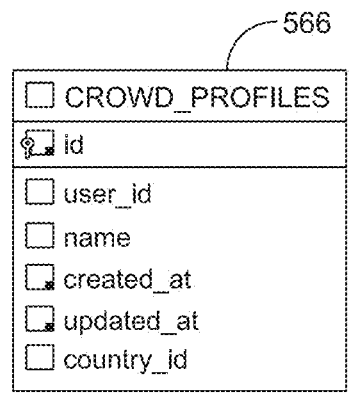
FIGS. 6A through 6T are a series of diagrams of various tables of the crowd database of FIG. 3.
Figure 6R:
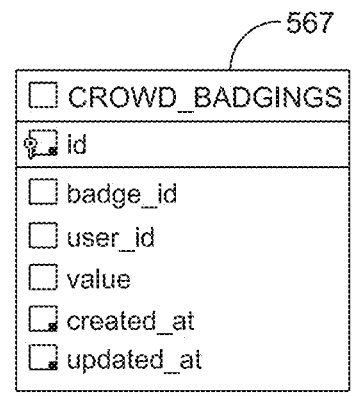
Figure 6S:
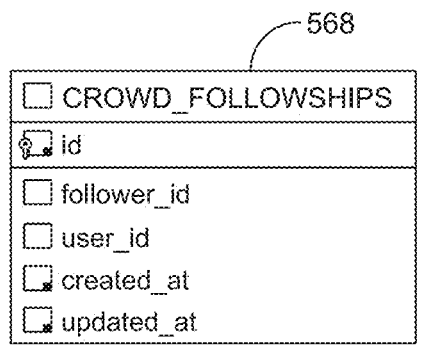
Figure 6T:
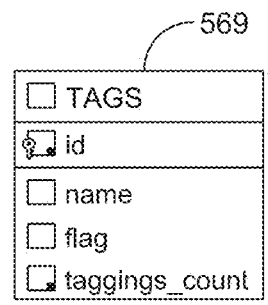

With reference now to FIG. 4A through FIG. 4U, a series of class diagrams of various classes of the crowd service 80 (from FIG. 3) are described for implementing the prediction processing system 104 according to an exemplary embodiment. FIG. 6A through FIG. 6T describe a series of database tables supporting the crowd service classes.

A Crowd::User class 502 stores member information and is supported by a CROWD_USER database table 553. A Crowd::Identity class 517 stores the social identities for a given member, such as, for example, their Facebook® identity, Twitter® identity, or other social network identification and is supported by the CROWD_IDENTITIES database table 559. A Crowd::Credential class 516 stores username and password credentials and is supported by the CROWD_CREDENTIALS database table 564. A Crowd::Profile class 504, in combination with the CROWD_PROFILES table 566, serves as a translation table for storing country-specific translations of a user names. A Crowd::Avatar class 509 stores the member-specific images associated with particular members and is supported by the CROWD_AVATARS database table 556. A Crowd::Group class 511, in combination with a CROWD_GROUPS table 551, stores collections of users. A Crowd::Membership class 514, in combination with the CROWD_MEMBERSHIP database table 563, provides a join model between groups and users. Groups can have many users through membership. A Crowd::Invitation class 513 stores the sender and recipient information for invitations from a member to another member to join a group or game, or from a member to a non-member to become a member. The CROWD_INVITATION table 550 supports this class. A Crowd::SystemInvitation class 506 stores invitations to existing members, and a Crowd::SiteInvitation class 507 stores invitations to non-members to become members of the system. Both of these classes are supported by the CROWD_INVITATIONS database table 550. A Crowd::FacebookInvitation class 510 allows members with Facebook® credentials to send invitations to their Facebook® friends through the Facebook® interface. The CROWD_INVITATIONS database table 550 supports this class. A Crowd::Userinvitation class 512 joins multiple members to a system invitations and is supported by the CROWD_USER_INVITATION database table 557. A Crowd::Friendship class 519 associates members to one another and is supported by the CROWD_FRIENDSHIP database table 565. A Crowd::Followship class 520 allows one member to follow the activities of another member and is supported by the CROWD_FOLLOWSHIP database table 568. A Crowd::Comment class 505 stores user comments relating to groups and games. The CROWD_COMMENTS database table 560 supports this class. A Crowd::Badge class 501 stores various types of performance-based member rewards and is supported by the CROWD_BADGES database table 552. A Crowd::Badging class 503 joins a particular type of badge to a member. The CROWD_BADGINGS database table 567 supports this class. A Crowd::Activity class 508 and/or a Crowd::TimelineEvent class 515, in combination with the CROWD_ACTIVITIES table 562 and the TIMELINE_EVENTS table 554 respectively, store the activities of users. A Crowd::Page class 518 stores content for use in web pages and is supported by the CROWD_PAGES database table 561. A Crowd::RewardsObserver class 521 is a utility class that monitors groups and comments, determining whether badges or rewards should be given based on a members level of social activity. A CROWD_PAGE_TRANSLATIONS database table 555 stores translations of the page class content based on locale. The TAGS database table 569 stores taxonomy tags for the classes which are then tied to taggable objects through the TAGGINGS database table 558.

With reference now to FIG. 6, detailed class relations for the crowd service classes in FIGS. 4A through 4U are described using standard UML connector types.

With reference to FIG. 7A through FIG. 7Y, a series of class diagram of various classes of the game service 82 (from FIG. 3) are described for implementing the prediction processing system 104 according to an exemplary embodiment. FIG. 9A through FIG. 9J describe a series of database tables supporting the game service classes.

Figure 25:
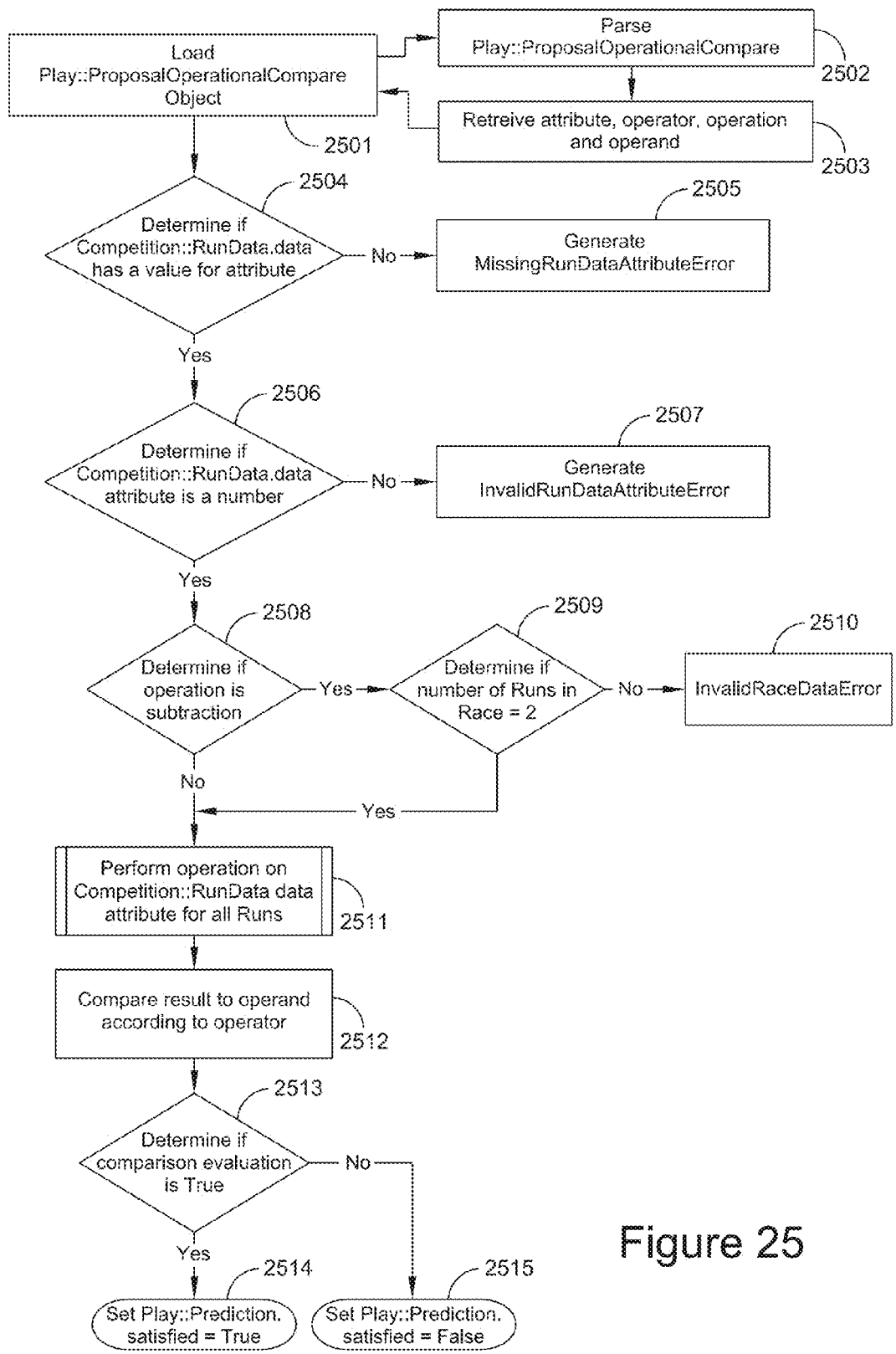
FIG. 25 is a flow chart of a process for settling an Compare Operation Proposal in the game service of FIG. 3.
Figure 26:
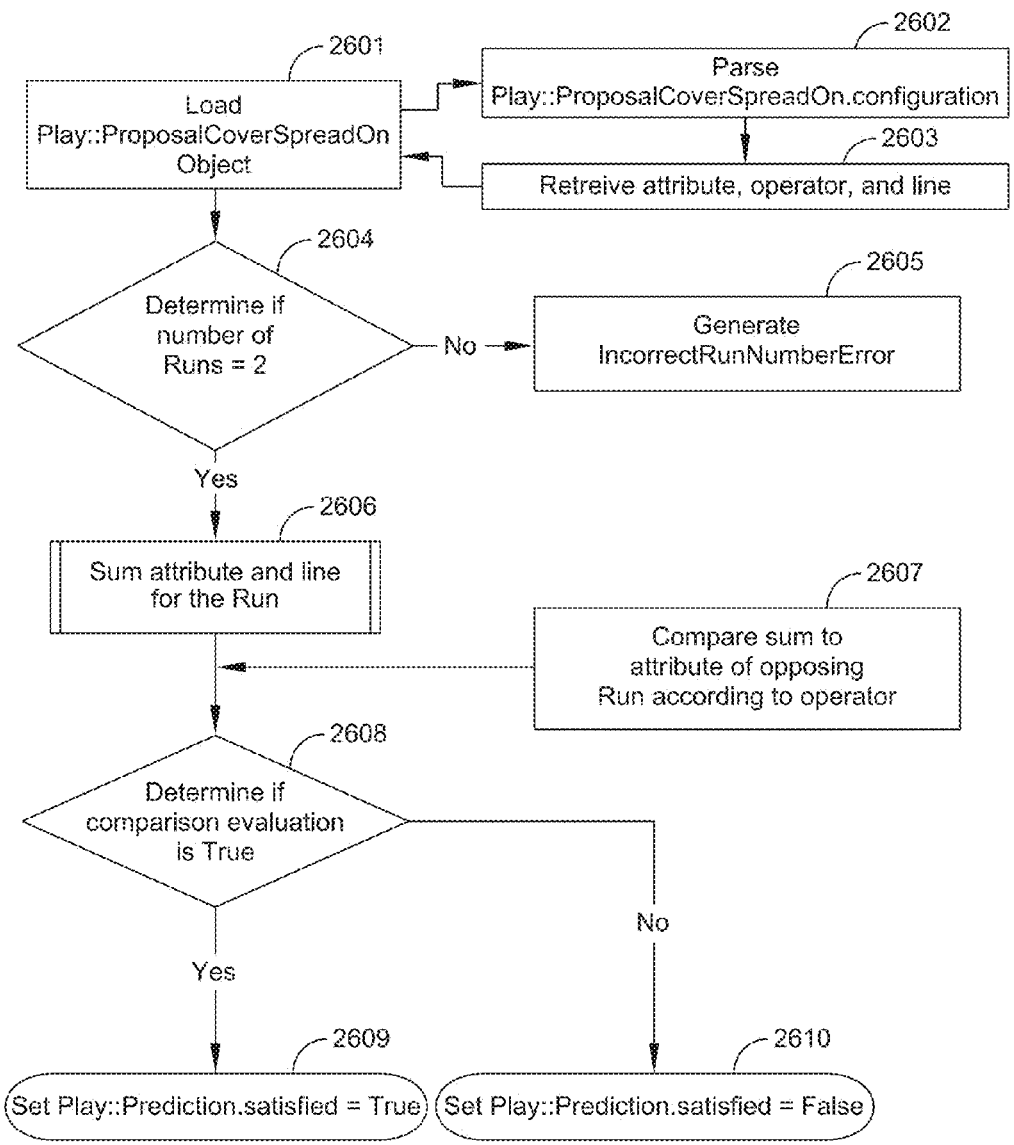
FIG. 26 is a flow chart of a process for settling a Cover Spread On Proposal in the game service of FIG. 3.

A Play::Propsal class 712 provides a settlement model for settling predictions and is supported by a PLAY_PROPOSALS database table 755. A Play::ProposalWillWinWithHigherPercentageOn class 701 implements the settlement model for the Win With Percentage On Proposal type of FIG. 23. The PLAY_PROPOSALS database table 755 supports this class. A Play::ProposalCoverSpreadOn class 704 implements the settlement model for the Cover Spread On Proposal type of FIG. 26. The PLAY_PROPOSALS database table 755 supports this class. A Play::CompareOn class 702 implements the settlement model for the Compare On Proposal type of FIG. 19. The PLAY_PROPOSALS database table 755 supports this class. A Play::ProposalWillWinInRangeOn class 705 implements the settlement model for the Will Win In Range On Proposal type of FIG. 21. The PLAY_PROPOSALS database table 755 supports this class. A Play::ProposalFirstWithDifference class 703 implements the settlement model for the First With Difference On Proposal type of FIG. 22. The PLAY_PROPOSALS database table 755 supports this class. A Play::ProposalWillBeFirstWhenSortedOn class 706 implements the settlement model for the Will Be First When Sorted On Proposal type of FIG. 20. The PLAY_PROPOSALS database table 755 supports this class. A Play::ProposalWillTie class 707 implements the settlement model for the Will Tie Proposal type of FIG. 24. The PLAY_PROPOSALS database table 755 supports this class. A Play::ProposalOperationalCompare class 711 implements the settlement model for the Compare Operation Proposal On type of FIG. 25. The PLAY_PROPOSALS database table 755 supports this class. A Play::ProposalWillWin class 708 implements the settlement model for the Will Win Proposal type of FIG. 18. A Play::ProposalWillWinInRange class 709 implements the settlement model for the Will Win In Range On Proposal type of FIG. 21. The PLAY_PROPOSALS database table 755 supports this class. A Play::Parlayable class 710 is a join model joining parlay proposals to predictions. A Play::Proposition class 713 is a join model tying a prediction to a proposal and is supported by a PLAY_PROPOSITIONS database table 759. A Play::Prediction class 715 stores statements that a given proposition will be true for a given run, race or program. The PLAY_PREDICTIONS database table 751 supports this class. Play::Game class 714 stores playable instances of a program and is supported by the PLAY_GAMES database table 750. A Play::Ticket class 717 stores all the picks by users for a given game. The PLAY_TICKETS database table 752 supports this class. A Play::Pick class 718 stores the number of coins placed on a given prediction and is supported by the PLAY_PICKS database table 754. A Play::Pool class 716 stores the total number of coins placed on a given proposition for a race. The PLAY_POOLS database table 758 supports this class. A Play::Expertise class 719 stores total games played by users and total games won and lost for users in a given category. The PLAY_EXPERTISE database table 756 supports this class. A Play::Fandom class 720 stores total predictions and total correct predictions for a given runner A PLAY_FANDOMS database table 757 supports this class. A Play::Standing class 725 stores the number of bonus coins earned, ranking, total score, and global decile of users. The PLAY_STANDINGS database table 753 supports this class. A Play::PredictionObserver class 721 is an alternative class for settling and updating picks. A Play::ProgramObserver class 722 monitors programs for the presence of a closure state, then updates and finalizes games and associated tickets. A Play::RaceObserver class 723 monitors a competition and updates tickets in accordance with changes detected.

Figure 8:
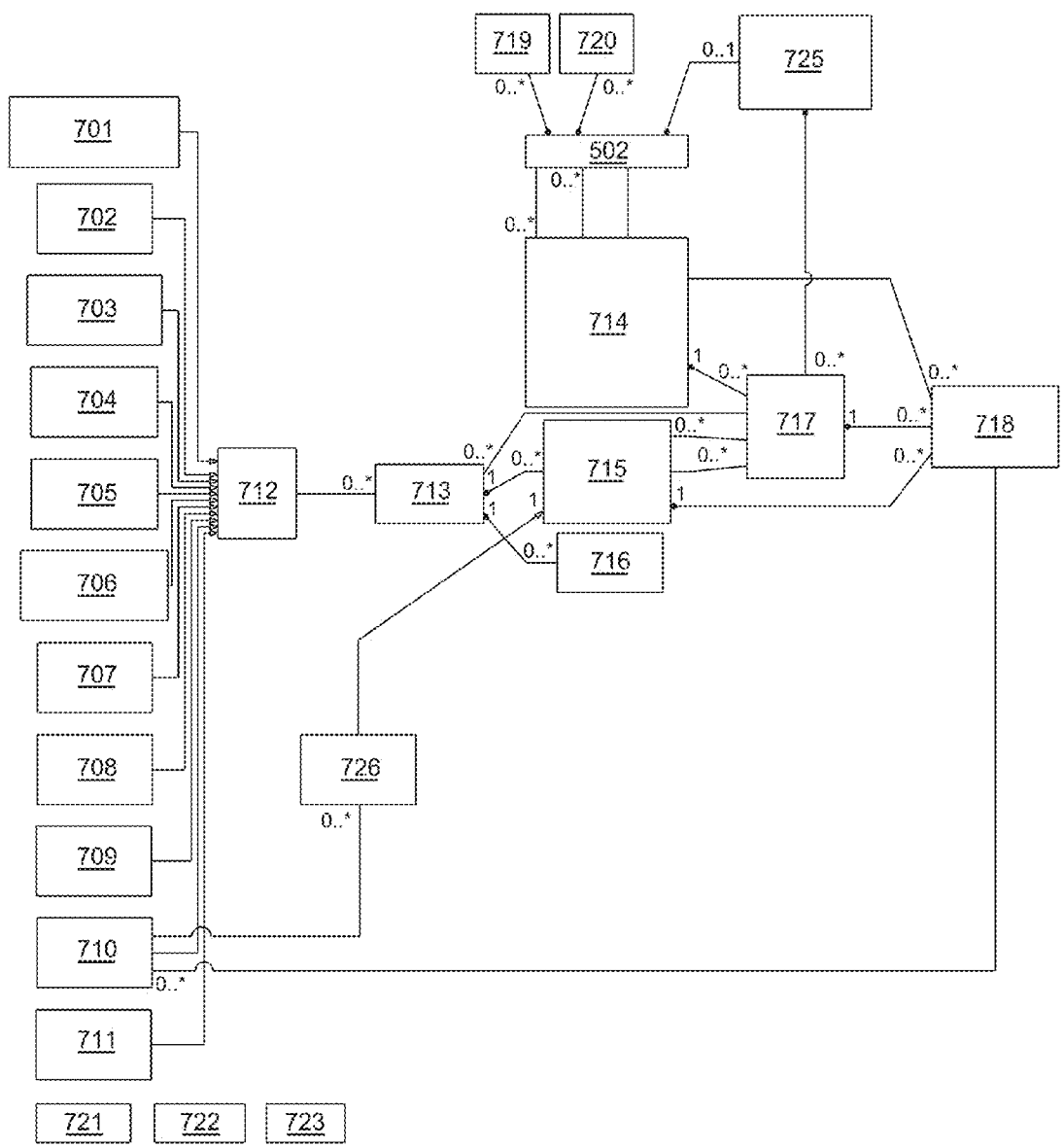
FIG. 8 is a relational diagram for the classes supporting the game services of FIG. 3.

Referring now to FIG. 8, detailed class relations for the game service classes in FIGS. 7A through 7Y are described using standard UML connector types.

Figure 10S:
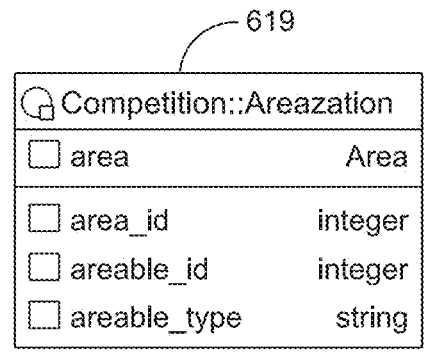
FIGS. 10A through 10T are a series of class diagrams of various classes of the competition service of FIG. 3.
Figure 10T:
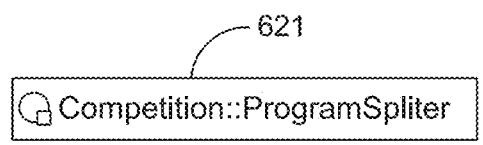
Figures 12A, 12B:
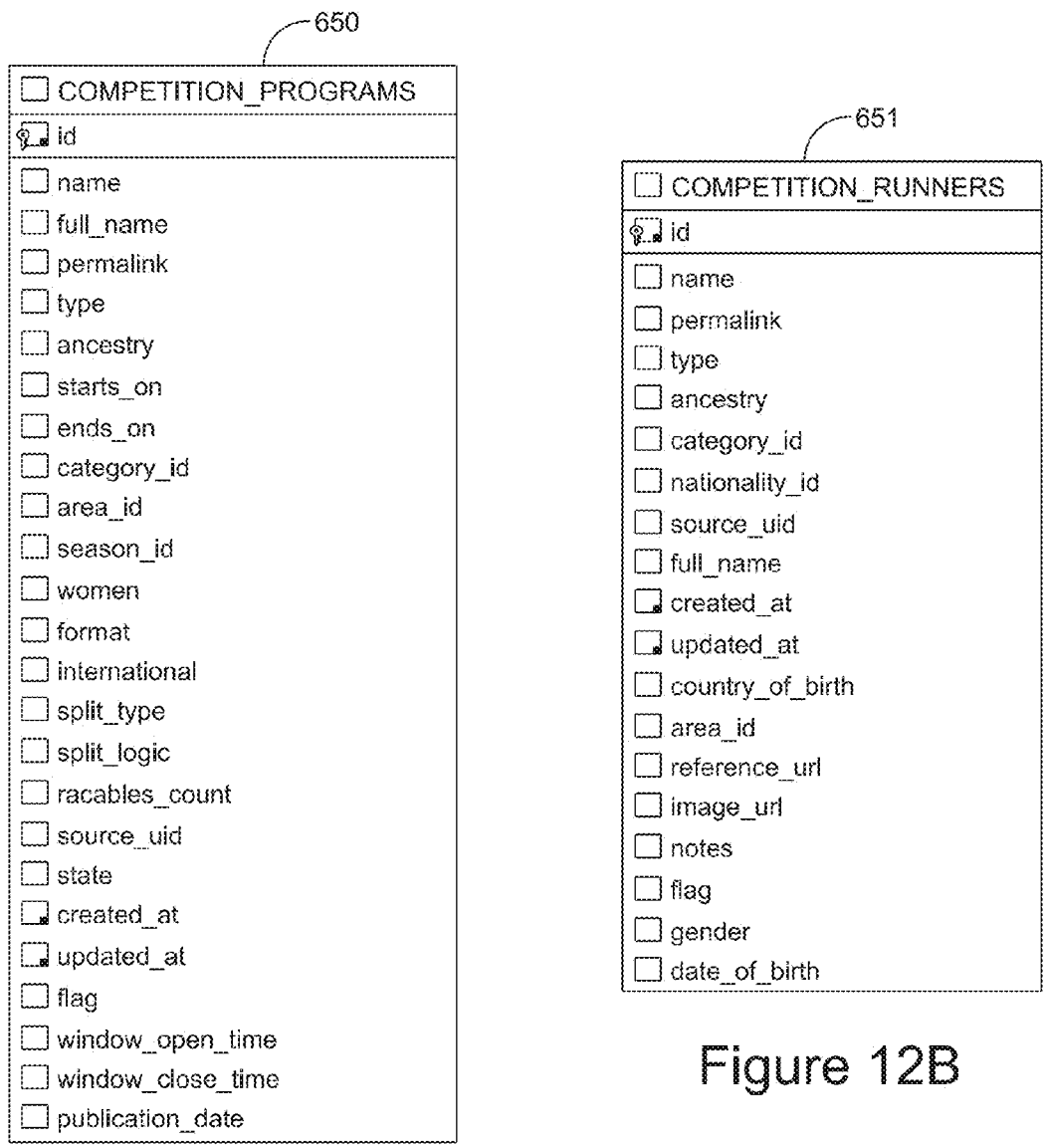
FIGS. 12A through 12S are a series of diagrams of various tables of the competition database of FIG. 3.
Figure 12J:
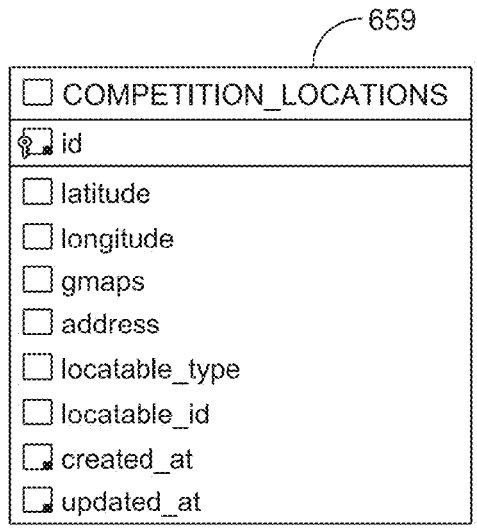
Figure 12K:
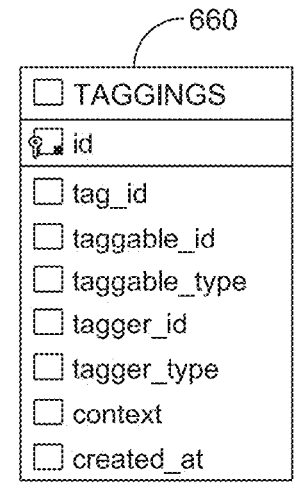
Figure 12L:
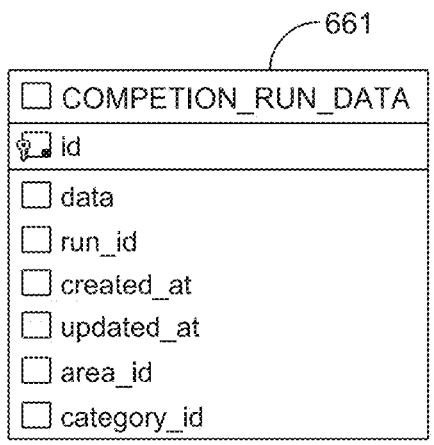
Figure 12M:
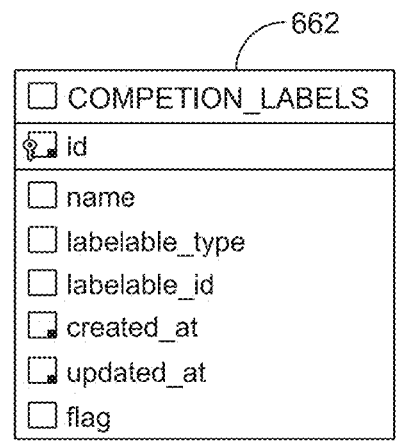

With reference to FIG. 10A through FIG. 10T, a series of class diagram of various classes of the competition service 84 (from FIG. 3) are described for implementing the prediction processing system 104 according to an exemplary embodiment. FIG. 12A through FIG. 12S describe a series of database tables supporting the game service classes.

A Competition::Program class 611 stores a collection of races and is supported by the COMPETITION_PROGRAMS database table 650. A Competition::Race class 612 stores the objects about which predictions can made. The COMPETITION_RACES database table 652 supports this class. A Competition::Racable class 613 is a join model joining a race to a program. The COMPETITION_RACABLES database table 667 supports this class. A Competition::Runner class

616 stores objects that belongs to a race, on which, predictions can be made. The COMPETITION_RUNNERS database table 651 supports this class. A Competition::Run class 617 connects runners to races. The COMPETITION_RUNS database table 654 supports this class. A Competition::RunData class 618 stores additional data relating to a runner's performance in a race and is supported by the COMPETITION_RUN_DATA database table 661. A Competition::Tour class 601 joins competitions to tours and enables the organization of group competitions. The COMPETITION_TOURS database table 658 supports this class. A Competition::Tourable class 609 is a join model joining competitions to a tours and is supported by the COMPETITION_TOURABLES database table 665. A Competition::Category class 602 stores categories of objects and is supported by the COMPETITION_CATEGORIES database table 657. A Competition::Categorization class 607 is a join model joining categorizable objects to categories. The COMPETITION_CATEGORIZATIONS database table 663 supports this class. A Competition::Area class 603 stores geographic areas and is supported by the COMPETITION_AREAS database table 653. A Competition::Areazation class 619 is a join model tying objects to an area. The COMPETITION_AREAZATIONS database table 664 supports this class. A Competition::Player class 604 stores information about a person who participates in a race as a runner. The COMPETITION_RUNNERS database table 651 supports this class. A Competition::Competition class 605 is a high level organizing structure for recurring events and is supported by the COMPETITION_COMPETITIONS database table 656. A Competition::Team class 606 stores race participants as collections of runners. A Competition::Teaming class 608 is a join model that ties a runner to a team and is supported by the COMPETITION_TEAMINGS database table 666. A Competition::Season class 610 organizes programs in segments of time. The COMPETITION_SEASONS database table 655 supports this class. A Competition::Location class 615 stores the latitude and longitude for a given location and is supported by the COMPETITION_LOCATIONS database table 659. A Competition::Label 614 stores labels associated with objects and is supported by the COMPETITION_LABELS database table 662. A Competition::ProgramSpliter class 621 is a utility class that splits large programs with large numbers of races into smaller programs with fewer races. The TAGS database table 668 stores taxonomy tags for the classes which are then tied to taggable objects through the TAGGINGS database table 660.

Figure 11:
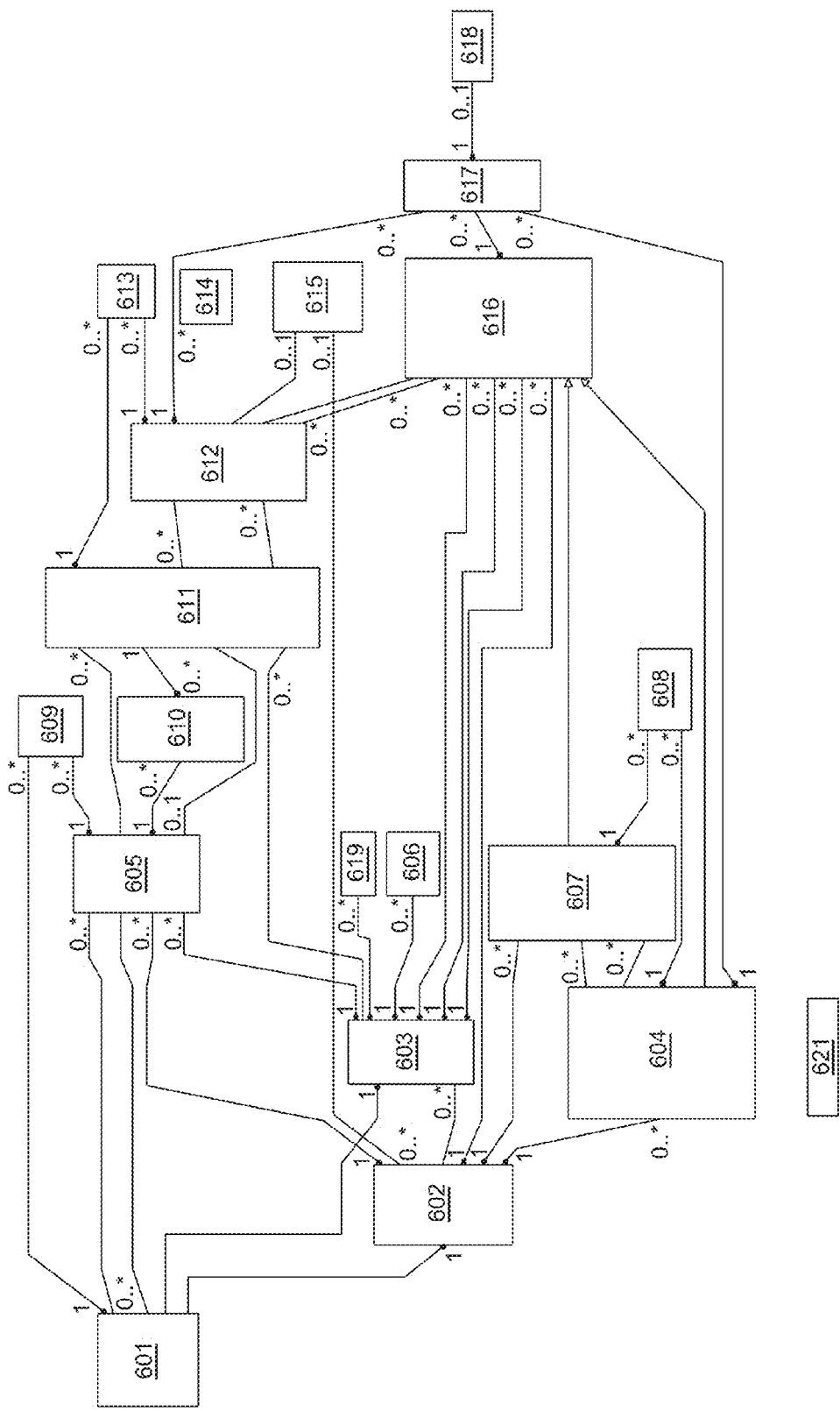
FIG. 11 are a detailed relational diagram for the classes supporting the competition services of FIG. 3.

With reference now to FIG. 11, detailed class relations for the competition service classes described in FIGS. 10A through 10T are described using standard UML connector types.

Figure 13:
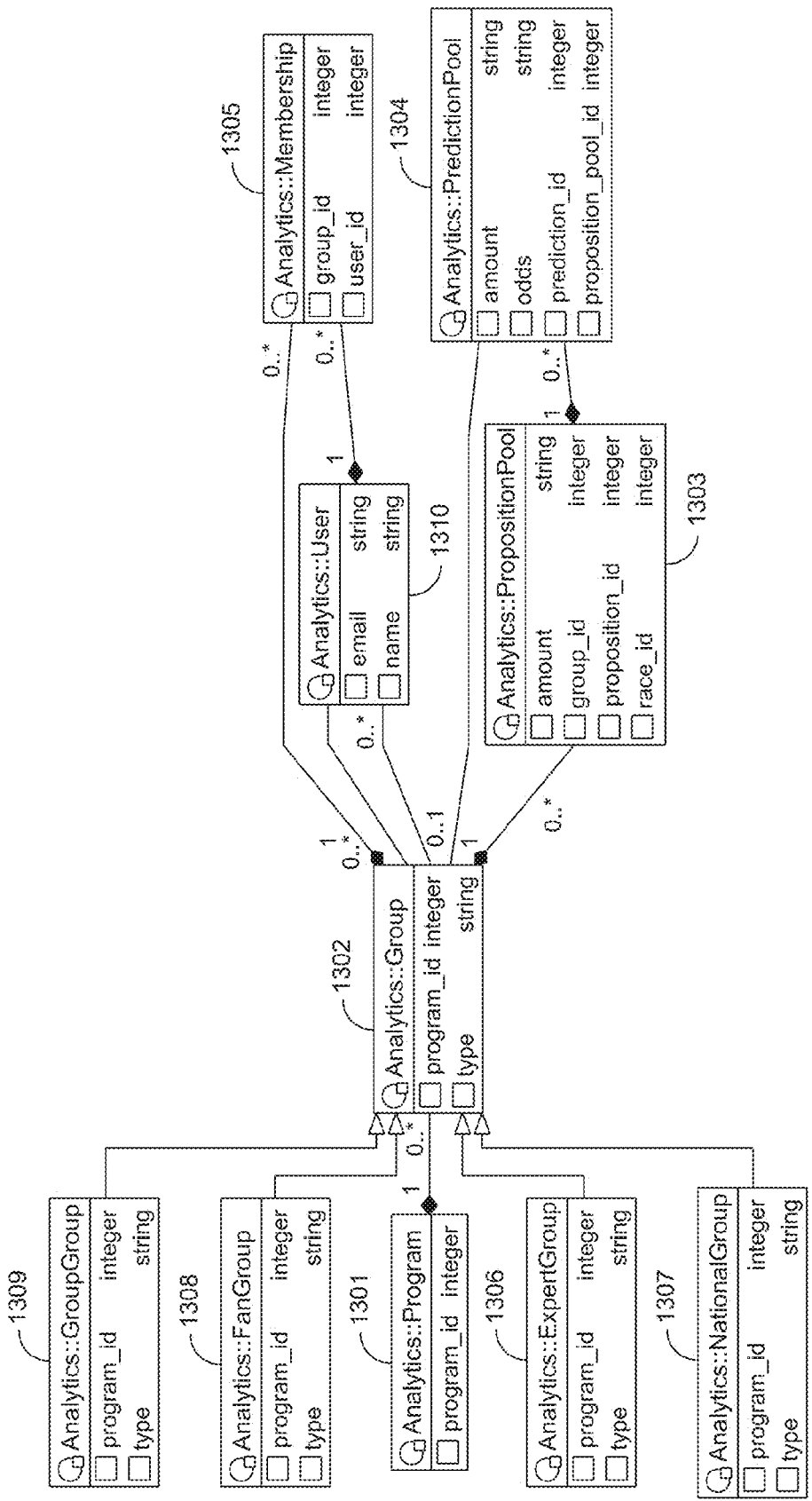
FIG. 13 is a relational class diagram of various classes of the analytics service of FIG. 3.

With reference now to FIG. 13, a detailed class relationship diagram of various classes of the analytics service 88 (from FIG. 3) is described for implementing the prediction processing system 104 according to an exemplary embodiment. Class relations are described using standard UML connector types. FIGS. 14A through 14F describe a series of database tables supporting the analytics service classes.

An Analytics::Group class 1302 stores specific subsets of players of a given program and is supported by the ANALYTICS_GROUPS database table 230. Groups are sub-classed based on desired group filtering criteria. An Analytics::GroupGroup class 1309 stores analytics groupings based on the crowd group, to which, players belong. The ANALYTICS_GROUPS database table 230 supports this class. An Analytics::FanGroup 1308 class stores analytics groupings for all fans for every runner in a given program. The ANALYTICS_GROUPS database table 230 supports this class. An Analytics::ExpertGroup class 1306 stores analytics groupings for all experts for a given program category. The ANALYTICS_GROUPS database table 230 supports this class. An Analytics::NationalGroup 1307 class stores analytics groupings for players based on nationality. The ANALYTICS_GROUPS database table 230 supports this class. An Analytics::Program class 1301 stores pointers to a Competition::Program 611 (from FIG. 10K) and is supported by the ANALYTICS_PROGRAMS database table 234. An Analytics::User class 1310 stores pointers to a Crowd::User 502 (from FIG. 4B) and is supported by the ANALYTICS_USERS database table 232. An Analytics::Membership class 1305 is a join model tying users to a group. The ANALYTICS_MEMBERSHIP database table 228 supports this class. An Analytics::PropositionPool 1303 stores the total weight on a given proposition for a given analytics group on a given race. The ANALYTICS_PROPOSITION_POOL database table 224 supports this class. An Analytics::PredictionPool 1304 stores the total amount of weight placed on a given prediction by the members of a given analytics group. The ANALYTICS_PREDICTION_POOL database table 226 supports this class.

Figure 15:
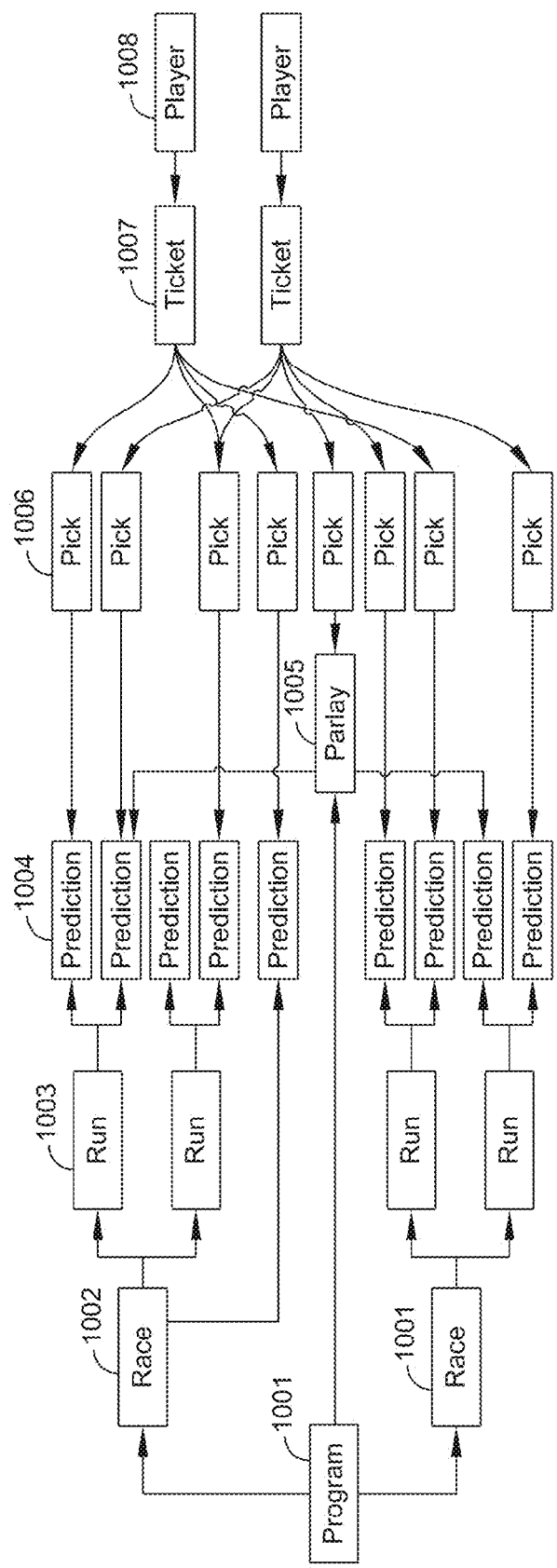
FIG. 15 is a relational block diagram of a game instance.

With reference now to FIG. 15, players 1008 can make predictions 1004 about the outcome of future events. In some embodiments, players make predictions by placing picks 1006 indicating the player's opinion regarding the outcome they expect for the future event. Picks 1006 are placed on runners. A runner can be thought of as any subject participating in an event. For example, if one predicts that mobile devices will outsell personal computers, the mobile device and the personal computer are runners and the player makes a pick on the mobile device.

Picking a runner occurs in the context of a race 1002. A race 1002 is a competitive context where there exist mutually exclusive outcomes for the runners. These mutually exclusive outcomes come about as the result of runs 1003 by the runners. In this best-selling computing device example, there are two runs 1003. One run is that of mobile devices being sold. The opposing run is that of personal computers being sold. The two runs 1003 make up a race 1002.

A program 1001 can include one or more races 1002. A player 1008 can submit one or more picks 1006 associated with a given run 1003, race 1002 or program 1001. A prediction 1004 as it is represented in the prediction processing system is a true/false statement about a run 1003. A pick 1006 made on a run 1003 consists of a player 1008 placing in-game currency on a runner for a particular run 1003 by way of a prediction 1004. In some applications, the prediction processing system includes a parlay 1005 that can combine one or more predictions 1004 into a single pick 1006. The player's pick will be considered correct if and when the prediction statement is true, or in the case of a parlay, when all required prediction statements are true. A player places one or more picks on one or more runners by submitting a ticket 1007 of picks 1006. In some embodiments, all picks 1006 for a game are submitted on a single ticket 1007.

Figure 16:
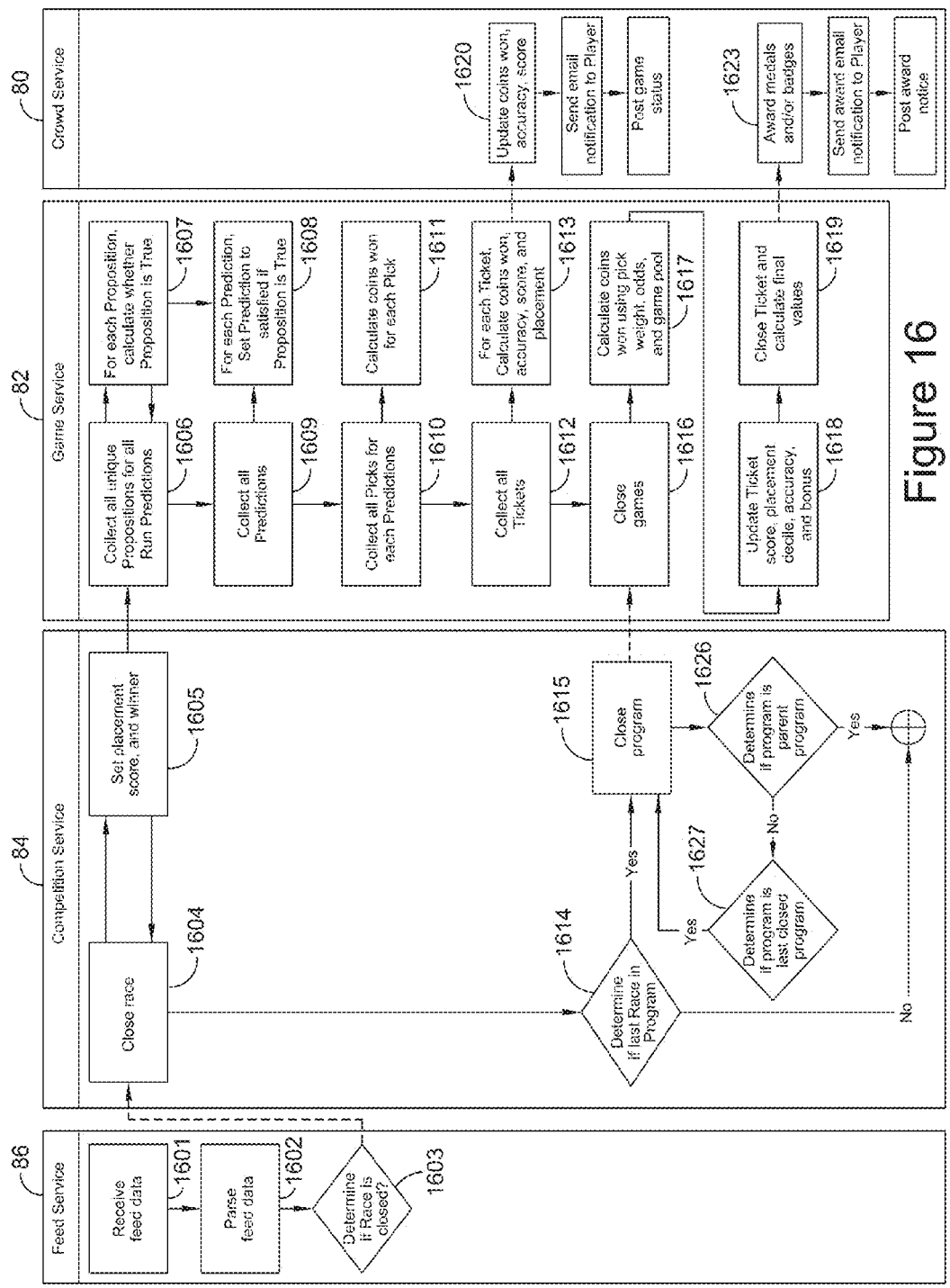
FIG. 16 is a flow diagram of the game settlement logic for some of the services shown in FIG. 3.

With reference now to FIG. 16, settlement logic supporting the operation of the game play of FIG. 15 is described. In an exemplary embodiment, settlement is triggered by the detection of race closure. In certain instances, a data feed is received 1601 by the feed service 86 (from FIG. 3) from an external system containing race data. A feed parser tailored to the format of the particular feed parses the content of the feed 1602 and determines if the race is closed 1603. If the race is closed, the competition service 84 (from FIG. 3) closes the race 1604. Runs are processed by setting Competition::Run.placement, Competition::Run.score, and Competition::Run.winner attributes for the runs 1605. In some embodiments, additional processing is managed by the game service 82 (from FIG. 3). Game service 82 methods settle propositions and corresponding predictions by collecting all unique propositions for all run predictions associated with the race, evaluating whether the proposition is true, and setting Play::Prediction.satisfied accordingly 1606, 1607, 1608, 1609. The competition service 84 (from FIG. 3) methods next settle the picks on the associated tickets by collecting the picks for all predictions and calculating the coins won for each pick 1610, 1611. The game service 82 methods then collect all tickets and calculate total coins won for that ticket, accuracy, score, and placement 1612, 1613.

Upon completion of this portion of the settlement process, the competition service 84 determines if the race is the last race in the program 1614, and if so, will close the program 1615, assuming that it is the last program in a set of programs 1626, 1627. In some embodiments, additional processing is managed by the game service 82. The game service 82 methods close the games by calculating the coins won using the pick weight, odds, and game pool, updates the ticket score, placement, decile, accuracy, and bonus 1616, 1617, 1618. The game service 82 methods then close the tickets and calculate any final values 1619.

Once settlement is complete, the crowd service 80 (from FIG. 3) methods update the player data with coins won, accuracy score, medals and/or badges 1620, 1623. The methods further notify the player and/or third parties through such mechanisms as, for example, email and posting on social networks 1621, 1622, 1624, 1625.

With reference now to FIG. 17A, an example Associated Press® XML feed is shown. In some instances the feed service 86 (from FIG. 3) supplies tailored parser classes for categories of feeds from specific sources. When a feed is received from a given source, its feed category can be determined from the feed content. In this example, the feed service 86 can provide a Feeder::Parser:Ap::Election class to process election feeds of the Associated Press® XML feed format. This example includes a designation that Shelley Berkley was the winner, indicating that the race is closed. This can serve to trigger the settlement process described in FIG. 16. With reference now to FIG. 17B, an example Global Sports Media® XML feed is shown. Here, the feed service 86 can provide a Feeder::Parser:GSM::Baseball class to process feeds of the Global Sports Media® XML feed format.

In some embodiments, a proposal framework is provided that includes various types of proposals for the modeling of propositions. In some instances, a Will Win proposal type is provided. This proposal type determines whether a runner is the winner of a race among a set of runners. Examples of propositions using the Will Win Proposal type include "Meryl Streep will be named winner in the best supporting actress category," "Tiger Woods will finish the first round of the Masters in first place," and "The Yankees will score more runs than the Mets." One or more tests can be applied, in sequence, to determine a winner.

Figure 18:
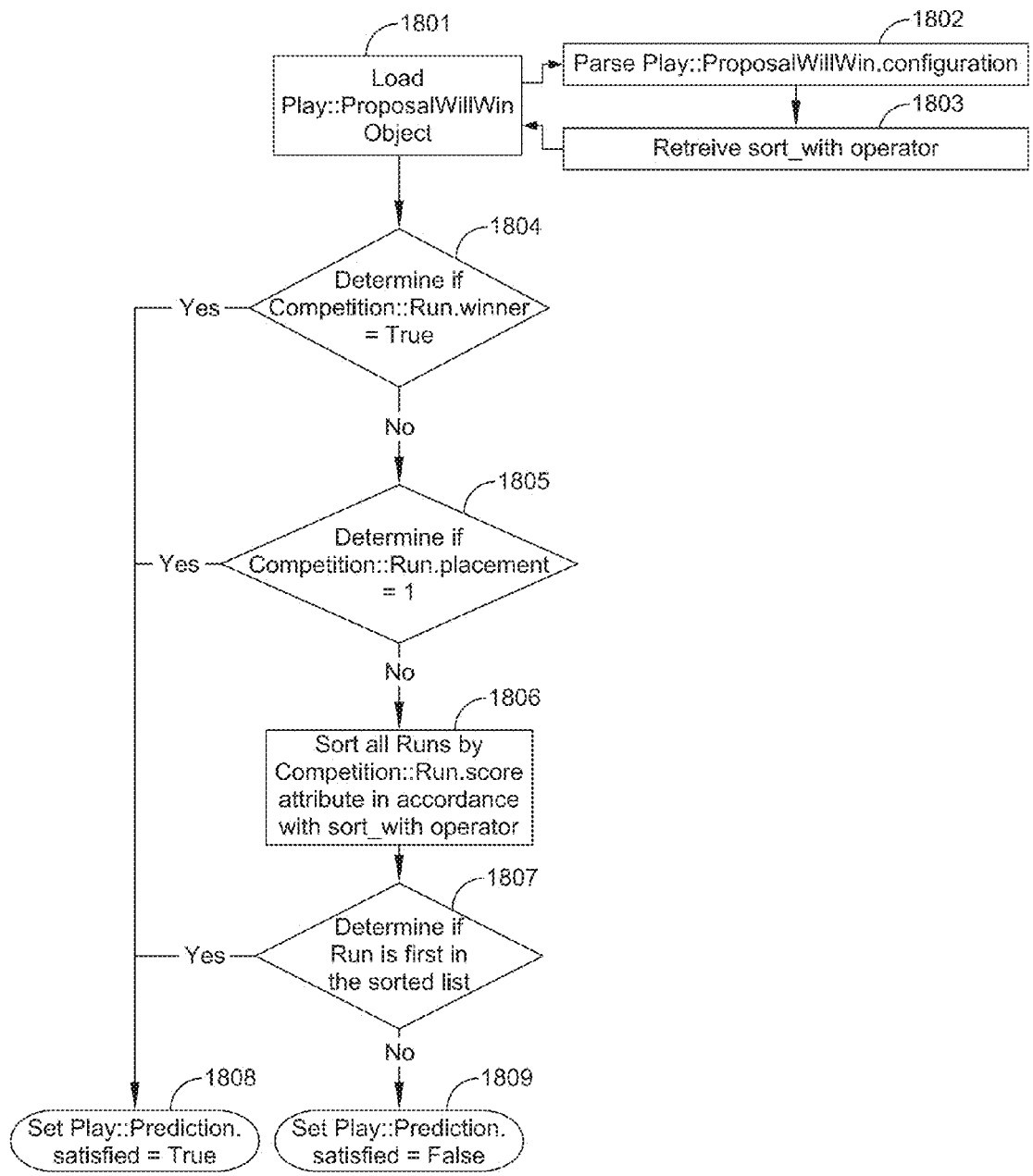
FIG. 18 is a flow chart of a process for settling a Will Win Proposal in the game service of FIG. 3.

With reference now to FIG. 18, a Play::Proposal class supports the instantiation of a Play::ProposalWillWin object, which can have zero or more instances of a Play::Proposition object associated with it. When settling a prediction that is associated with a Play::ProposalWillWin object through a Play::Proposition object, the Play::ProposalWillWin object is loaded into memory 1801. The settlement methods parse the Play::ProposalWillWin.configuration attribute 1802 and retrieve the sort_with operator 1803. In some embodiments, a first test determines whether a run is designated as a winner 1804. If the evaluation is true, then Play::Prediction.satisfied is set to true and no further tests are performed. If the run is not designated as a winner, then additional tests can be performed. In certain embodiments, where a winner has not been marked explicitly, a second test can be executed to determine if the run placed higher than other runs 1805. If the evaluation is true, then Play::Prediction.satisfied is set to true and no further tests are performed. If the Competition::Run.placement is not indicative of the run being in the first position, then a third test can be executed to determine if the run has a score higher than any other run 1807. For this test, all runs are sorted by the Competition::Run.score attribute according to the sort_with operator 1806, then the list is evaluated to determine if the run is in the first position in the list 1807. The sort_with operator may indicate either a descending or an ascending sort given that in some categories, a low score is preferable to a high score (e.g., golf). If the run is in the first position in the list, Play::Prediction.satisfied is set to true 1808. If the run is not in the first position in the list, Play::Prediction.satisfied is set to false 1809, indicating the run is not a winner and the prediction is not satisfied. In another embodiment, there may be additional tests included in the series of tests.

In some instances, a Compare On Proposal type is provided as part of the proposal framework. This proposal type compares a given attribute of a run against a given target value using a given comparison operator. Examples of propositions using this proposal type include, "The Yankees will score more than 5 runs," and "The price of the new iPhone® will be less than $500.00."

Figure 19:
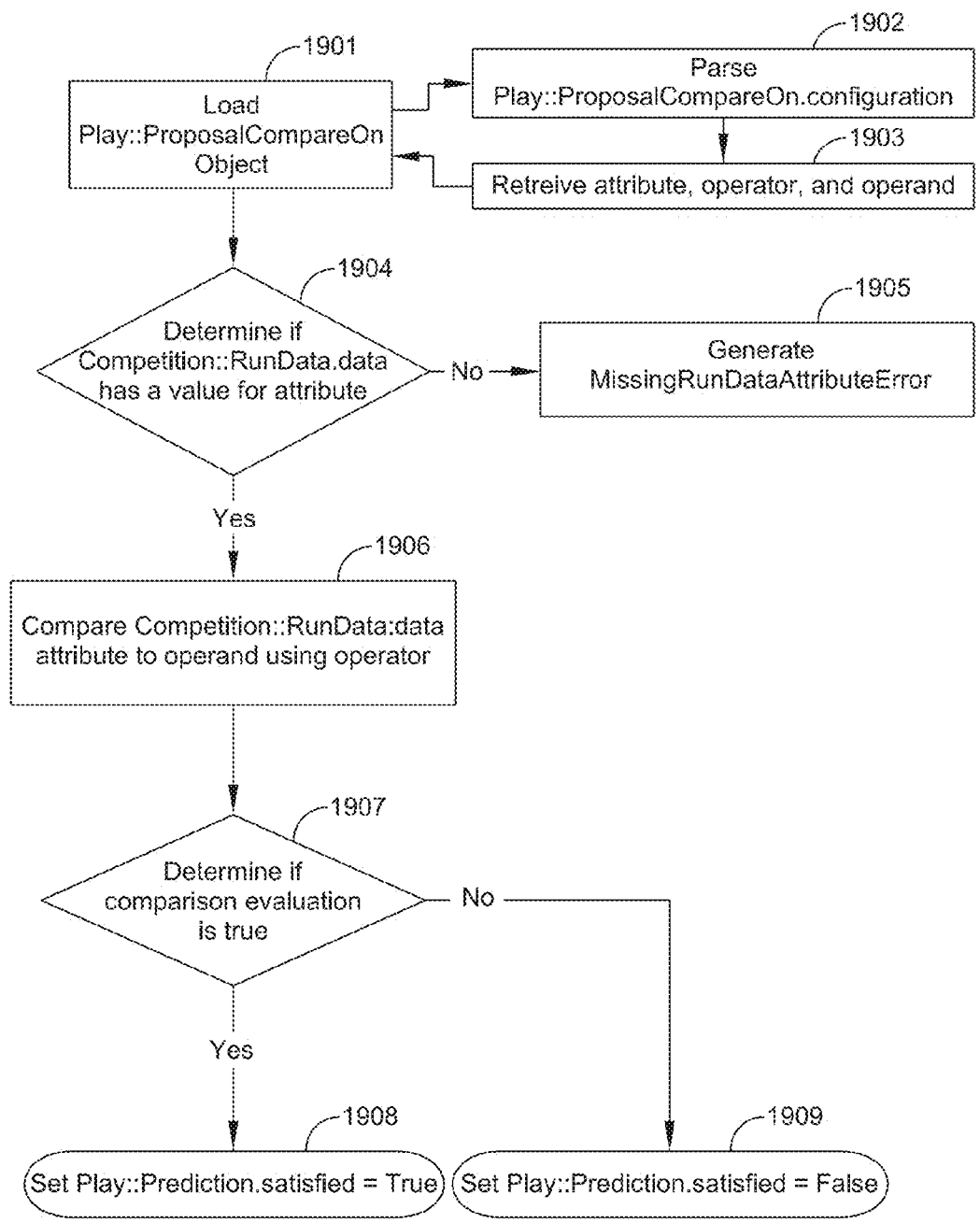
FIG. 19 is a flow chart of a process for settling a Compare On Proposal in the game service of FIG. 3.

Referring now to FIG. 19, a Play::Proposal class supports the instantiation of a Play::ProposalCompareOn object, which can have zero or more instances of a Play::Proposition object associated with it. When settling a Prediction that is associated with a Play::ProposalCompareOn object through a Play::Proposition object, the Play::ProposalCompare object is loaded into memory 1901. The settlement methods parse the Play::ProposalCompareOn.configuration attribute 1902 and retrieve the attribute, comparison operator, and target value (operand) 1903. A check can be performed to determine if the run includes a value for the given attribute 1904. If no value is detected, an error can be generated indicating that there is no data for the given attribute 1905. If a value is detected, then the attribute value can be compared to the operand according to the comparison operator 1906. If the operand is text, the comparison method can sort alphabetically. If the comparison evaluation is true 1907, Play::Prediction.satisfied is set to true 1908. If the comparison evaluation is false, Play::Prediction.satisfied is set to false 1909, indicating the prediction is not satisfied.

In some instances, a Will Be First When Sorted On Proposal type is provided as part of the proposal framework. This proposal type determines if a given run is in first position when sorted on a given attribute. Examples of propositions using this proposal type include, "Ivan Lendl will serve the most aces," and "John Kerry will get the most votes."

Figure 20:
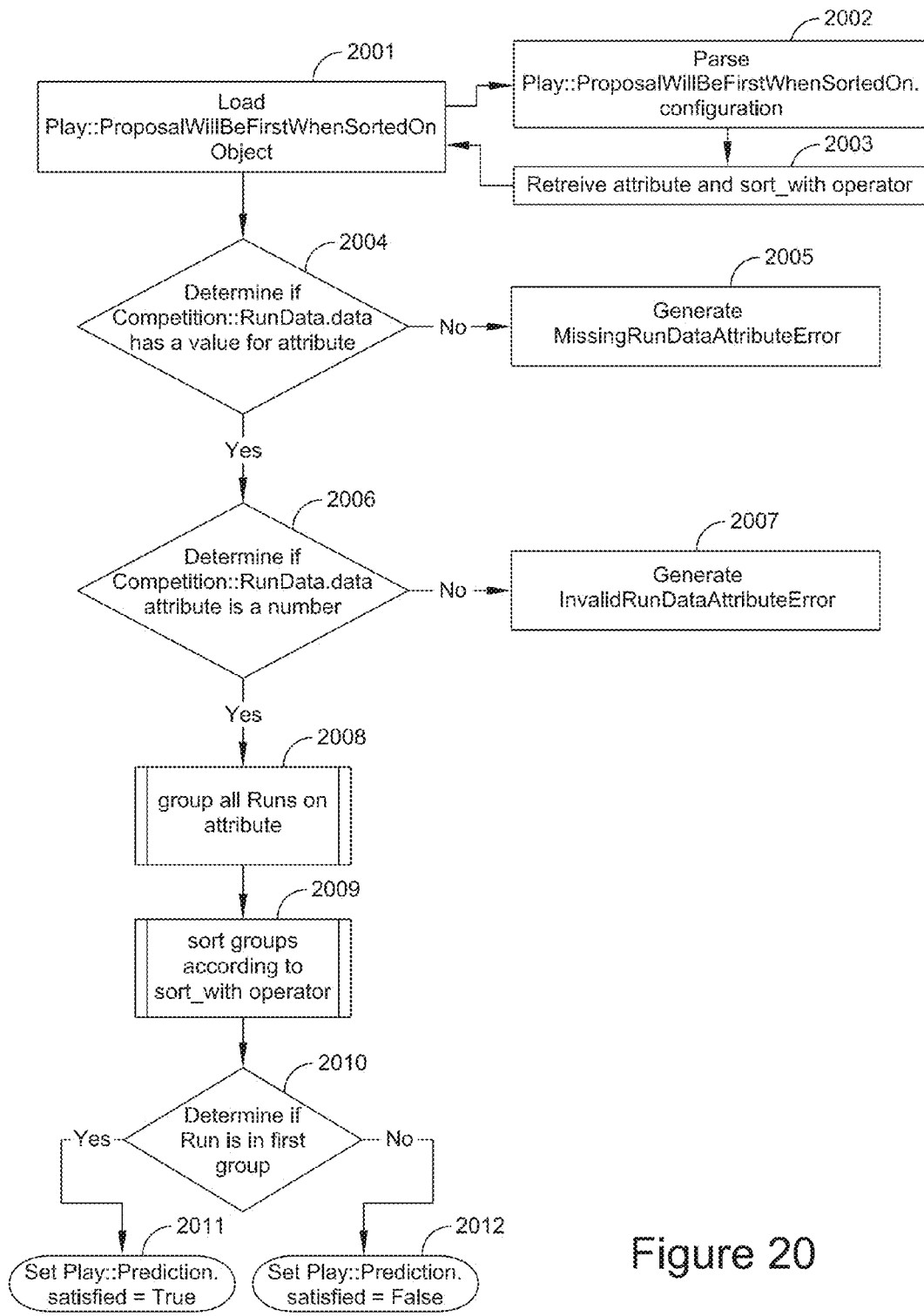
FIG. 20 is a flow chart of a process for settling a Will Be First When Sorted On Proposal in the game service of FIG. 3.
Figure 21:
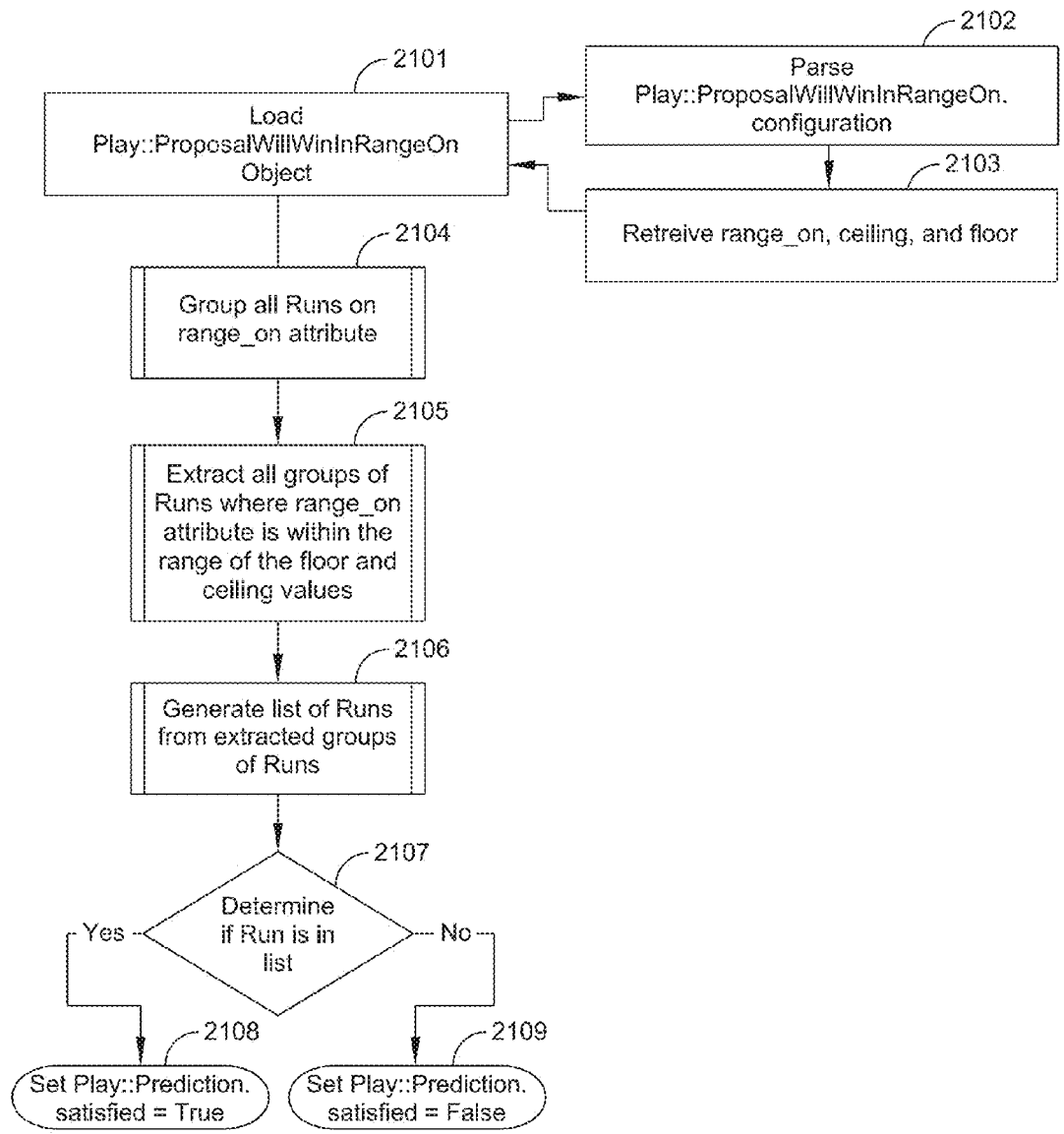
FIG. 21 is a flow chart of a process for settling a Win In Range On Proposal in the game service of FIG. 3.

With reference to FIG. 20, a Play::Proposal class supports the instantiation of a Play::ProposalWillBeFirstWhenSortedOn object, which can have zero or more instances of a Play::Proposition object associated with it. When settling a prediction that is associated with a Play::ProposalWillBeFirstWhenSortedOn object through a Play::Proposition object, the Play::ProposalWillBeFirstWhenSortedOn object is loaded into memory 2001. The settlement algorithm parses the Play::ProposalWillBeFirstWhenSortedOn.configuration attribute 2002 and retrieves the attribute to be sorted and the sort_with operator 2003. A check can be performed to determine if the run includes a value for the given attribute 2004. If no value is detected, an error can be generated indicated that there is no data for the given attribute 2005. If a value is detected, then a check can be performed to check if the attribute value is numeric 2006. If a non-numeric value is detected, an error can be generated indicated that the data is invalid for the given attribute 2007. If a numeric value is detected, all runs for the race can be grouped on the given attribute 2008 and subsequently sorted according to the sort_with operator 2009. The method can then analyze the first group and determine if it includes the run 2010. If it does include the run Play::Prediction.satisfied is set to true 2711. If it does not include the run, Play::Prediction.satisfied is set to false 2012, indicating the prediction is not satisfied.

In some embodiments, a Will Win In Range On Proposal type is provided as part of the proposal framework. This Proposal type evaluates a given attribute of a run to determine if it is within a given range as defined by a given floor value and given a ceiling value. An example of a proposition using this proposal type is, "Tiger Woods will finish in the top 5 finishers." With reference now FIG. 21, a Play::Proposal class supports the instantiation of a Play::ProposalWillWinInRangeOn object, which can have zero or more instances of a Play::Proposition object associated with it. When settling a prediction that is associated with a Play::ProposalWillWinInRangeOn object through a Play::Proposition object, the Play::Proposal ProposalWillWinInRangeOn object is loaded into memory 2101. The settlement method parses the Play::ProposalWillWinInRangeOn.configuration attribute 2102 and retrieves the range_on attribute, range ceiling value, and range floor value 2103. The settlement method groups all runs for the race on the range_on attribute 2104 and extracts all groups of runs where the range_on attribute is within the range defined by the given floor value and given ceiling value 2105. The method converts the runs in the extracted groups to a list of runs 2106 and determines if the run is included in the list of runs 2107. If it does include the run, Play::Prediction.satisfied is set to true 2108. If it does not include the run, Play::Prediction.satisfied is set to false 2109, indicating the prediction is not satisfied.

In certain instances, a First With Difference On Proposal type is provided as part of the proposal framework. This Proposal type compares a given attribute of a run with the same attribute of the next closest run and determines whether the difference between the two is greater than, less than or equal to a given number. Examples of propositions using this proposal type include, "Mario Andretti will win by less than a 10 second interval," and "The Mets will have 5 more errors than the Yankees."

Figure 22:
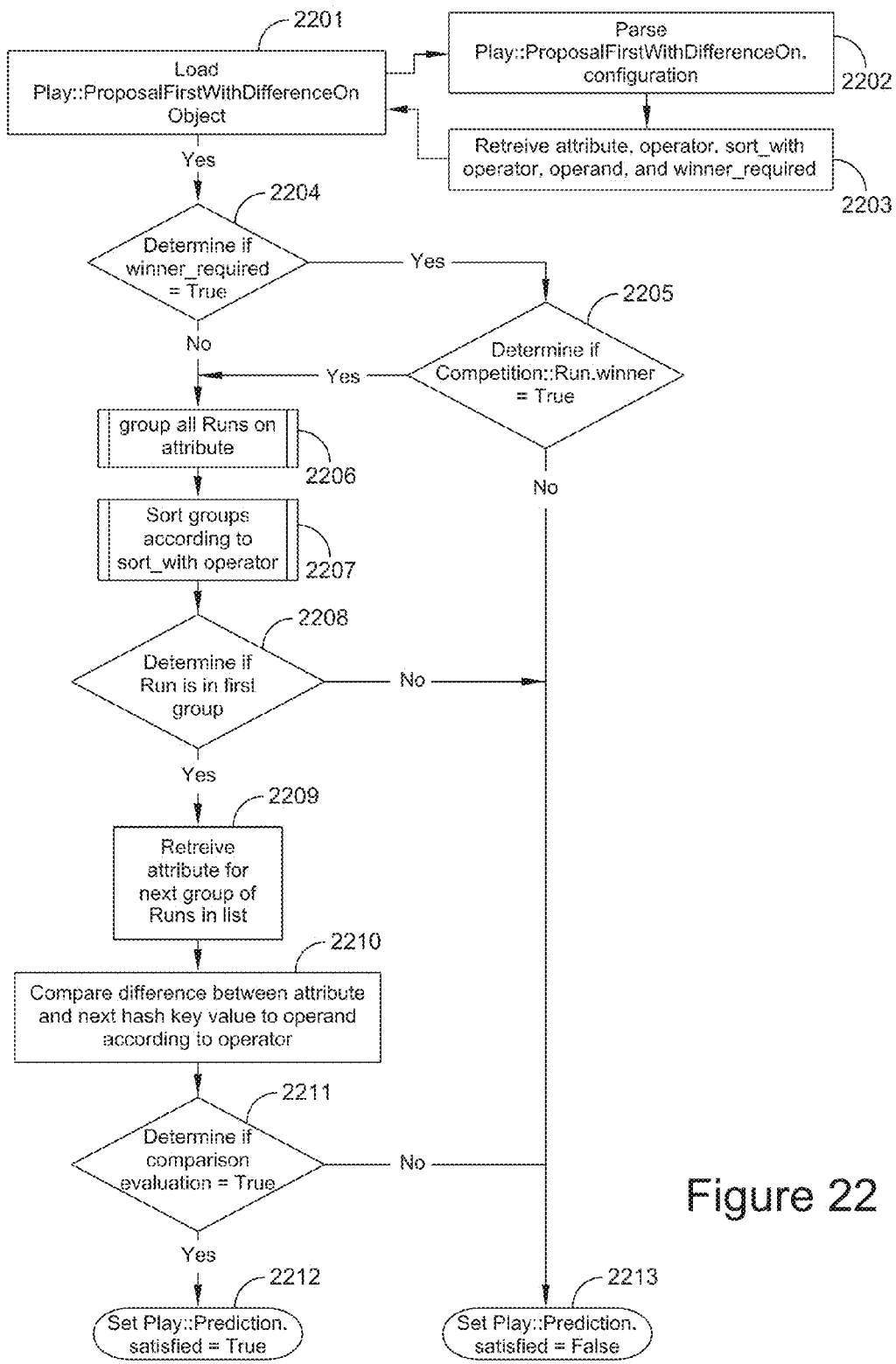
FIG. 22 is a flow chart of a process for settling a First With Difference On Proposal in the game service of FIG. 3.

With reference now FIG. 22, a Play::Proposal class supports the instantiation of a Play::ProposalFirstWithDifferenceOn object, which can have zero or more instances of a Play::Proposition object associated with it. When settling a Prediction that is associated with a Play::ProposalFirstWithDifferenceOn object through a Play::Proposition object, the Play::ProposalFirstWithDifferenceOn object is loaded into memory 2201. The settlement method parses the Play:: ProposalFirstWithDifferenceOn.configuration attribute 2202 and retrieves the attribute, comparison operator, sort_with operator, operand, and winner_required attribute 2203. The winner_required attribute indicates whether or not the run must be a race winner. The settlement method determines if the winner_required attribute is set to true 2204, and if so, determines if Competition::Run.winner is equal to true 2205. If it is determined that the run is not a winning run, then Play::Prediction.satisfied is set to false indicating the prediction is not satisfied 2213. If either winner_required is false, or if it is determined the run is a winner, then the method proceeds with the comparison. The method groups all runs on the given attribute 2206, then sorts the groups in accordance with the sort_with operator 2207. If it is determined the run is not in the first group 2208, then Play::Prediction.satisfied is set to false indicating the prediction is not satisfied 2213. If the method determines the run is in the first group, it retrieves the attribute for the next group in the in the list of groups 2209, calculates the difference between the first group attribute and the second group attribute 2210, and compares the result to the operand according to the comparison operator 2210. If the method determines the comparison evaluation is true 2211, Play::Prediction.satisfied is set to true 2212. If the method determines the comparison evaluation is false 2211, Play::Prediction.satisfied is set to false 2213, indicating the prediction is not satisfied.

In some embodiments, a Win With Percentage On Proposal type is provided as part of the proposal framework. This Proposal type determines if a run is first in a race where all runs are sorted on the fraction of two given attributes. Examples of propositions using this proposal type include, "Ivan Lendl will win the higher percentage of first-serve points," and "The goalkeeper for the Boston Bruins will save a higher percentage of shots on goal."

Figure 23:
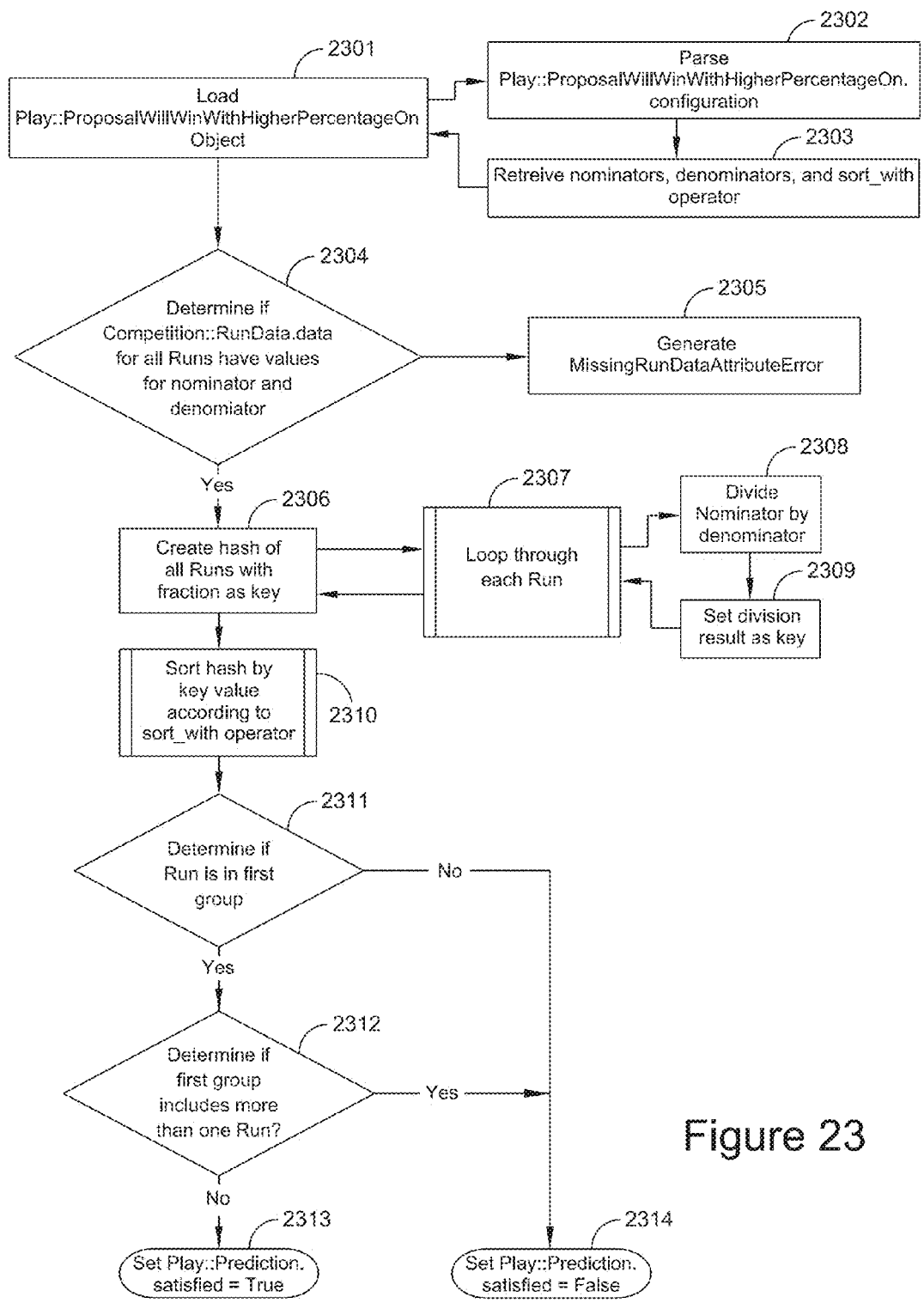
FIG. 23 is a flow chart of a process for settling a Will Win With Percentage On Proposal in the game service of FIG. 3.

With reference now FIG. 23, a Play::Proposal class supports the instantiation of a Play::ProposalWillWinWithHigherPercentageOn object, which can have zero or more instances of a Play::Proposition object associated with it. When settling a Prediction that is associated with a Play::ProposalWillWinWithHigherPercentageOn object through a Play::Proposition object, the Play::ProposalWillWinWithHigherPercentageOn object is loaded into memory 2301. The settlement method parses the Play::ProposalWillWinWithHigherPercentageOn.configuration attribute 2302 and retrieves the nominator attribute, denominator attribute, and sort_with operator 2303. A check can be performed to determine if the run includes values for the nominator attribute and the denominator attribute 2304. If no value is detected, an error can be generated indicating that there is no data for one or both of the attributes 2305. If both attribute values are present, the method creates a hash of all runs 2306 by looping through each run 2307, dividing the nominator attribute by the denominator attribute for that run 2308, and setting the key value equal to the division result 2309. The method then sorts all runs in groups by the fraction in accordance with the sort_with operator 2310 and determines if the run is in the first group 2311. If the run is not in the first group, Play::Prediction.satisfied is set to false 2314, indicating the prediction is not satisfied. If the method determines the run is in the first group, it further checks to see if there is more than one run in the group 2312, which is indicative of a tie with respect to the percentage. If the method determines the there is only one run in the group, Play::Prediction.satisfied is set to true 2313. If the method determines there is more than one Run in the group, Play::Prediction.satisfied is set to false 2314, indicating the prediction is not satisfied.

In some embodiments, a Will Tie Proposal type is provided as part of the proposal framework. This proposal type determines whether there are two or more winners of a race among a set of runners. Examples of propositions using the Will Tie Propsal type include "There will be two winners for Best Motion Picture Sound Editing," and "The New York Giants and the New England Patriots will tie." One or more tests can be applied in sequence to determine if there is more than one winning run.

Figure 24:
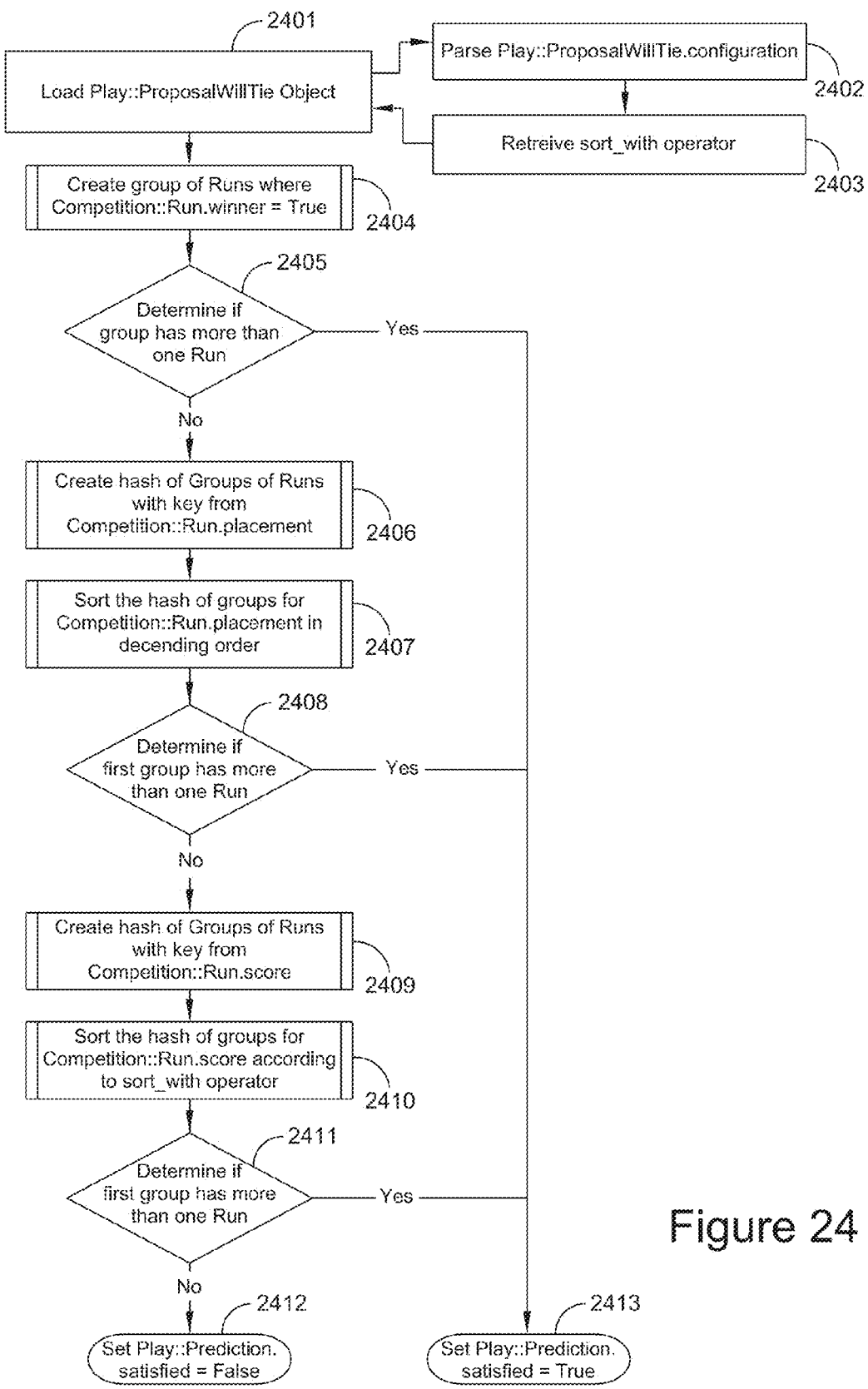
FIG. 24 is a flow chart of a process for settling a Will Tie Proposal in the game service of FIG. 3.

Referring now to FIG. 24, a Play::Proposal class supports the instantiation of a Play::ProposalWillTie object, which can have zero or more instances of a Play::Proposition object associated with it. When settling a Prediction that is associated with a Play::ProposalWillTie object through a Play::Proposition object, the Play::ProposalWillTie object is loaded into memory 2401. The settlement method parses the Play::ProposalWillTie.configuration attribute 2402 and retrieves the sort_with operator 2403. In some embodiments, the method first creates a group of runs designated as winning runs 2404 and determines if the group includes more than one run 2405. If the evaluation is true, then Play::Prediction.satisfied is set to true and no further tests are performed 2413. If the group does not contain more than one run, additional tests are performed. In certain embodiments, a second test can be executed to determine if more than one run achieved an identical placement score. The method creates a hash of groups of runs with Competition::Run.placement as the key value 2406 and sorts the hash of groups in descending order 2407. If the method determines that more than one run is in the group 2408, Play::Prediction.satisfied is set to true and no further tests are performed. If there is only one run in the group, a third test can be executed to determine if more than one run has an identical score. The method creates a hash of groups of runs with Competition::Run.score as the key value 2409 and sorts the hash of groups in accordance with the sort_with operator 2410. If the method determines that more than one run is in the group 2411, Play::Prediction.satisfied is set to true 2413. If the run is the only run in the group Play::Prediction.satisfied is set to false 2412, indicating the prediction is not satisfied. In another embodiment, there may be additional tests included in the series of tests.

In some instances, a Compare Operation On Proposal type is provided as part of the proposal framework. This proposal type performs an operation on a data attribute for all runs in a race, and then compares the result to a given value. Examples of propositions using this proposal type include, "There will be more than 100 total points scored in the Lakers versus Celtics game," and "Total votes cast for mayor will be less than 75% of eligible voters." With reference now to FIG. 25, a Play::Proposal class supports the instantiation of a Play::ProposalOperationalCompare object, which can have zero or more instances of a Play::Proposition object associated with it. When settling a Prediction that is associated with a Play::ProposalOperationalCompare object through a Play::Proposition object, the Play::ProposalOperationalCompare object is loaded into memory 2501. The settlement method parses the Play::ProposalOperationalCompare.configuration attribute 2502 and retrieves the attribute, the operation, the comparison operator, and the operand 2503. A check can be performed to determine if the run includes a value for the given attribute 2504. If no value is detected, an error can be generated indicated that there is no data for the given attribute 2505. If a value is detected, then a check can be performed to check if the attribute value is numeric 2506. If a non-numeric value is detected, an error can be generated indicating that the data is invalid for the given attribute 2507. If a numeric value is detected, the method can perform a check and determine if the operation is a subtraction operation 2508. For a subtraction operation, the method can determine if there are exactly two runs in the race 2509, and if not, generate an error indicating the race data is invalid for purposes of performing a subtraction operation 2510. The method can then perform the given operation for all attribute data for all runs in the race 2511, and then compare the result to the operand according to the operator 2512. If the method determines the comparison operation is true 2513, Play::Prediction.satisfied is set to true 2514. If the comparison evaluation is false, Play::Prediction.satisfied is set to false 2515, indicating the prediction is not satisfied.

In certain embodiments, a Cover Spread On Proposal type is provided as part of the proposal framework. This proposal type compares the sum of a given line amount and a given attribute for a run to a given attribute of an opposing run according to a given comparison operator. Examples of propositions using this proposal type include, "The Celtics will beat the Lakers by at least 5 points," and "The Lakers will lose by no more than 5 points." With reference now to FIG. 26, a Play::Proposal class supports the instantiation of a Play::ProposalCoverSpreadOn object, which can have zero or more instances of a Play::Proposition object associated with it. When settling a prediction that is associated with a Play::ProposalCoverSpreadOn object through a Play::Proposition object, the Play::ProposalCoverSpreadOn object is loaded into memory 2601. The settlement method parses the Play::ProposalCoverSpreadOn.configuration attribute 2602 and retrieves the attribute, the comparison operator, and the line amount 2603. The method can perform a check to determine if the number of runs in the race is exactly two 2604, and if not, can generate an error indicating there are an incorrect number of runs 2605. If there are exactly two runs in the race, the method sums the attribute and the line amount 2606, and compares the result to the attribute of the opposing run according to the operator 2607. For example, for a typical cover-the-spread type proposition in a sports context, the difference in score would need to be more than the spread. In contrast, for a typical beat-the-spread type proposition to be true, the difference in score would need to be less than the spread. In both cases the absolute value of the line would be the same, although in the beat-the-spread case, the line amount used would be a negative value. If the method determines the comparison operation is true 2608, Play::Prediction.satisfied is set to true 2609. If the comparison evaluation is false, Play::Prediction.satisfied is set to false 2610, indicating the prediction is not satisfied.

In some instances, a Parlay Proposal type is provided as part of the proposal framework. This proposal type links two or more predictions together and determines if a set of those predictions is satisfied. Examples of propositions using this proposal type include, "At least two of the three horses selected will finish in the top three positions," and "4 of the 5 open seats will be won by Republican candidates."

Figure 27:
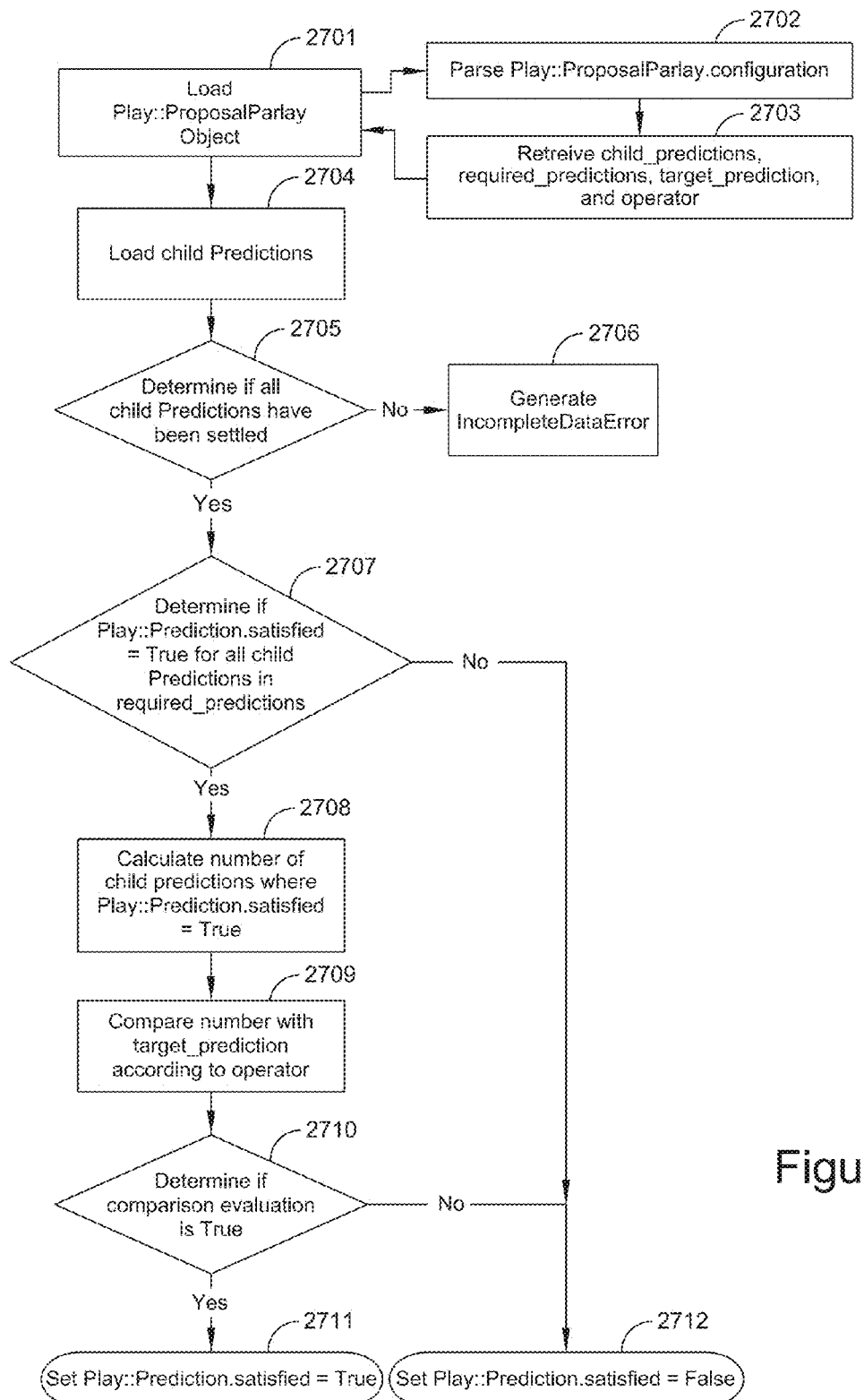
FIG. 27 is a flow chart of a process for settling a Parlay Proposal in the game service of FIG. 3.

With reference now to FIG. 27, a Play::Proposal class supports the instantiation of a Play::ProposalParlay object, which can have zero or more instances of a Play::Proposition object associated with it. When settling a Prediction that is associated with a Play::ProposalParlay object through a Play::Proposition object, the Play:: ProposalParlay object is loaded into memory 2701. The settlement method parses the Play::ProposalParlay.configuration attribute 2702 and retrieves the child_predictions linked by the Parlay Propsal, the predictions required to be true, the total number of predictions required to be true, and the comparison operator 2703. The settlement method loads the child predictions in memory 2704 and determines if all the predictions have been settled 2705. If they have not been settled, an error can be generated indicating there is incomplete data 2706. The settlement method determines if all required child predictions have been satisfied 2707, and if not, Play::Prediction.satisfied is set to false 2712, indicating the parlay Prediction is not satisfied. If all required child predictions are satisfied, then the method calculates the total number of satisfied child predictions 2708 and compares that number to the given required number of child predictions 2709. If the method determines the comparison operation is true 2710, Play::Prediction.satisfied is set to true 2711. If the method determines the comparison evaluation is false, Play::Prediction.satisfied is set to false 2712, indicating the prediction is not satisfied.

Figure 28:
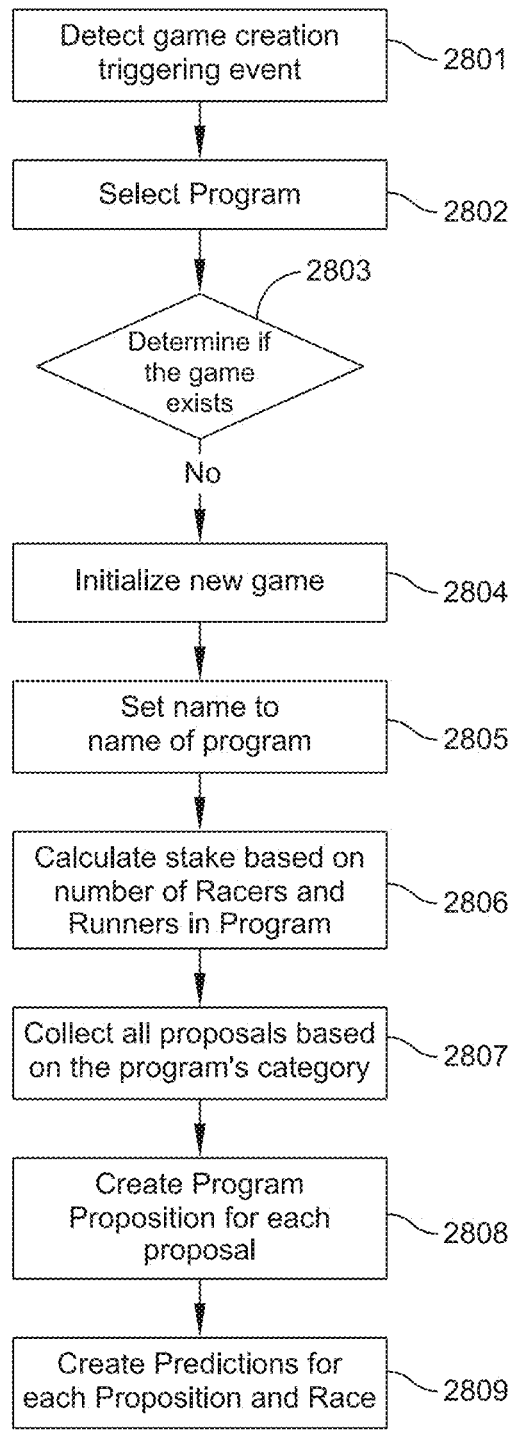
FIG. 28 is a flowchart of a process for the creation of a game instance.

Turning now to FIG. 28, the process for the creation of a game is described according to an exemplary embodiment. In some instances, game creation is triggered in response to a user action, an API call, and/or receipt of a data feed. Upon detection of a game creation trigger event 2801, the game creation method selects a program 2802 and determines if the game already exists 2803. If the game does not already exist, the methods initialize a new game 2804 by setting the name to the program name, calculating the stake based on the number of races and runners in the program, and collecting all appropriate proposals based on the program category 2805, 2806, 2807. The game creation methods then create program propositions for each proposal, and create predictions for each proposition and race 2808, 2809.

In some embodiments, players are identified and placed into groups. In some embodiments, an expert grouping can be defined by identifying players whose accuracy levels exceeds a defined threshold in previous programs in the same category. In some instances, a premium grouping can be defined based on identifying those players of a program whose score in previous programs in the same category exceed a defined threshold. In some of these embodiments, this threshold can be an accuracy level of 50% or higher. In other embodiments, groupings can be defined by identifying players of a program who identify themselves as a fan of a particular runner running in the program.

Figure 29:
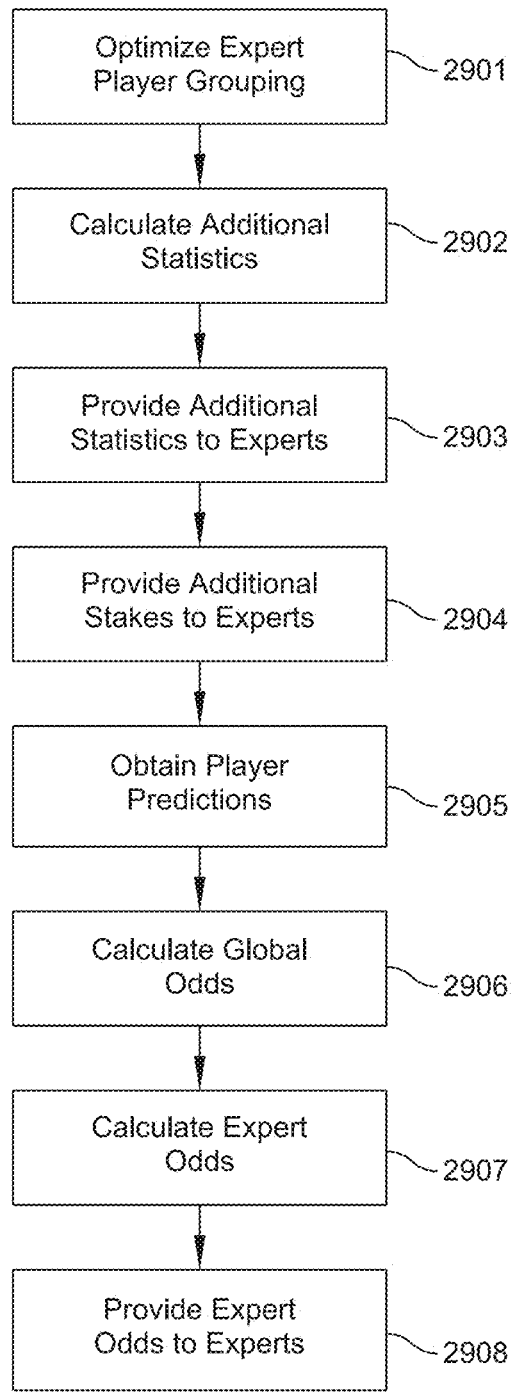
FIG. 29 is a flowchart of a process for optimizing odds in the prediction processing system shown in FIG. 3.

With reference now to FIG. 29, in some embodiments, the analytics service 88 (from FIG. 3) methods identify those players in the current program that qualify as experts 2901. The methods 88 then calculate group level odds and other additional statistics 2902, and provide this information to premium level players and experts 2903. If appropriate, the methods provide and/or award additional stakes and/or bonus stakes to premium and/or expert players. The system collects predictions from the players of the program 2905, then calculates the global odds for each proposition 2906 and the group level odds for each identified group 2907. The global odds are accessible by all players. In certain instances, the group level odds, such as for example, expert odds, can be available exclusively to premium level players, experts and/or other identified subgroups 2908.

Figure 30:
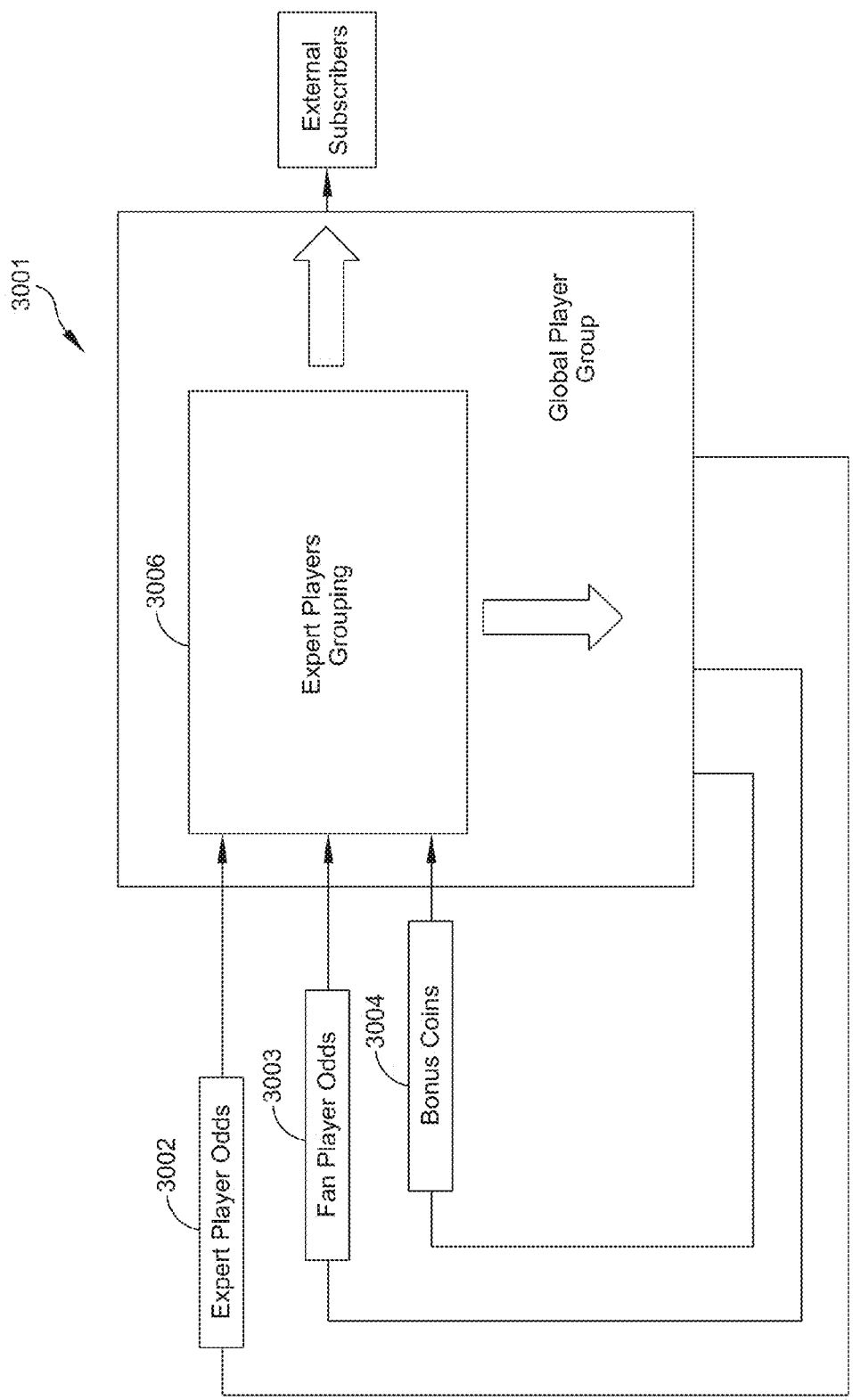
FIG. 30 is a diagram of an example of multiple feedback mechanisms affecting odds optimization as described in FIG. 29.

With reference to FIG. 30, in some embodiments, a positive feedback mechanism 3001 repeatedly calculates statistics that may be of interest and/or use to higher-performing players iteratively providing these statistics to higher performing groups of players. These statistics can include derivative information such as, for example, expert odds 3002, fan odds 3003, fan confidence 3106 (from FIG. 31), peer confidence index, and/or expert fan odds. In certain instances, another type of information can include weighted odds where the methods weight each player's prediction differently based on their historical accuracy.

This mechanism can also provide additional stakes to higher performing players 3004. In some instances, these additional stakes can be distributed in uniform amounts or disparate amounts based on the performance level of the player as compared to other high-performing players. Providing exclusive information to higher performing players, as well as providing additional stakes that can increase the weight of the high performers picks, may further optimize the expert predictors grouping 3006, and may raise the overall performance of a sub-group of the expert performers in a manner that improves the overall predictive accuracy of the expert sub-group. In some embodiments, the optimized statistics can be published to external subscribers.

Figure 31:
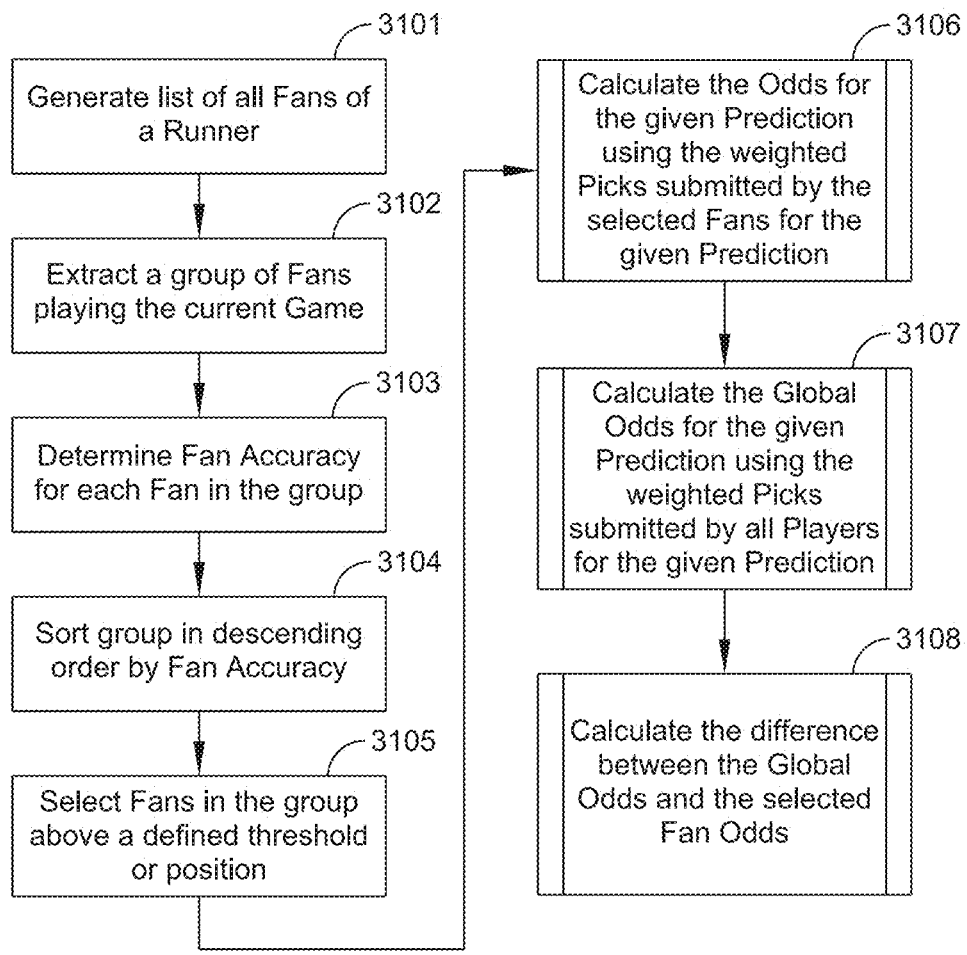
FIG. 31 is a flowchart of a process for calculating fan confidence.

In certain embodiments, another type of derivative statistic that can be calculated is fan confidence. With reference now to FIG. 31, the analytic service 88 (from FIG. 3) methods generate a list of all the players designated as fans of a given runner 3101. The methods then extract a sub-group of the fans based on whether they are playing the current game 3102. The fan accuracy measure is calculated for each fan in the sub-group 3103, then the sub-group is ordered in a list in descending order 3104. The method then calculates the odds for the given prediction using the weighted picks submitted by the fans in the subgroup whose accuracy is above a defined accuracy threshold 3105, 3106. The method then calculates the global odds for the given prediction, and evaluates the difference between the result of the global odds calculation and the sub-group odds calculation 3107, 3108. In some instances, the fan confidence value can be expressed as a percentage difference. One skilled in the art would appreciate that this same information can be expressed in alternative formats and representations.

Figure 32:
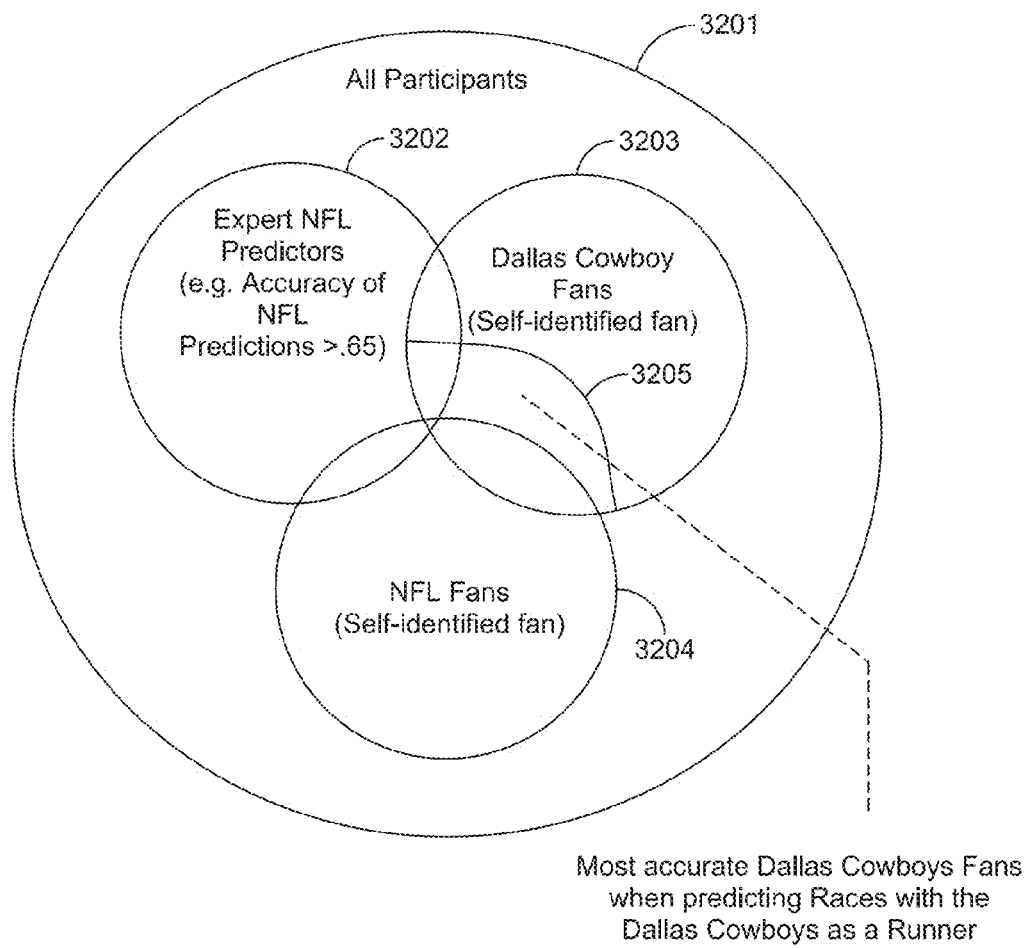
FIG. 32 is a Venn diagram of example player groupings as described FIG. 29.
Figure 33:
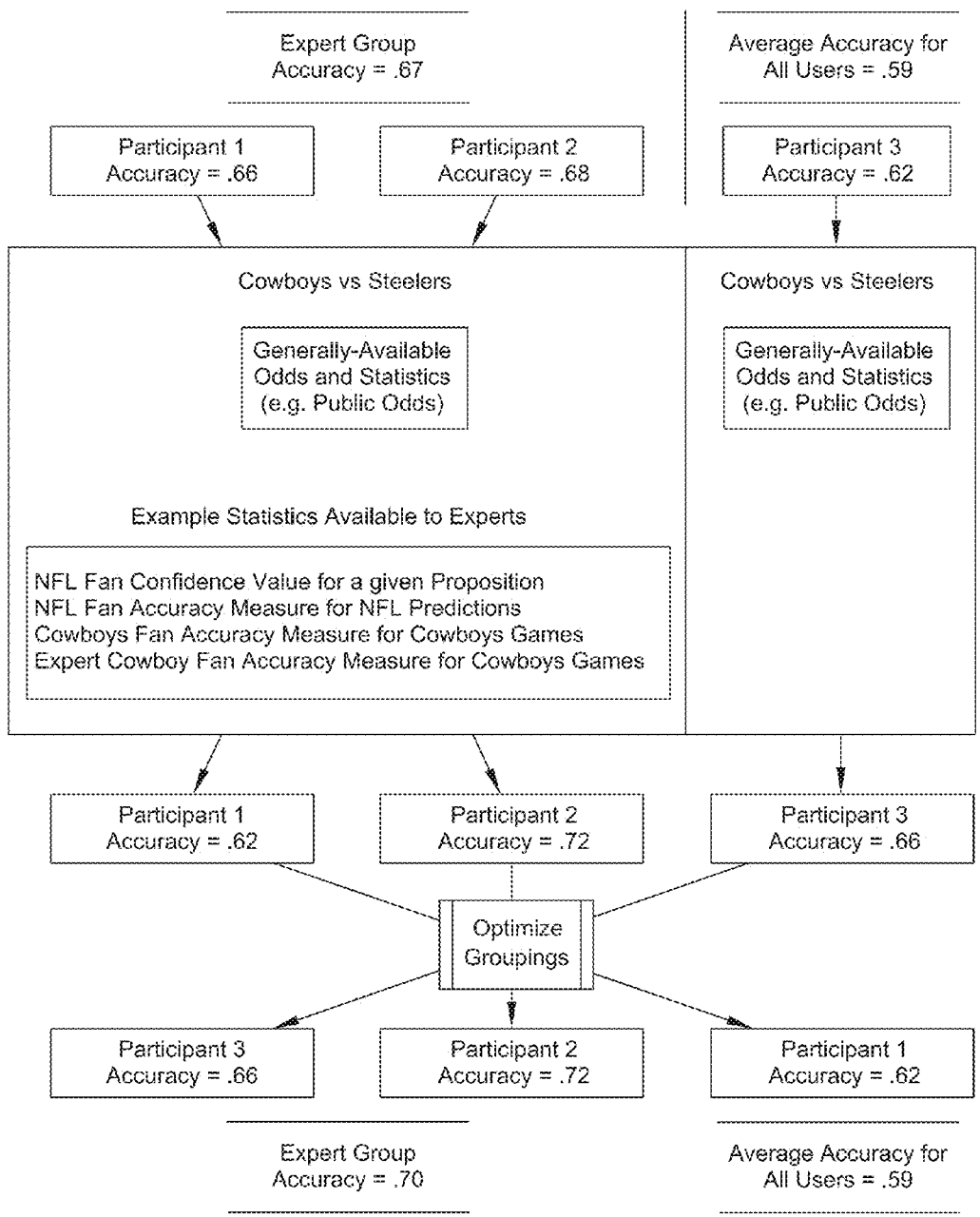
FIG. 33 is a diagram of an optimization process of example player groupings of FIG. 29.

With reference now to FIG. 32, a Venn diagram of example player groupings for an NFL sporting event game is described. In this example, the group of all participants in the program 3201 are considered when calculating global odds for the program. Within this comprehensive group, the analytics service 88 (from FIG. 3) identifies a further set of sub-groups. In this example, there is an expert grouping consisting of those players that have achieved a level of predictive accuracy in the NFL category 3202, there is a fan group of self-identified fans of a runner, namely, the Dallas Cowboys 3203, and there is another grouping of self-identified fans, namely, fans of the NFL 3204. Within the grouping of self-identified Dallas Cowboys fans, there is a further sub-grouping of expert fans defined by those fans of the Dallas Cowboys that have exceeded a defined accuracy threshold for Dallas Cowboys games in which they were a participant 3205. In certain instances, the analytics service 88 methods can identify one or more such groups and generate different sets of statistics based on each group in isolation.

Figure 34:
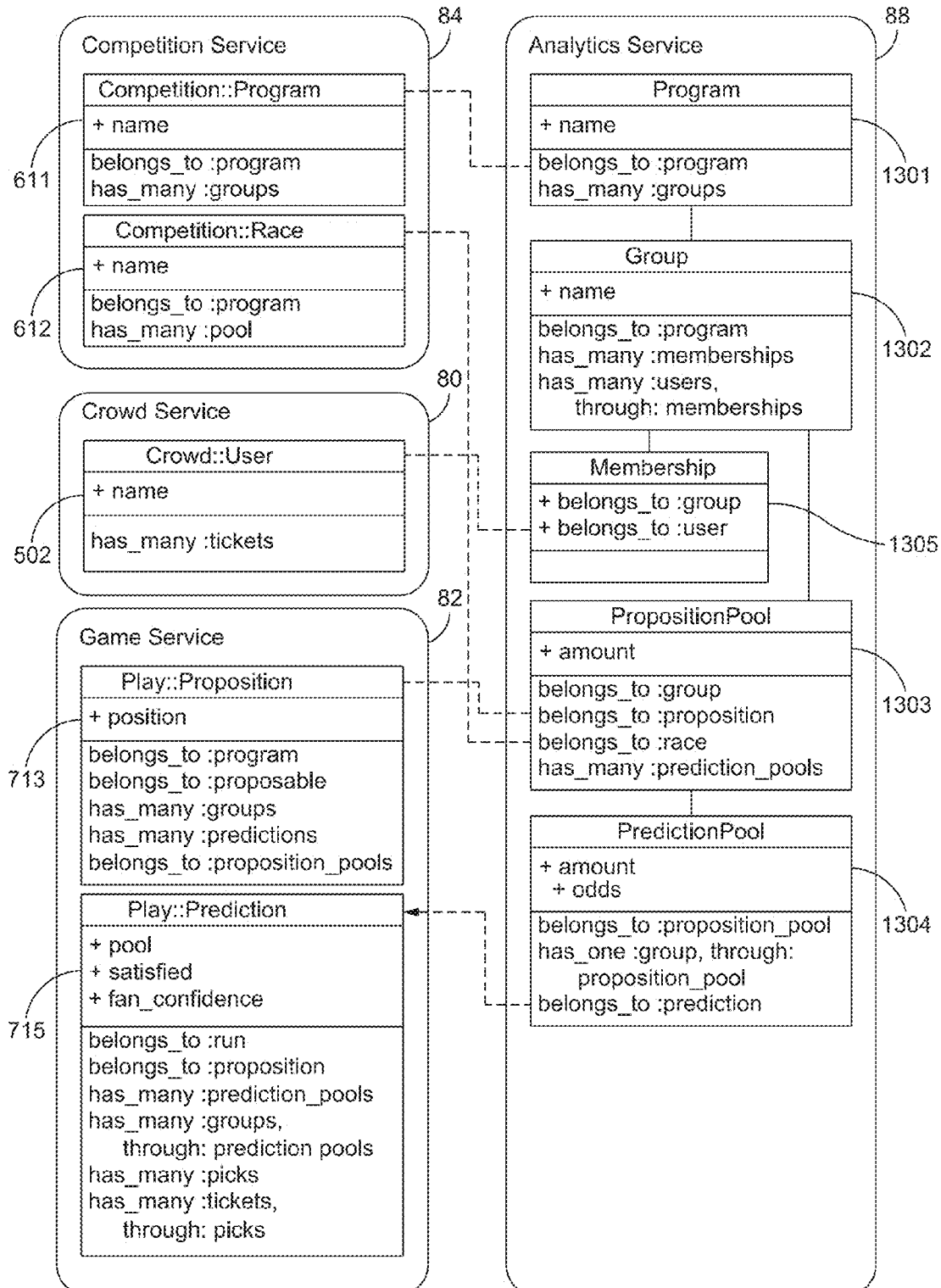
FIG. 34 is a diagram of a logical odds optimization model for use in the odds optimization process of FIG. 29.

With reference now to FIG. 34, the logical model of the primary classes for the analytics service 88 is described. The Analytics::Program class 1301 is a pointer to a Competition::Program 611 (from FIG. 10K) The Analytics::Group class 1302 can be subclassed to encapsulate specific behaviors for identifying and collecting players 1306, 1307, 1308, 1309 (from FIG. 13). For example, experts in the program category, fans of specific runners in the program, players from a specifics locale, or crowd group members can be collected for inclusion in a group. An Analytics::Group can have many users through Analytics::Membership 1305. As players are added to the group and as the picks for those players are being updated, The Analytics::PropositionPool 1303 class and the Analytics::PredictionPool class 1304 can maintain the proposition pool for all proposition picks and the prediction pool for individual prediction. The Analytics::PredictionPool class 1304 can maintain odds as well as the amount of coins an individual places on a prediction based on the picks of the players in the group.

With reference to FIGS. 35A through 35C, in some embodiments, the feed service 86 (from FIG. 3) generates various publication formats for distribution to third parties. FIG. 35A is an example of an xml data feed publication appropriate for simple XML readers such as, for example, RSS readers and desktop widgets. This example includes basic information such as the name, start time, team names, and odds. With reference to FIG. 35B, an example is shown that includes a richer XML data set that can be more appropriate for API-based distribution. Here, in addition to the basic information of 35A, information about the category, stake, close time, and proposition are included. Much of this information has meaning internal to the prediction processing system and may benefit from further processing by an API as opposed to a simple feed reader.

Referring to FIG. 35C, an example of a JSON data feed is shown. The information in this feed varies in format from the data-rich XML example shown in FIG. 34A; but the content is, for the most part, identical.

Figure 36:
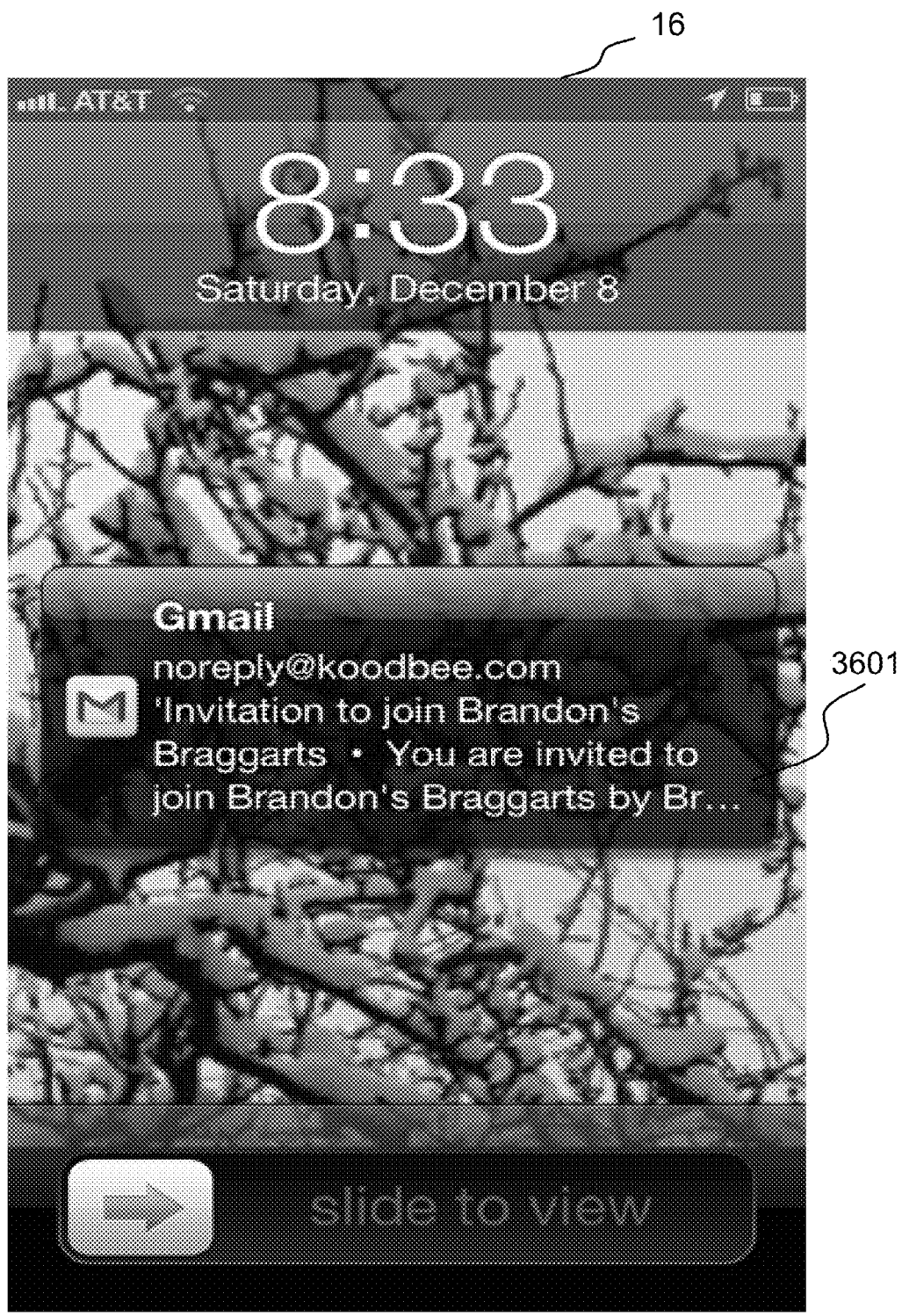
FIG. 36 is a screen capture of an invitation message generated by the crowd service of FIG. 3 and displayed on a mobile device.

With reference now to FIG. 36, in some embodiments, the crowd service 80 (from FIG. 3) instantiates an appropriate invitation object 506, 507, 510 (from FIGS. 4F, 4G and 4J) based on a invitation-triggering user event, and generates an email message inviting the recipient to join a group of players in the prediction processing system 104 (from FIG. 3). A mobile device 16 receives this message and may generate a notification message to the device user 3601.

Figure 37:
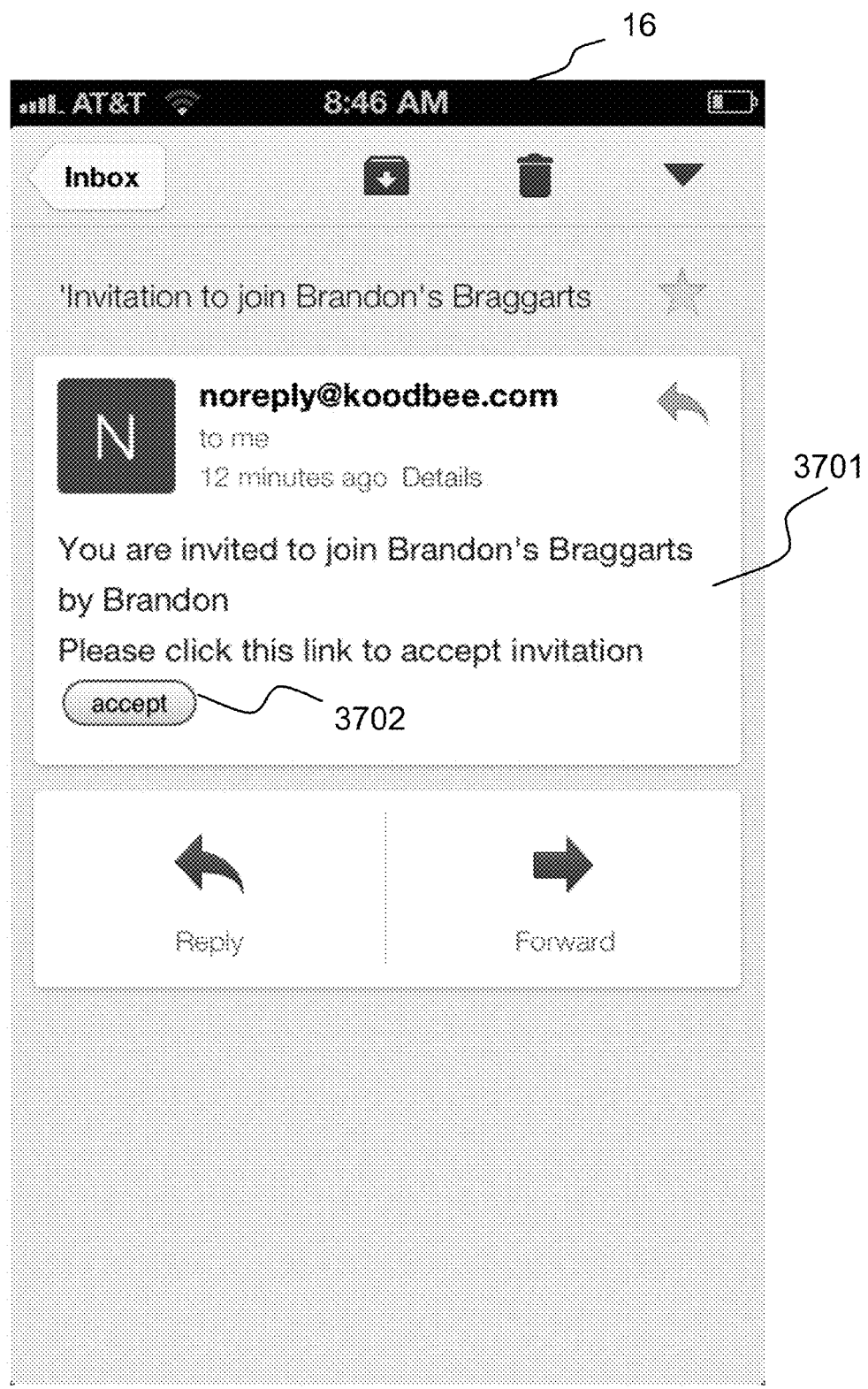
FIG. 37 is a screen capture of an email invitation generated by the crowd service of FIG. 3 and displayed on a mobile device.

With reference now to FIG. 37, the user may proceed to access the email invitation through an email app on the mobile device 16. In certain instances, the email will advise the user that they may accept the invitation by clicking on a control, such as for example, a button 3702 or an html link. By clicking on the control, an html client 70 (from FIG. 3) or a native mobile app 74 (from FIG. 3) executes and presents the user with an entry page for the prediction processing system 104 (from FIG. 3).

Figure 38:
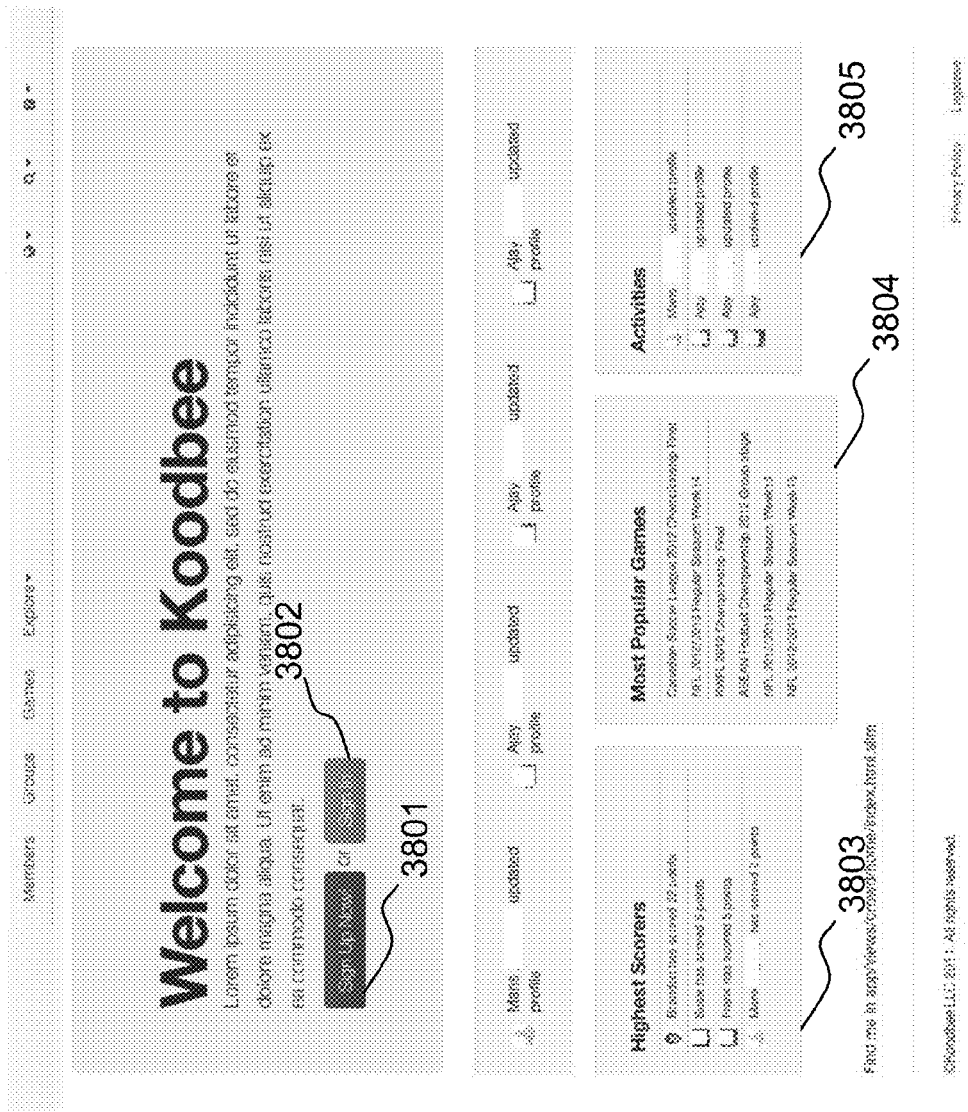
FIG. 38 is a screen capture of a pre-login welcome screen of the prediction processing system of FIG. 3.

With reference to FIG. 38, the pre-login "Welcome" page of the prediction processing system 104 (from FIG. 3) is displayed. In some instances, system activity and statistics will be displayed such as, for example, the highest scorers 3803, the most popular games 3804, and other user activities 3805. In some embodiments, the user can select the "Sign Up Now!" button 3801 control and create an account in the system. If the user already has an account, they can select the "Sign In" button control 3802 where they will be prompted by the system for their credentials.

Figure 39:
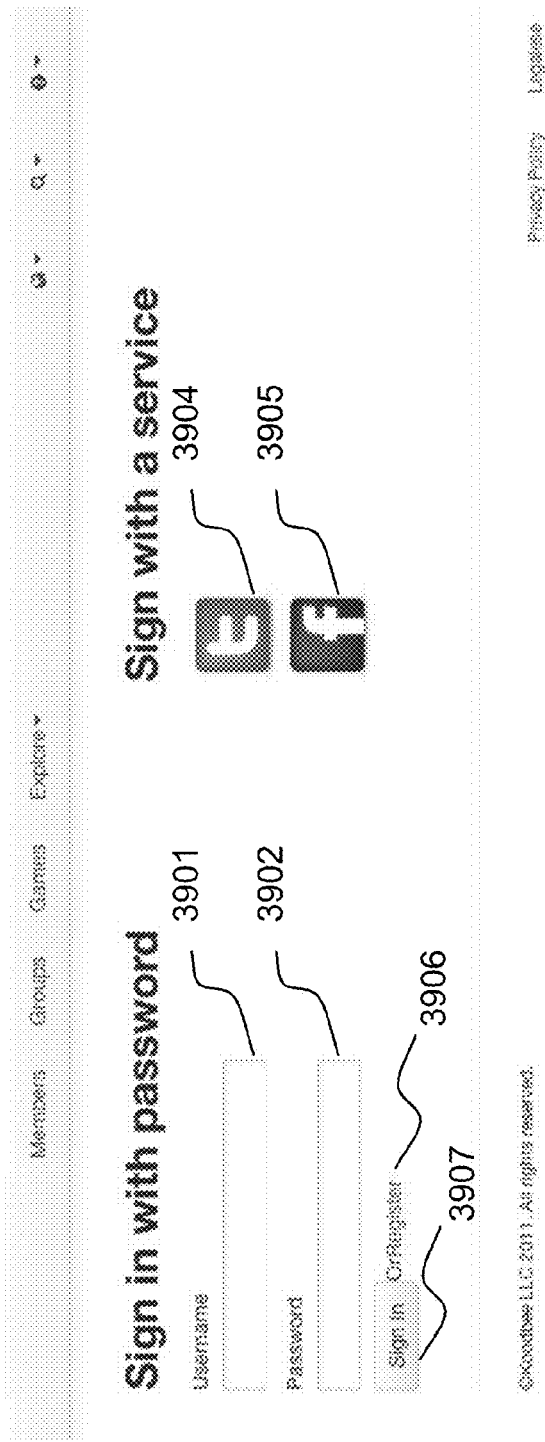
FIG. 39 is a screen capture of an integrated social network login of the prediction processing system of FIG. 3.

Turning to FIG. 39, in certain embodiments, the system prompts the user sign in 3907 with a username 3901 and password 3902 and compares these user-submitted values with Crowd::Credentials attributes 517 (from FIG. 4P). If the credentials are verified, the user gains access to the system. In some instances, the sign in process is integrated with authentication services provided by third parties such as, for example, Facebook® 3905 and Twitter® 3904. A registration link 3906 may be displayed in some applications.

Figure 40:
FIG. 40 is a screen capture of a post-login welcome screen of the prediction processing system of FIG. 3.

With reference now to FIG. 40, the Post-login "Welcome" page of the prediction processing system 104 (from FIG. 3) is displayed. This page can provide detailed information of interest to the member. For example, a notification can be included indicating that the member is participating in games which will soon close. They system can display information relating to games that have recently closed, in which, the member participated, including the member's position, accuracy, score, and amount of bonus awarded. Social activities, such as, for example, friend requests, group invitations, and invitations accepted, can be listed and made accessible through html links. Other social aspects of the system can be displayed summarily, such as the latest comments submitted, latest activities of friends, and games in which friends are participating. Another feature of the system is tracking the accuracy of a player by category 4001. The accuracy may be displayed to the member, along with member standings in general. The system may also display available and upcoming games of interest based on the member's designated interests or group involvement.

Figure 41:
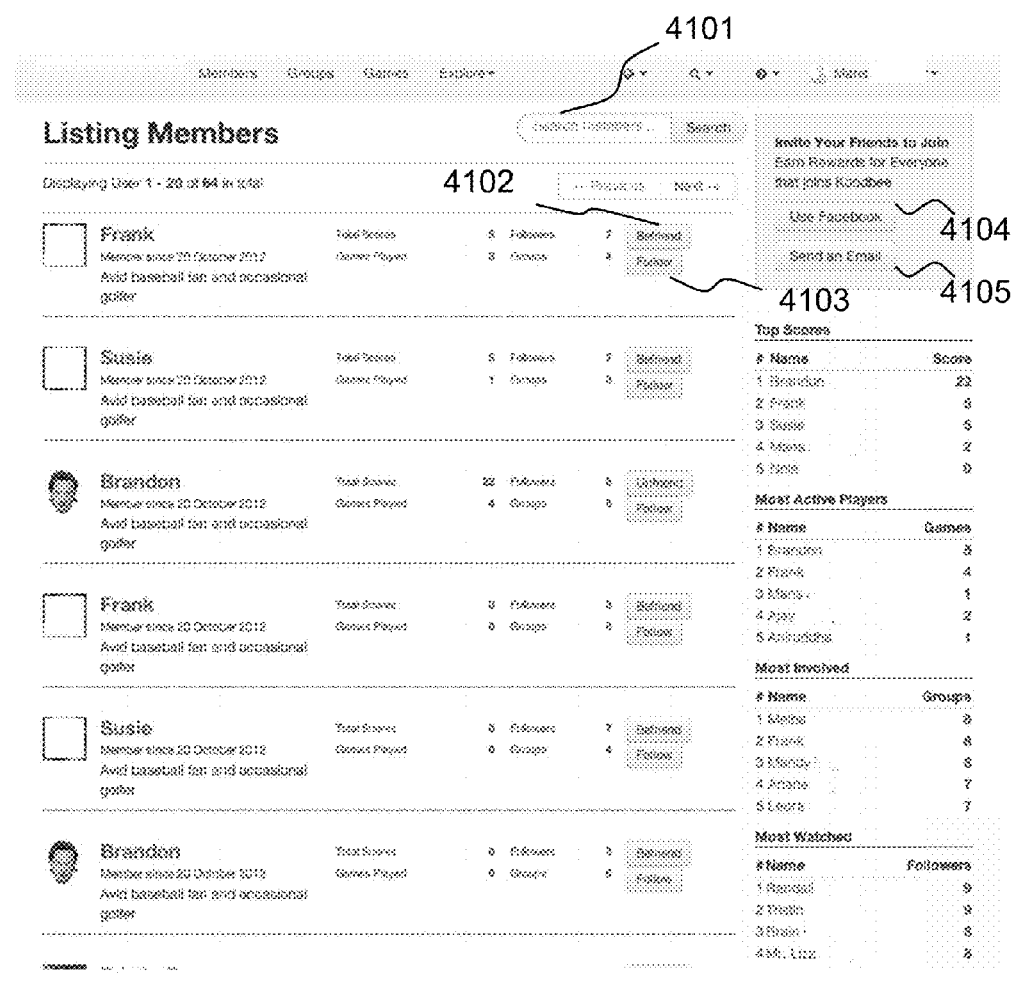

With reference now to FIG. 41, a member's page is displayed. Another feature of the system is the ability to search for members using information associated with members 4101. In some instances, details relating to members can be displayed including, for example, profile data, score, number of games played, number of followers, and the number of groups, in which they are members. Social features such as friending and following can be made available through Befriend buttons 4102 and Follow buttons 4103, respectively, for each member listed.

Another feature of the system is sending invitations via email or directly through third-party services. The "Use Facebook" 4104 and "Send an Email" 4105 send invitation to through social networks and email respectively. In addition, the system can also display list of top members for different areas, including, for example, the top scorers, the most active game players, the players with the highest group participation, and the most followed players.

Figure 42:
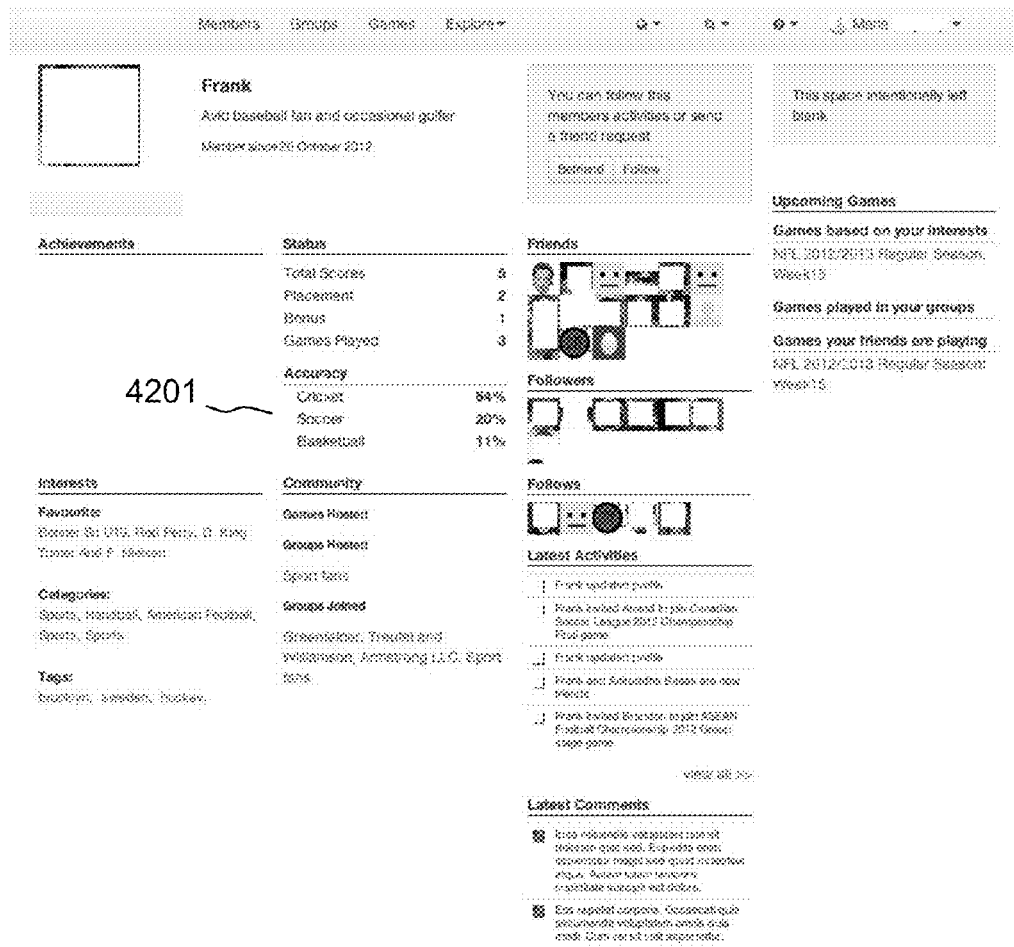
FIG. 42 is a screen capture of a member's profile page as generated by the crowd service of FIG. 3.

With reference now to FIG. 42, profile pages for members can display information of interest to other members. A member's accuracy for a different category can be displayed, along with other statistics such as their score, current position in the system, bonus awarded and the number of games played. Access to information may be limited to certain groups of players, such as, for example, the details of a member's accuracy levels 4201. Lists of friends, followers, and those the member is following may also be displayed, along with other social aspects of the system such as latest activities and latest comments. Member-specific avatars may be used along side various information items. In addition, details about a member's fandom, such as, for example, their favorite runners and/or categories, can be displayed.

Figure 43:
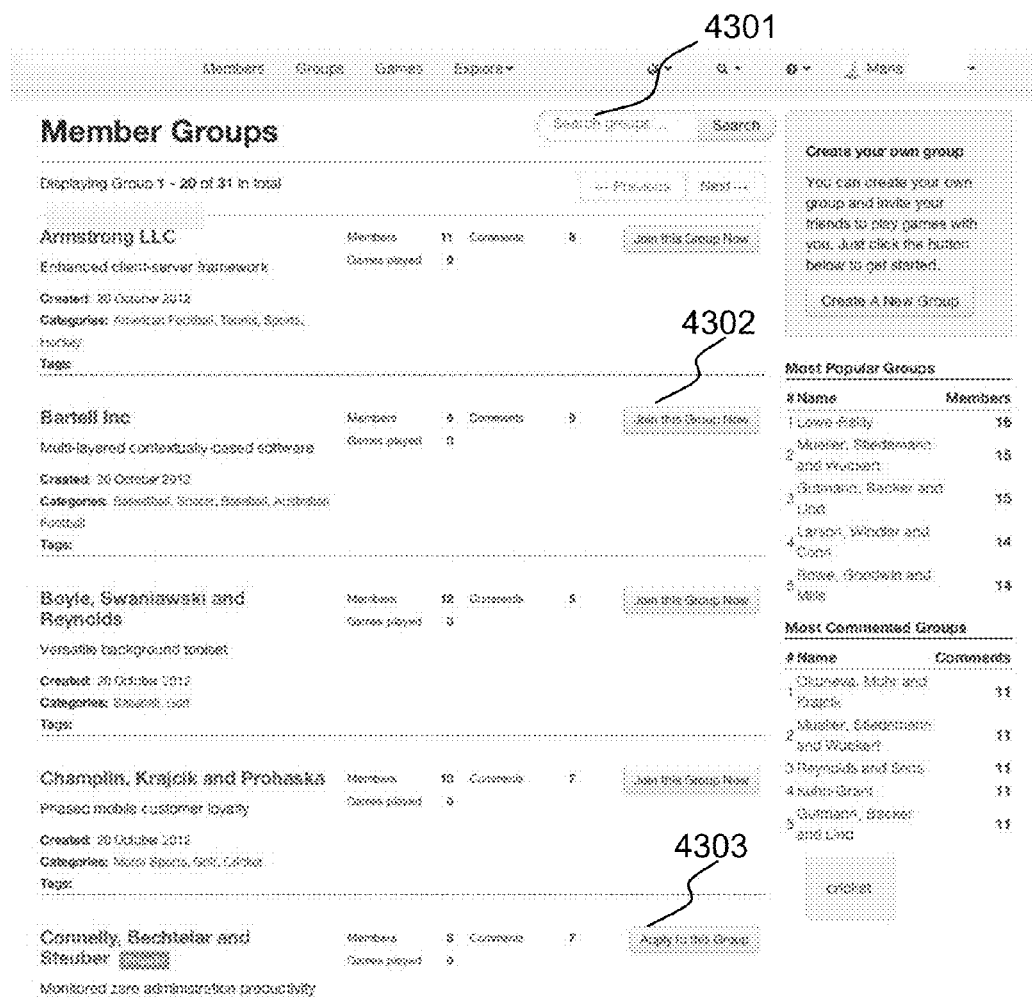
FIG. 43 is a screen capture of a member groups page as generated by the crowd service of FIG. 3.

With reference to FIG. 43, a list of groups in the system is displayed along with information about each group such as, for example, the number of members, the numbers of group games, and the number of submitted group comments. General group statistics, such as, for example, the most popular groups and the most commented groups, can also be displayed.

The system also provides the ability to search for groups using information associated with groups 4301 and to create public and private groups. Members can join public groups directly from this display by selecting the "Join this Group Now" button 4302. For private groups, members can apply to the group by selecting the "Apply to this Group" button 4303. The group page for a particular group can be accessed by clicking on the group name.

Figure 44:
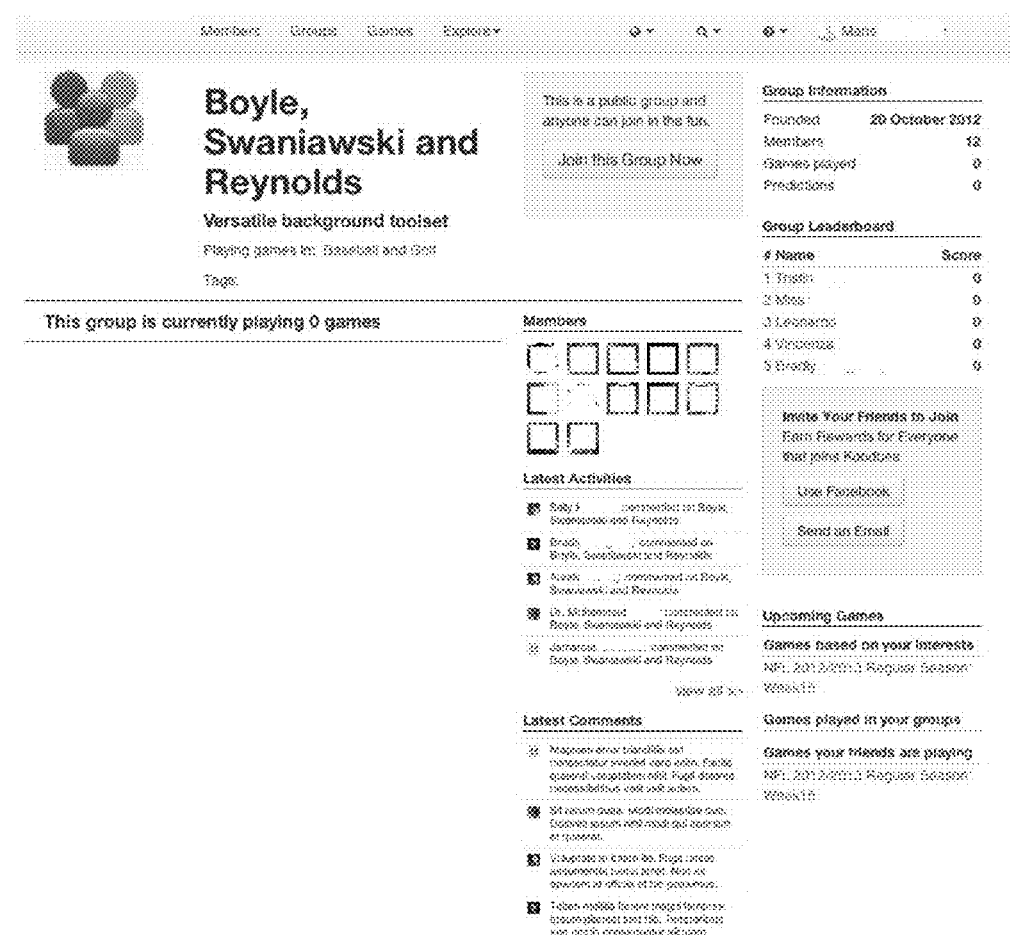

Referring now to FIG. 44, a group page for a public group is displayed. Many of the social features described in other pages disclosed herein can be available on the group page. In addition, group specific information, such as, for example, a group leader board, can be displayed.

Figure 45:
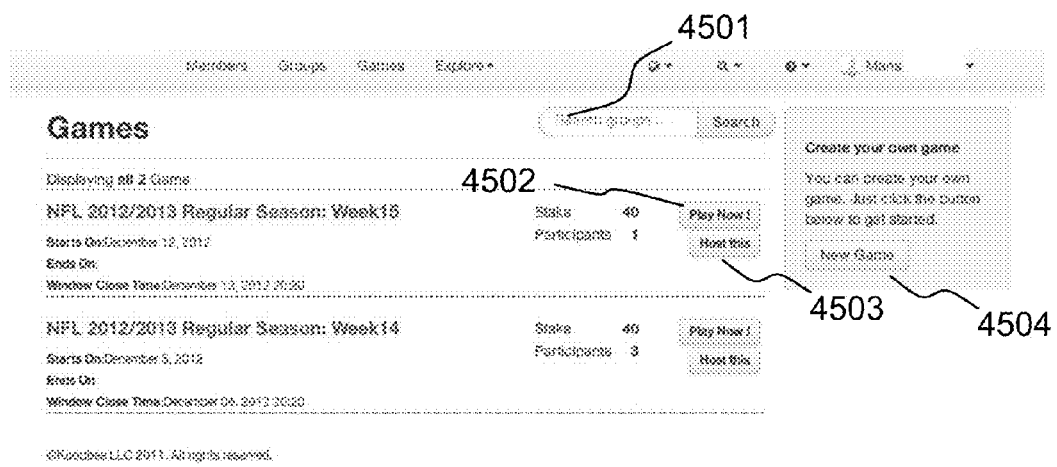
FIG. 45 is a screen capture of a public games page as generated by the game service of FIG. 3.

With reference to FIG. 45, a list of one or more games in the system can be displayed along with information about each game, such as, for example, the stake, the numbers of participants, the start date and time, the end date and time, and the window for placing picks. If desired, the stake can be the same for all players of the game. In this example, all players participating in the Week 15 game will have a stake of 40 coins with which to make picks. The system can provide the user with the ability to search for games using information associated with groups 4501. When the user is ready to play the game they select the "Play Now!" button 4502. If the user prefers to host their own instance of the public game rather than play in the public game, they can select the "Host This" button 4503 and configure a hosted instance. In some embodiments, this hosted instance can be made private. The system can further provide the user with the ability to create a custom game unrelated to the public game. The process for configuring a custom game is initiated when the user selects the "New Game" button 4504.

Figure 46:
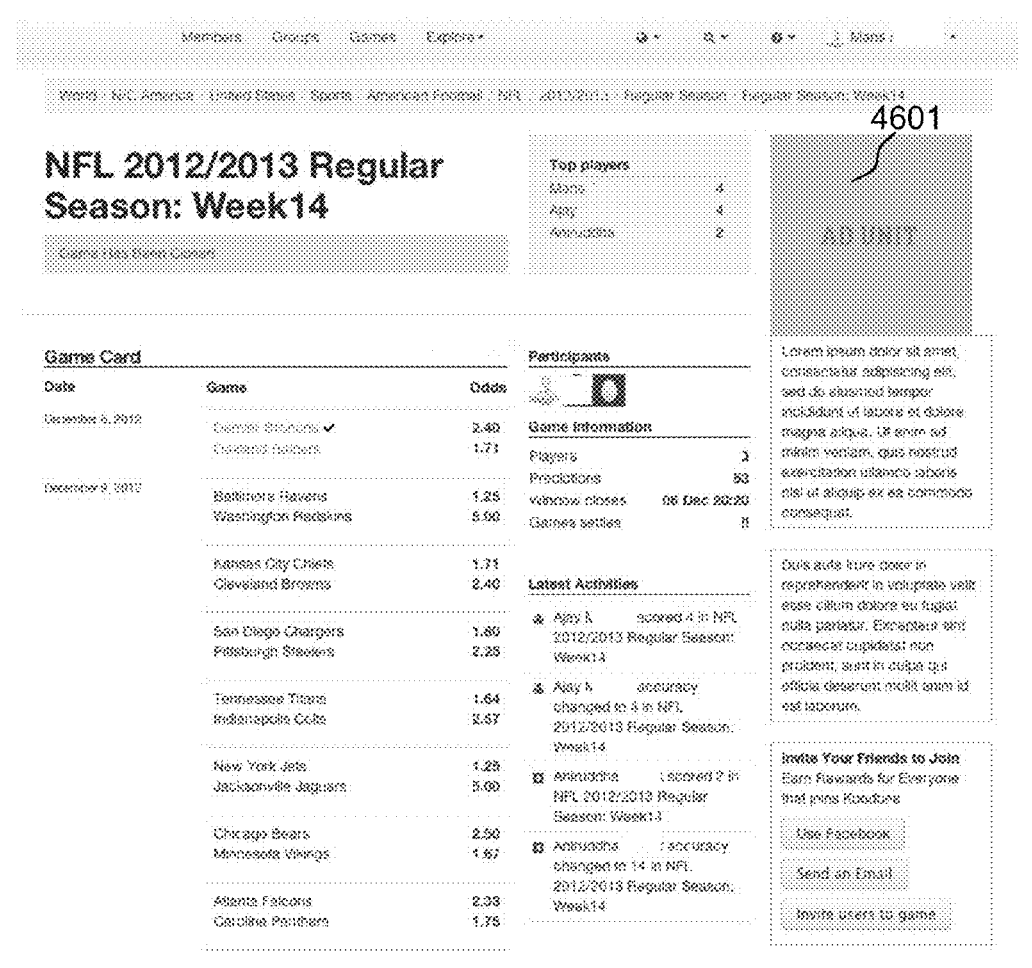

With reference now to FIG. 46, a summary page for a closed game is displayed. In certain embodiments, the final odds for the races included in the game are displayed with the winners denoted by a check mark as the game results are obtained. The top players in the game are identified as are the total number of predictions. Many of the social features disclosed herein can be available on the group page. The system can include the ability for the system provider to display advertisements in any of the various available locations, including, for example, the upper right area of the right column 4601.

Figure 47:
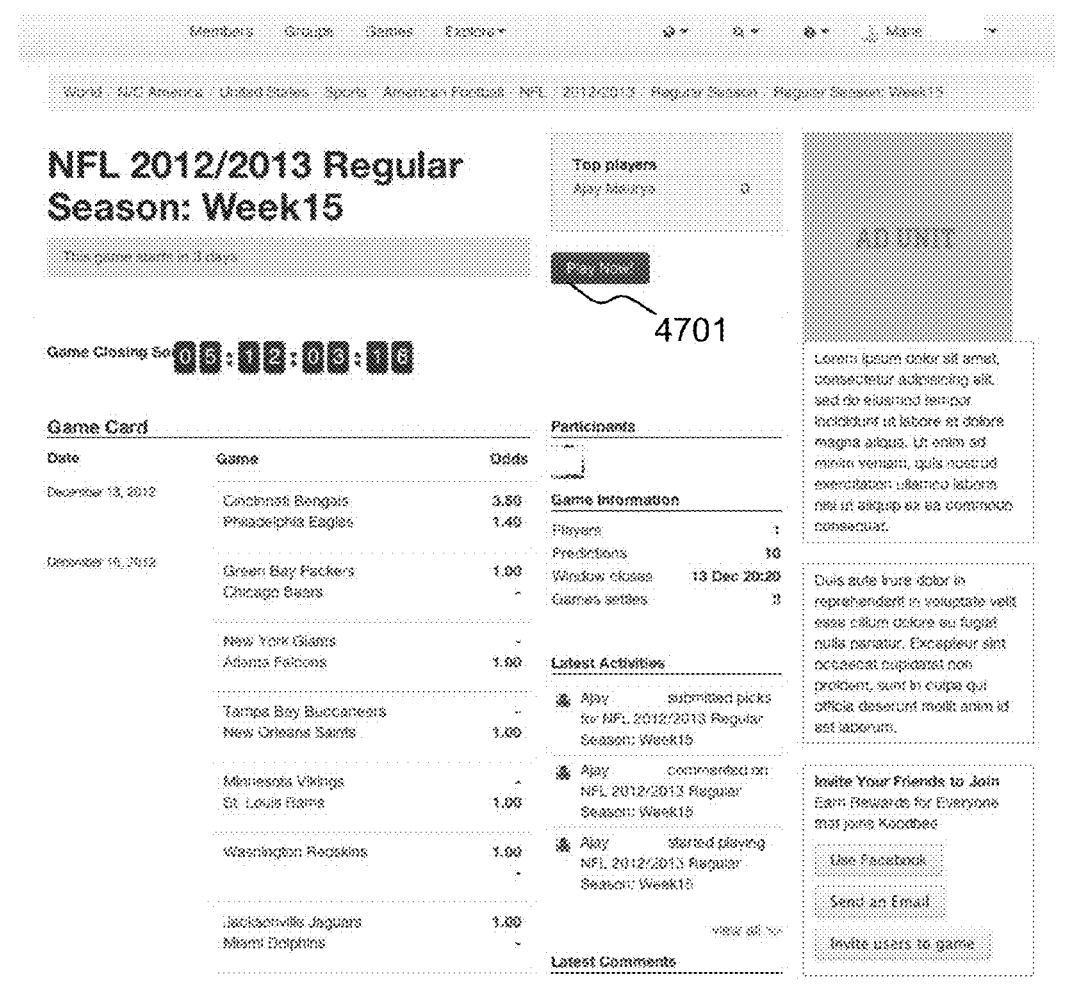

With reference to FIG. 47, a ticket page for an active game is displayed. This page is similar to the summary page for a closed game as described in FIG. 46 with some exceptions. As the game is still active, a "Play Now!" button can be provided allowing users to participate in the game 4701. A countdown clock can be displayed indicating the time remaining before the game closes and no further tickets can be submitted.

Figure 48:
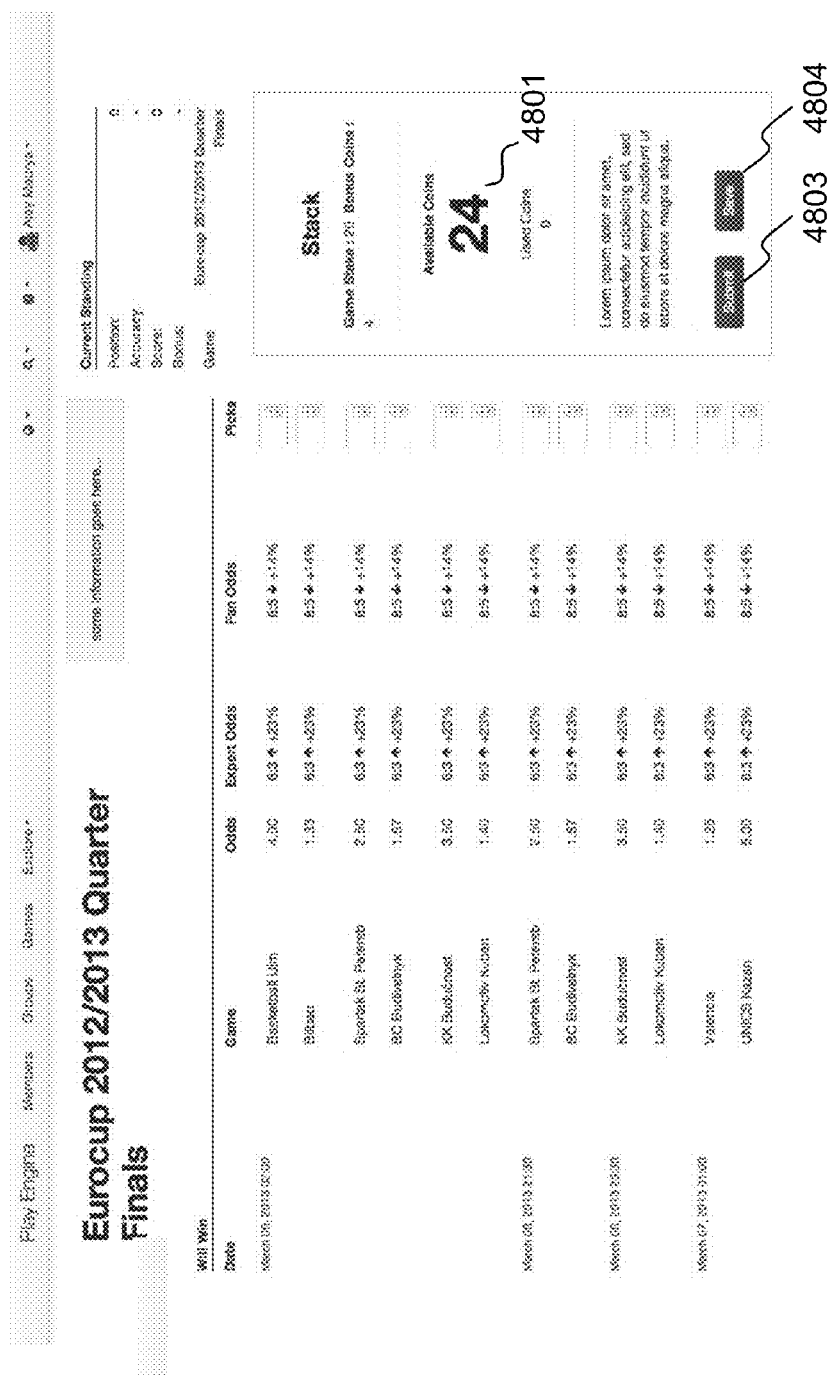
FIG. 48 is a screen capture of a scheduled game page as generated by the game service of FIG. 3.

Referring now to FIG. 48, a ticket for a scheduled game is displayed. Initial odds are displayed and the user is offered ability to wager available coins on one or more picks 4801. The system can provide the opportunity to users to earn bonus coins that are added to the stake and made available for use in game play. In this example, the game stake is 20 coins and this player has bonus coins in the amount of 4 coins for a total stake of 24 available coins. In some embodiments, bonus coins applied to the stake are limited to a defined percentage of the given stake such as, for example, 20%. This can provide a player the ability to more heavily weight certain picks. In some instances, the user can change the picks and relative weights so long as the pick window is open. A player may save their picks for later retrieval and submission without submitting the ticket for inclusion in statistical calculations 4804. Once the player has met all ticket submission requirements, the player can submit the ticket for inclusion in statistical calculations 4803. In some embodiments, the player may cancel or edit the ticket until the pick window for that game closes.

Figure 49A:
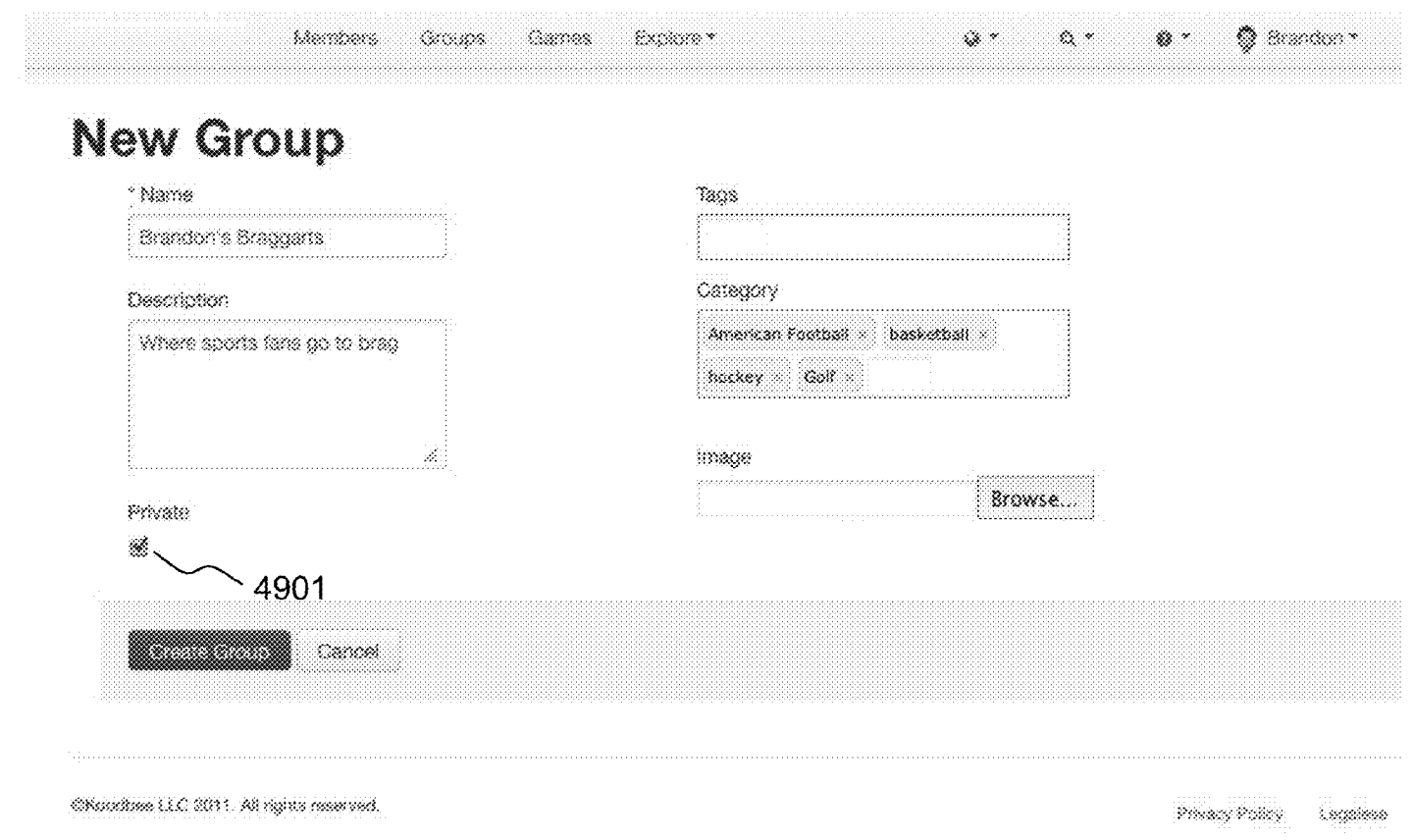

With reference now to FIG. 49A, a group creation page is displayed. In some embodiments, the creator of the group can enter group information, such as, for example, a group name, description, associated search tags, and categories. Any and/or all of this information can be searchable by the user. An image may be associated with the group.

Figure 49B:
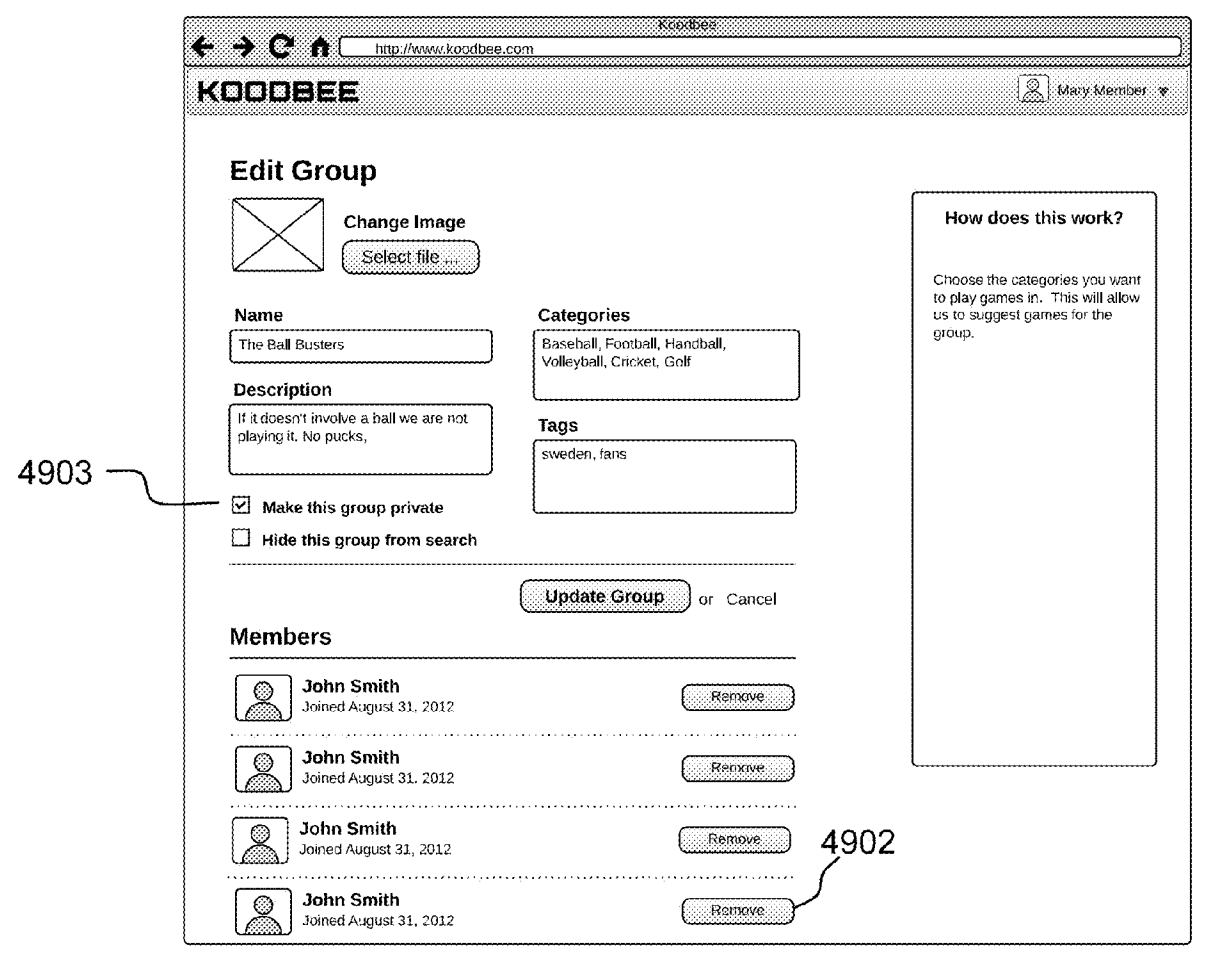

Groups can be made private 4901, 4903 (from FIG. 49B). In some instances, a private group can be discovered through search, but submitting an application is required for becoming a member of the group. In an alternate or additional embodiment, the group cannot be discovered through search or accessed in any manner without first being granted access through a process such as invitation.

With reference to FIG. 49B, an edit group wireframe is displayed. The edit group page is similar to the group creation page, although it additionally includes a list of current members and an associated button for a group administrator to remove members 4902.

Figure 50:
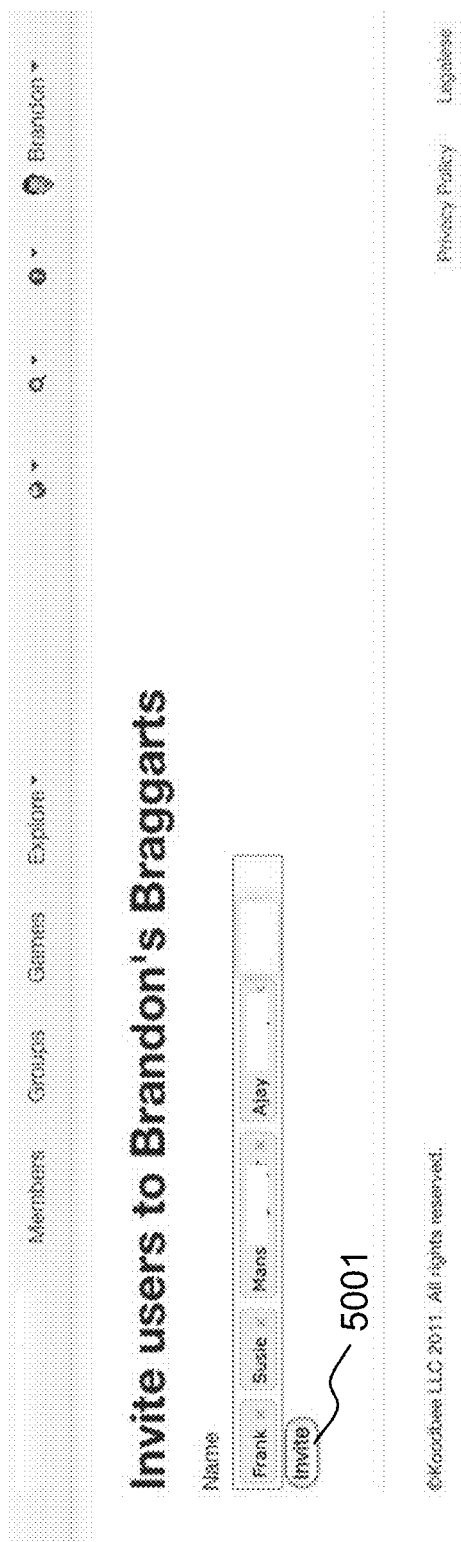
FIG. 50 is a screen capture of an invite page as generated by the crowd service of FIG. 3.

Once a group is created, the group administrator may want to invite members to join the group. With reference now to FIG. 50, in invitation page is displayed. Members can be added and removed from a list, and once complete, the group administrator can send the invitations to the invitees by selecting the invite button 5001.

Figure 51:
FIG. 51 is a screen capture of a groups page as generated by the crowd Service of FIG. 3.

With reference now to FIG. 51, a member's group page is displayed. This page summarizes group information and outstanding group activities. In some embodiments, all of the member's groups are displayed, along with their private status if applicable, the number of members, and whether the member is the owner of the group. The page can also provide a list of outstanding group applications, as well as a button to cancel a given application request 5101, and a list of membership requests for groups owned by the member. These membership requests can be approved or denied by the member selecting the appropriate button 5102.

Figure 52:
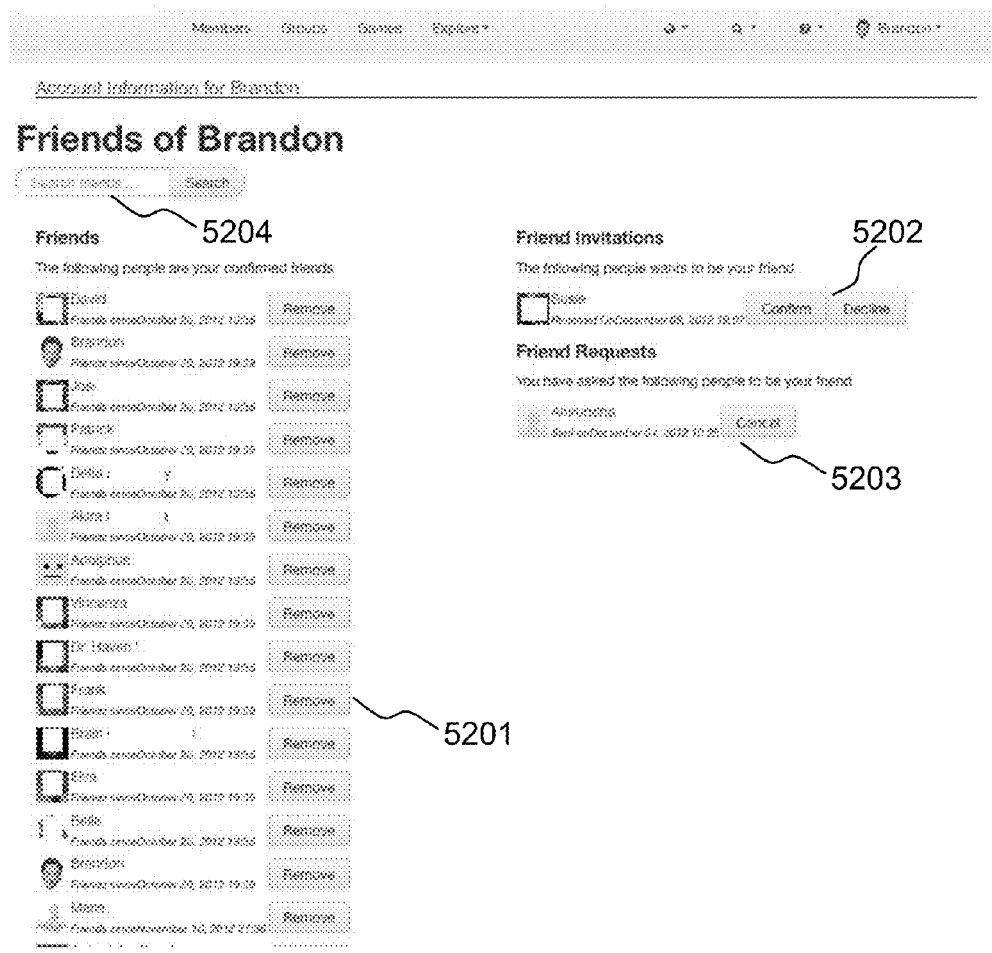
FIG. 52 is a screen capture of a friends page as generated by the crowd service of FIG. 3.
Figure 53:
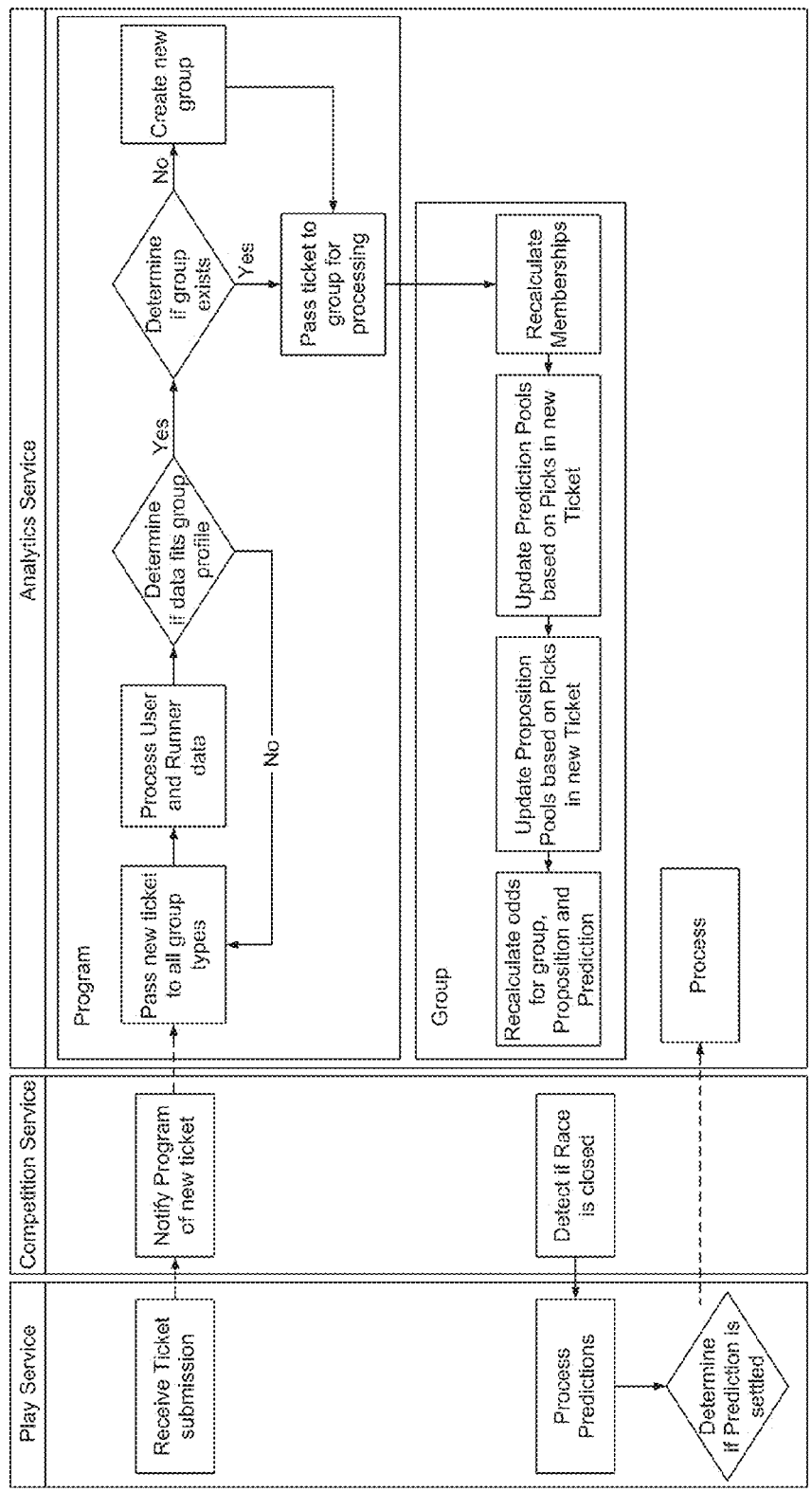
FIG. 53 is a flowchart of a process for processing ticket submissions.

With reference now to FIG. 52, a friends listing page is displayed. In some instances, friends of the member are listed along with other information, such as, for example, the time since friendship was initiated. The page provides a button for the removal of each friend 5201, as well as buttons to confirm or deny pending friend requests 5202. A button is also provided for canceling outstanding friend requests sent by the member 5203. The system also can provide users the ability to search for members to add them as friends using information associated with members 5204.

Figure 54:
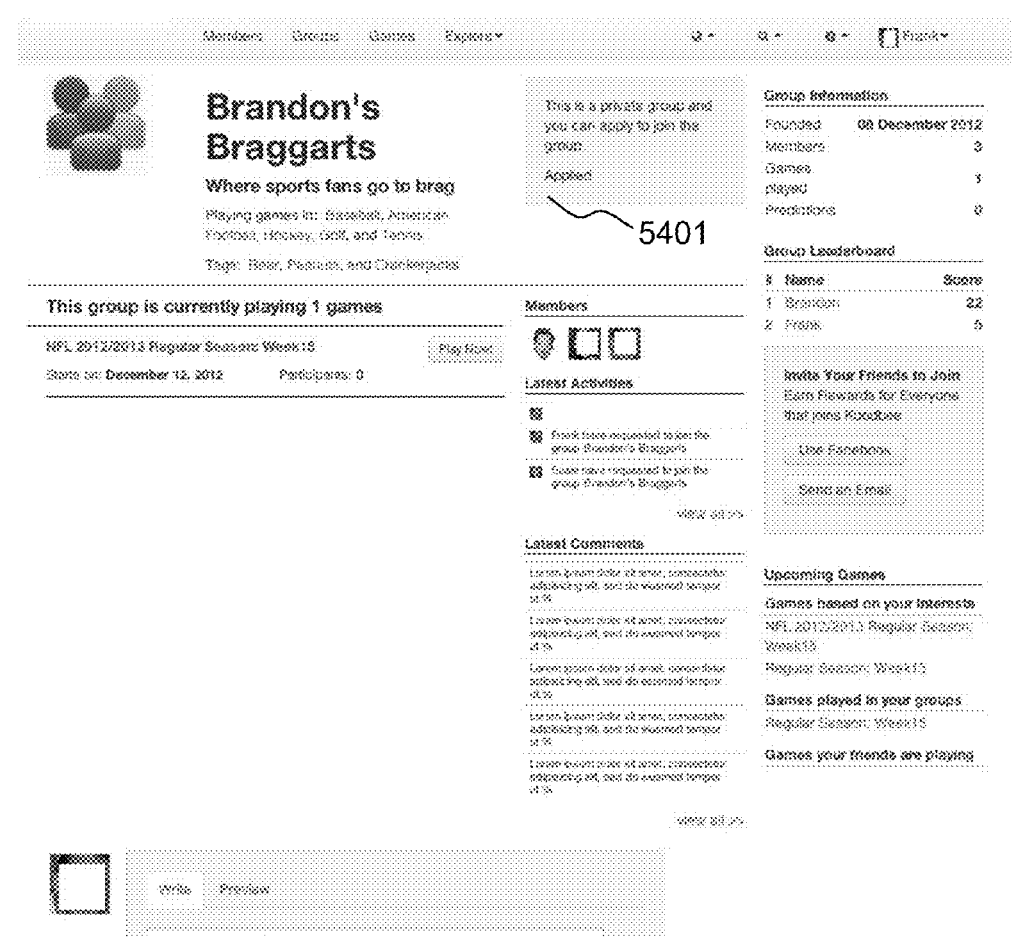

With reference now to FIG. 54, a private game page is displayed. The system can allow users to make a game private when creating new games 4503 (from FIG. 45). In order to participate in a private game, a user applies for admission to the game, and the game owner then accepts that application to admit the user to the game. In this example, an application has been submitted but has not yet been approved 5401. In some embodiments, the private game and related game information are discoverable through searching only to members whose applications to the game have been approved by the game owner.

Figure 55:
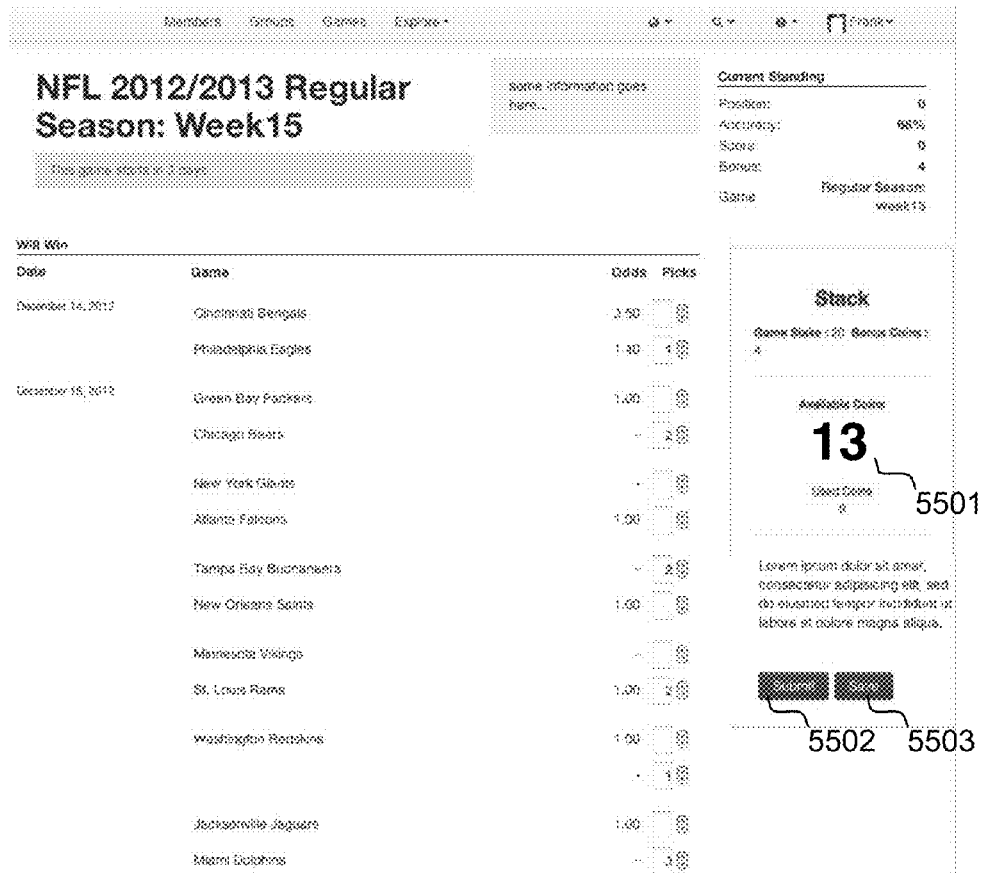
FIG. 55 is a screen capture of a scheduled game showing predictions made and remaining stakes.

With reference now to FIG. 55, a scheduled game is displayed with 11 coins placed on 6 picks. The available coins are decreased from 24 to 13, displaying the remaining available coins 5501. The page can provide a "Save" button 5503 allowing a user to save their picks without submitting the ticket. The user can then return to the page later to submit their ticket using the "Submit" button 5502.

Figure 56:
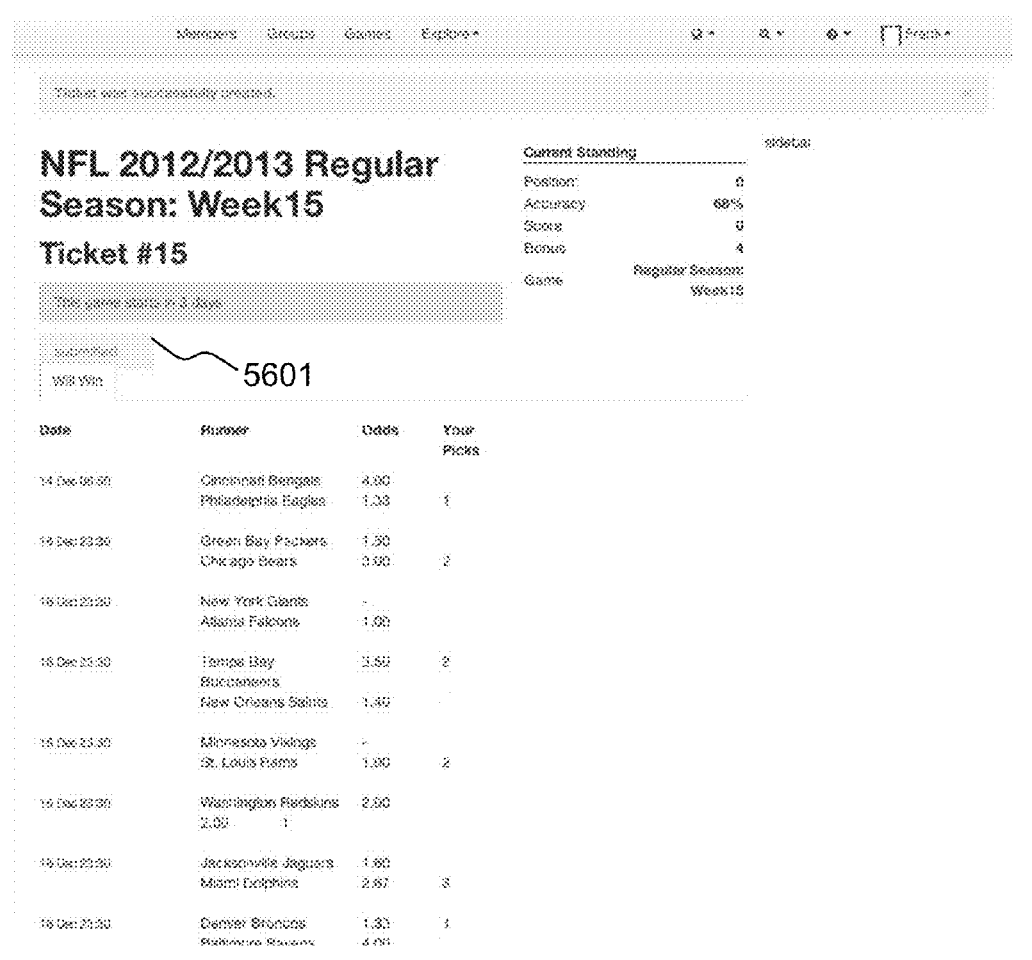

With reference now to FIG. 56, once the picks are submitted, the picks are included in any applicable statistical calculations. The submitted state can be indicated by the appearance of a "submitted" label 5601. A single ticket can be allowed for a given program. In this example, the member is allowed to submit one ticket for the NFL Week 15 game.

With reference to FIG. 57, the submitted picks for the scheduled game of FIG. 55 is displayed. Another feature of the system is the calculation and display of multiple sets of odds. In some embodiments, the system will display global odds 5701 and one or more sets of group odds such as, for example, expert odds 5702 and/or fan odds 5703 for each race. In some instances, one or more of the group odds will only be available to a subset of the users. Access may be predicated on a purchase amount, achieving a certain level of performance in preceding programs, and/or being designated as a member of a group with access.

Figure 58:
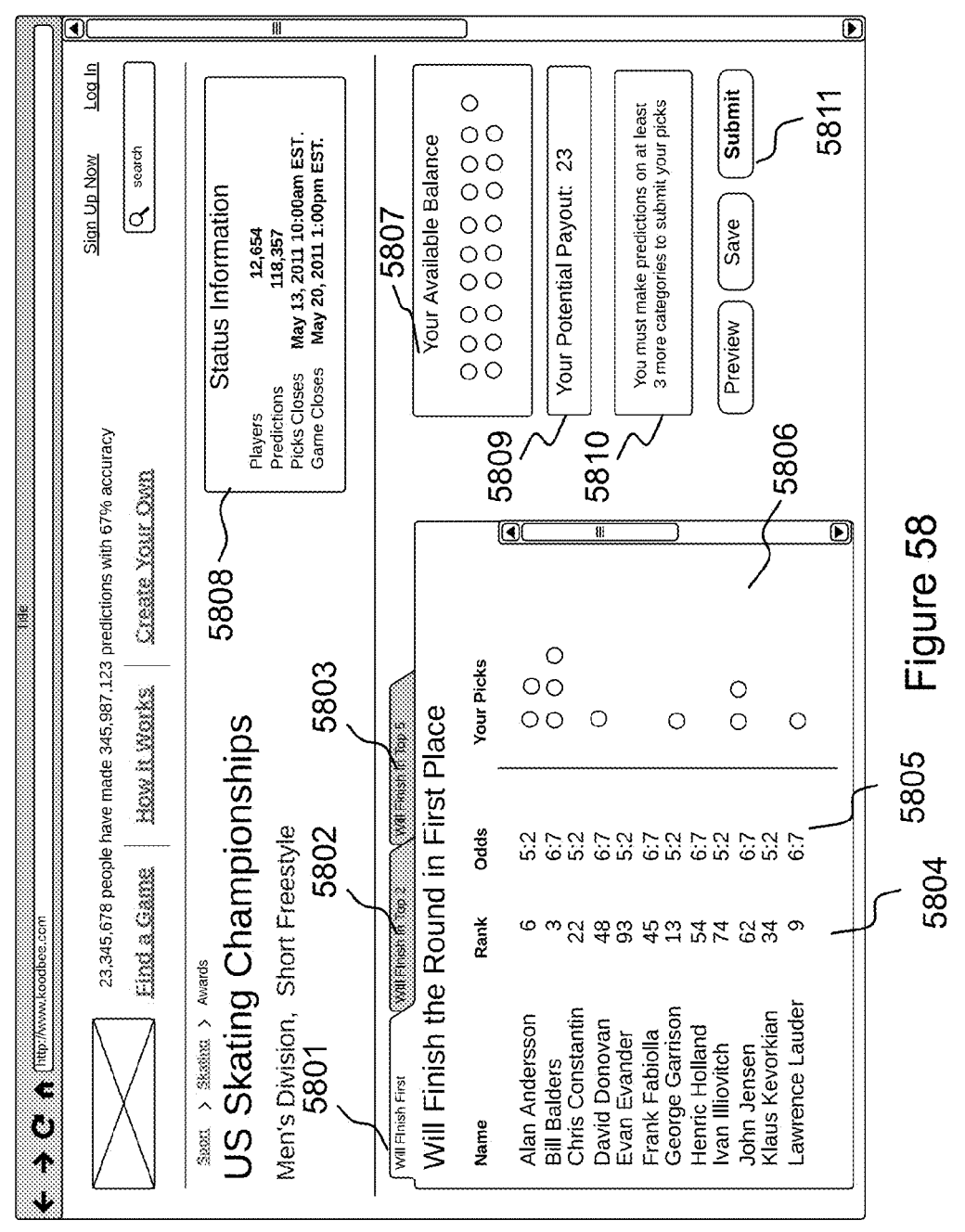

With reference to FIG. 58, a wireframe of a sporting event game page is displayed. In certain embodiments, multiple propositions types are displayed in a tab format. The first tab is an example of a Will Win proposition 5801, while the second and third tabs are examples of Will Win In Range On propositions 5802, 5803. Each tab represents a race in this example with additional run information 5804 provided along with the global odds 5805 for the run.

Figure 59:
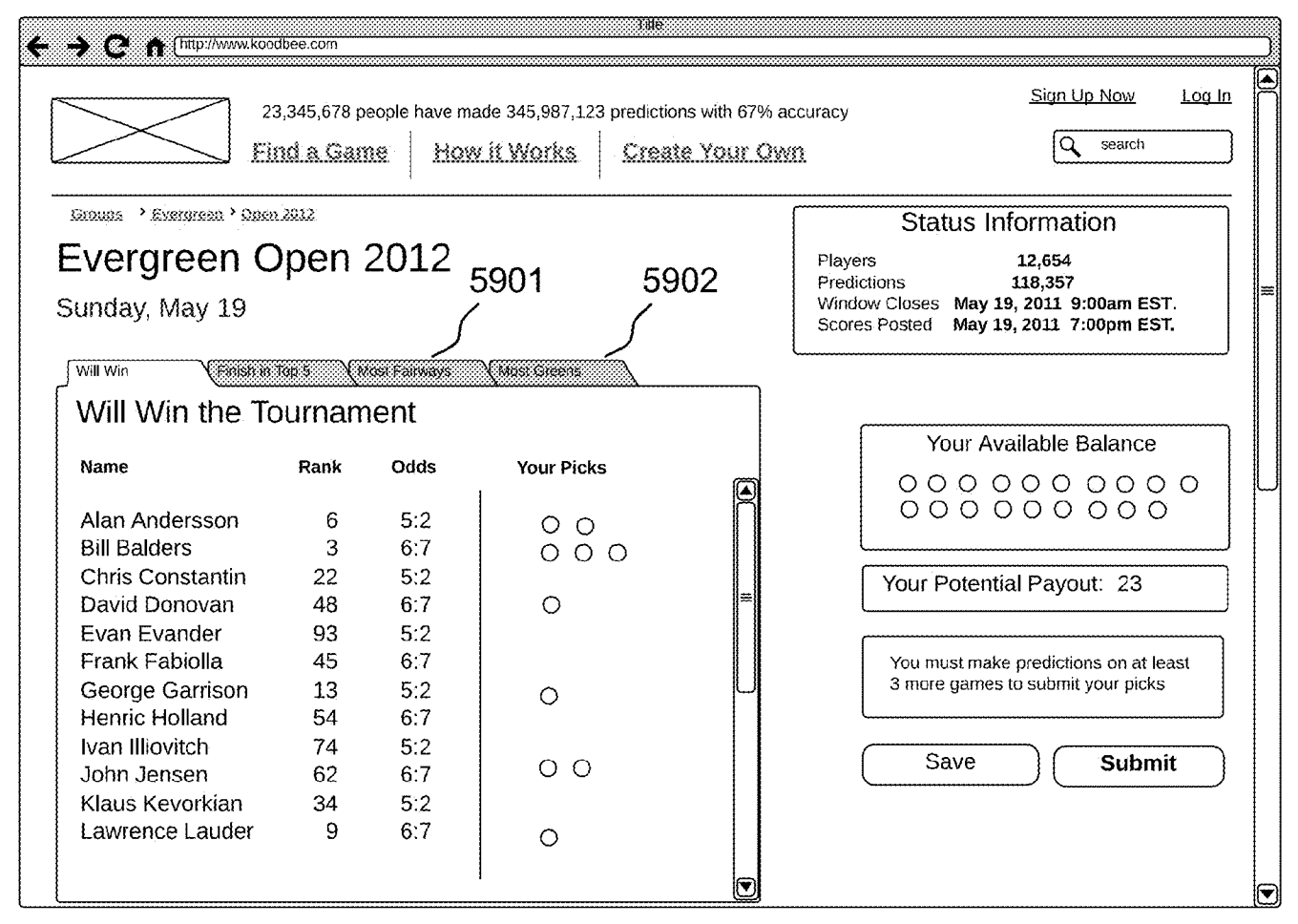

Referring to FIG. 59, a wireframe of a second sporting event game page is displayed. This example pertains to a golf tournament, and includes two additional Will Win When Sorted On propositions, one for the golfer that hits the most fairway shots 5901, and one for golfer that hits the most greens 5902.

With reference again to FIG. 58, in-game currency is represented by coin graphics rather than a numeric representation 5806. This is also the case for the player's available balance 5807. In some instances, statistical information relating to the game may be reported in a status format 5808, and the potential payout based on the current pool is displayed 5809. The system can require players to make a certain number of picks to be able to submit a ticket. In this example, the requirement is predicated on making picks in three or more categories 5810. In some embodiments, the Submit button 5811 is not enabled until the pick requirement is met.

Figure 60:
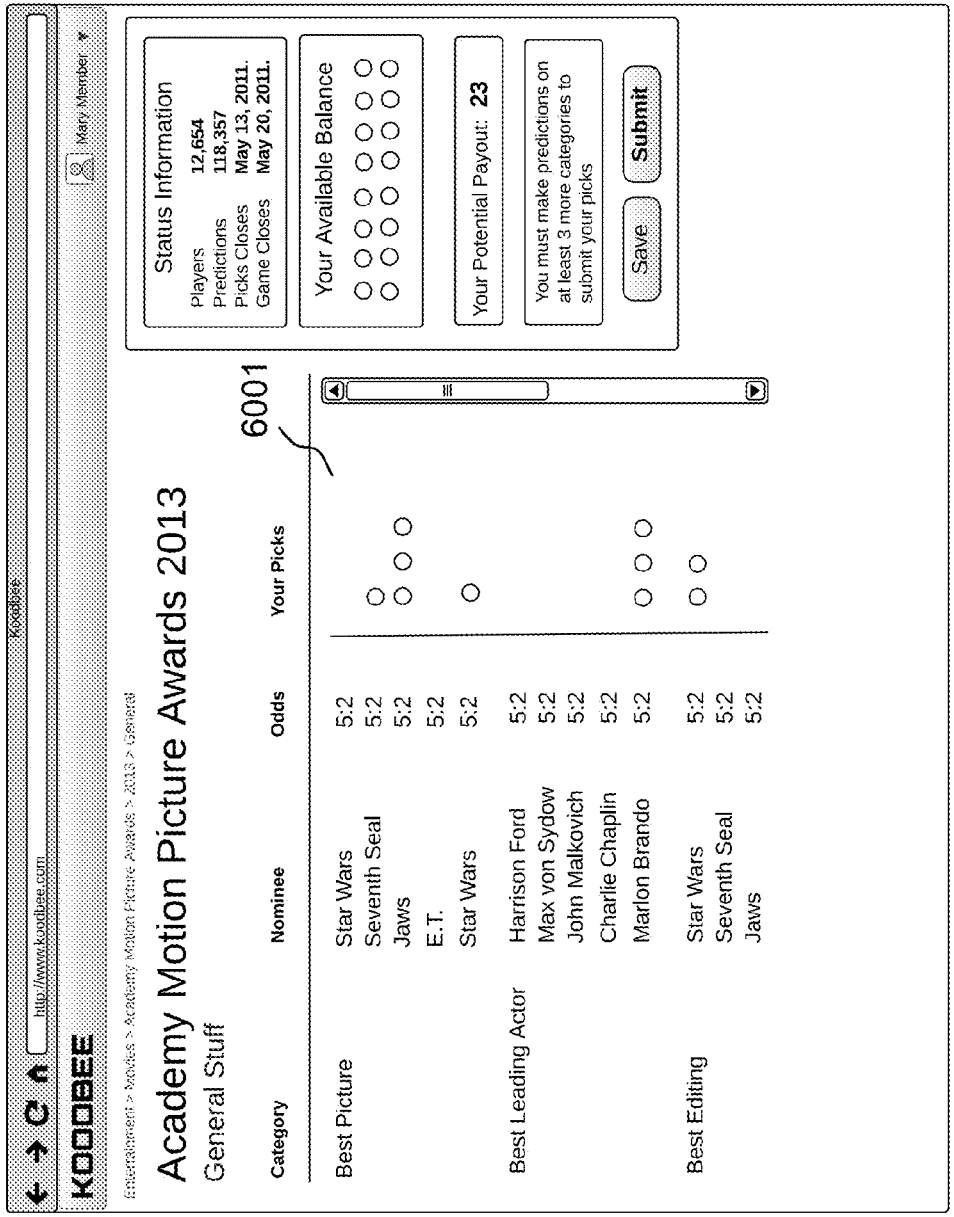
FIG. 60 is a wireframe of an active game page displaying a series of Will Win Propositions for an awards event as generated by various services of FIG. 3.
Figure 62:
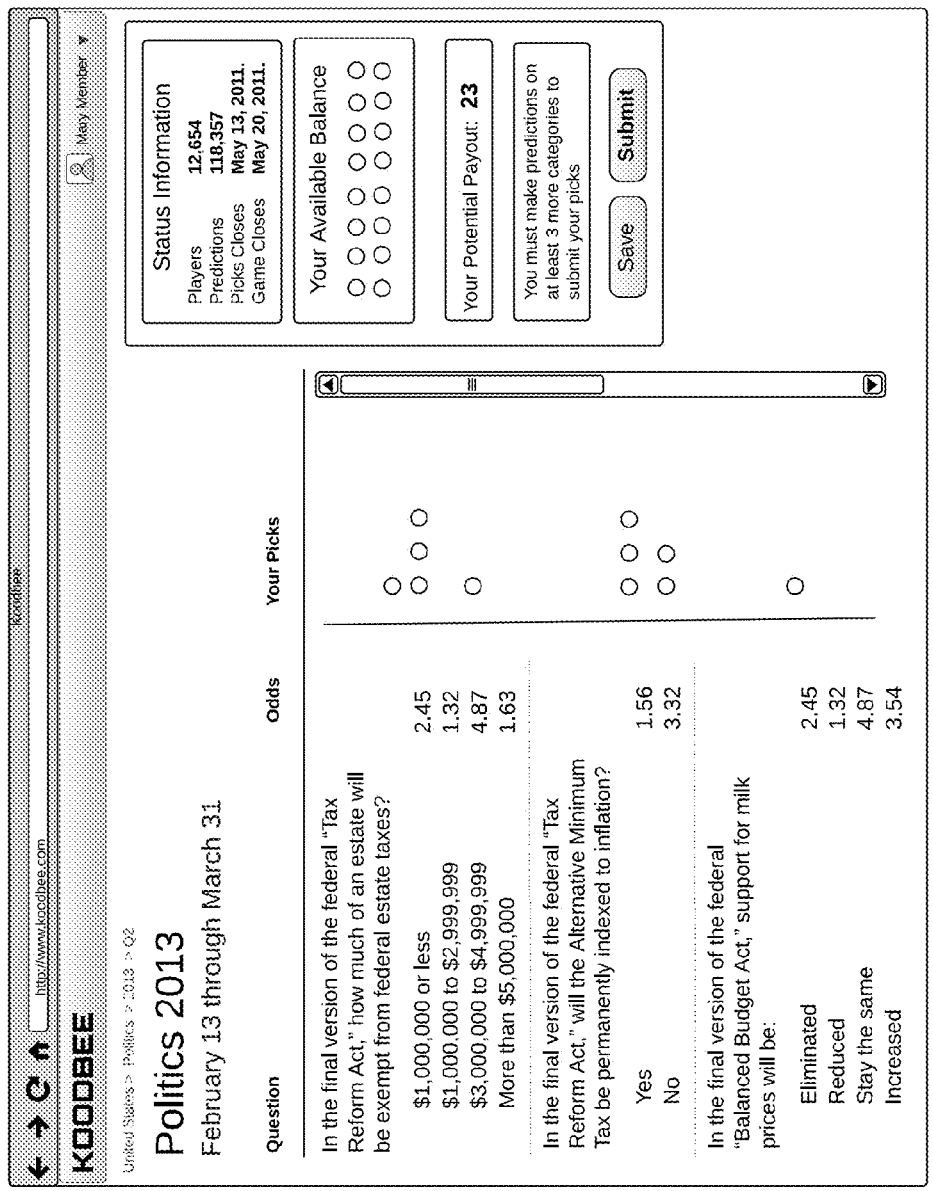
FIG. 62 is a wireframe of an active game page displaying a series of Will Win and Compare On Propositions for Political events as generated by various services of FIG. 3.

In some embodiments, the system supports non-sports related games. With reference to FIG. 60, a wireframe of an awards event game page is displayed. In an alternate embodiment, the display will be a scrolling table without tabs 6001. In this example, a series of Will Win propositions are presented for various awards categories. With reference to FIG. 61 and FIG. 62 respectively, a wireframes of a news game event page and a politics game event page are displayed. In both these example, a series of Will Win and Compare On Propositions are presented. With reference now to FIG. 63, a wireframe of an election event game page is displayed. In this example, a series of simple Will Win propositions are presented based on various election races.

Figure 64:
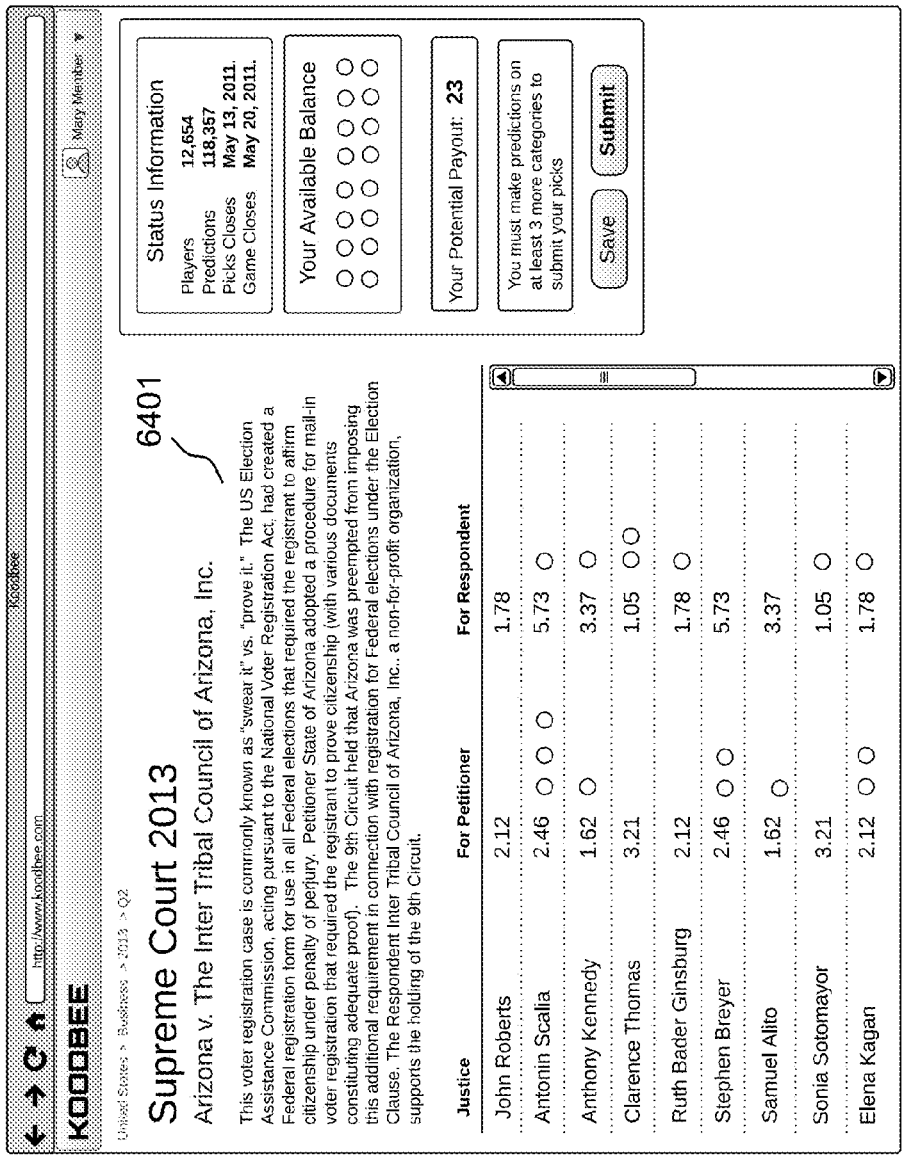
FIG. 64 is a wireframe of an active game page displaying a series of Will Win Propositions for Supreme Court decisions as generated by various services of FIG. 3.

With reference now to FIG. 64, a wireframe of a court event game page is displayed. In some embodiments, a detailed summary of the subject matter of the race can be displayed on the race page 6401. In this example, a series of Will Win propositions are presented relating to the individual decisions of the various Justices.

With reference to FIG. 65, a wireframe of a business event game page is displayed. In some instances, a player can pick mutually exclusive runs for a single race, and can vary the coins placed on the exclusive picks 6501. In certain embodiments, members can create custom private games. With reference now to FIG. 66, a custom game for a little league team is displayed where a series of Will Win proposals are configured for a particular weeks games.

Figure 67:
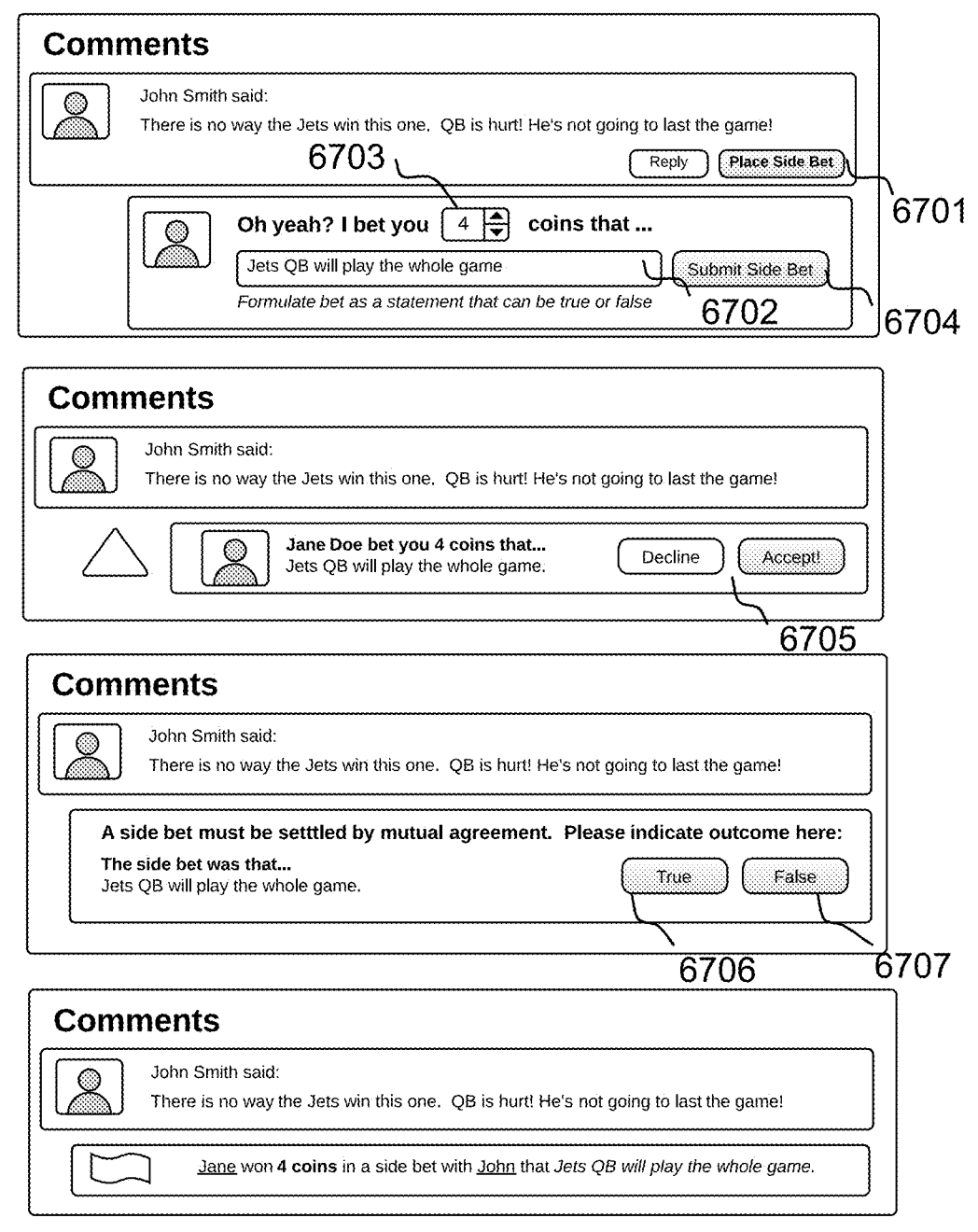

The system can include ability for users to place side bets without impacting odds calculations. With reference to FIG. 67, a comment thread including a negotiation and placing of a side bet is displayed. An additional "Place Side Bet" button 6701 in the comment window generates an additional window where the commenter can submit a side bet. The user enters a true/false statement in an edit box 6702, enters a number of coins or virtual goods to bet 6703, and selects the "Submit Side Bet" button 6704. The other user on the thread is then presented with a window presenting the bet and offering appropriate buttons to either accept or reject the bet 6705. Once the event to which the bet applies has concluded, an outcome selection dialog is presented to the individual accepting the bet where they can select the "True" button 6706 if the outcome was true and the "False button 6707 is the outcome was false. The bet is settled based on this response.

Figure 68:
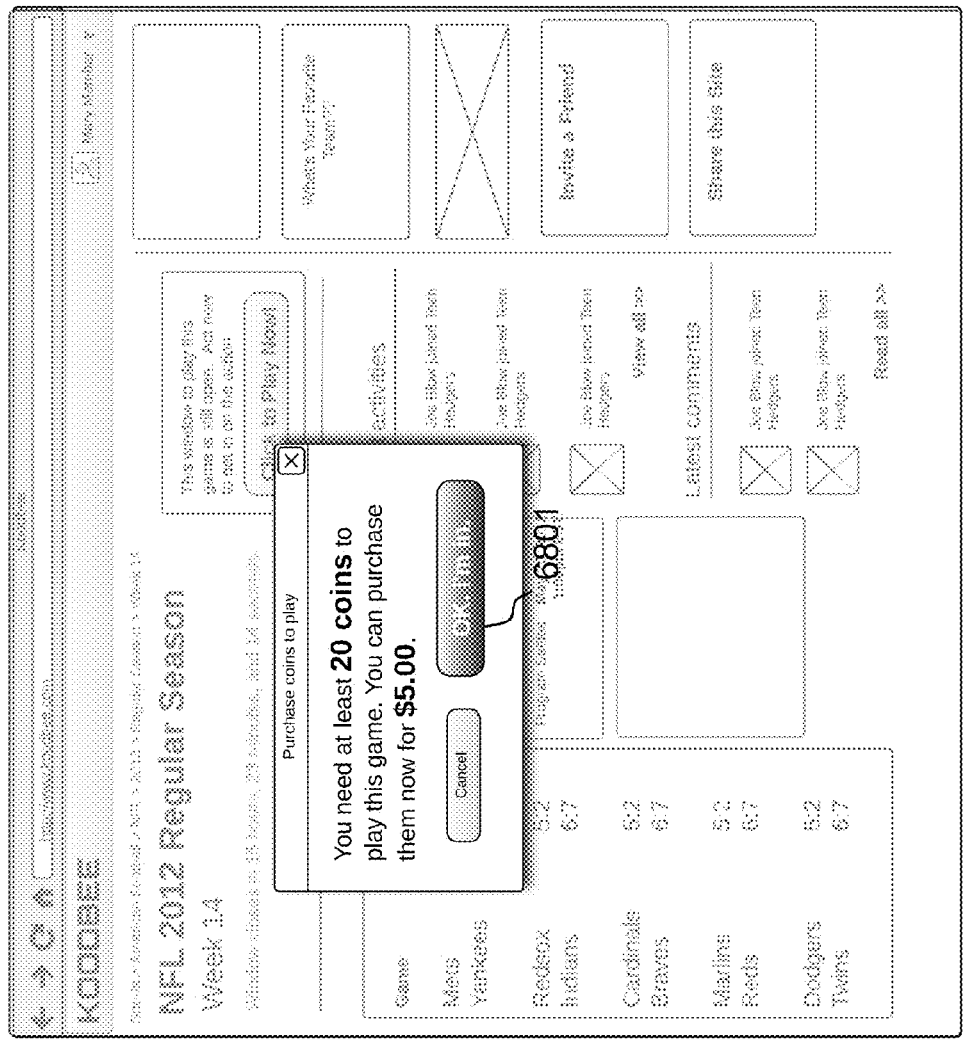
FIG. 68 is a wireframe of a modal dialogue box offering a Player the option to purchase In-Game Currency in exchange for In-World Currency.

The system can also provide support for wagering in-world currency. With reference to FIG. 68, a dialog is displayed offering a player the opportunity to purchase coins for in-world currency. The player selects the "OK. I'm in." button which will initiate the process of debiting an in-system account where the player has already deposited money and/or made funds available through a third party service.

The system can provide functionality for sharing system content with third parties. With reference now to FIG. 69, a wireframe describing three content-sharing options is displayed. In some embodiments, a link to the content of interest is provided and the user is presented with a series of third-party services icons to select from. When the user selects an icon, the content is published to that third party service in accordance with the integration defined by that third party 7001. In some instances, the user can copy a pre-formatted code snippet to paste into web page and embed the content as a widget 7002. A user can also share by sending an email of a link prepared by the system, in some applications, that provides direct access to the content of interest 7003.

Figure 70:
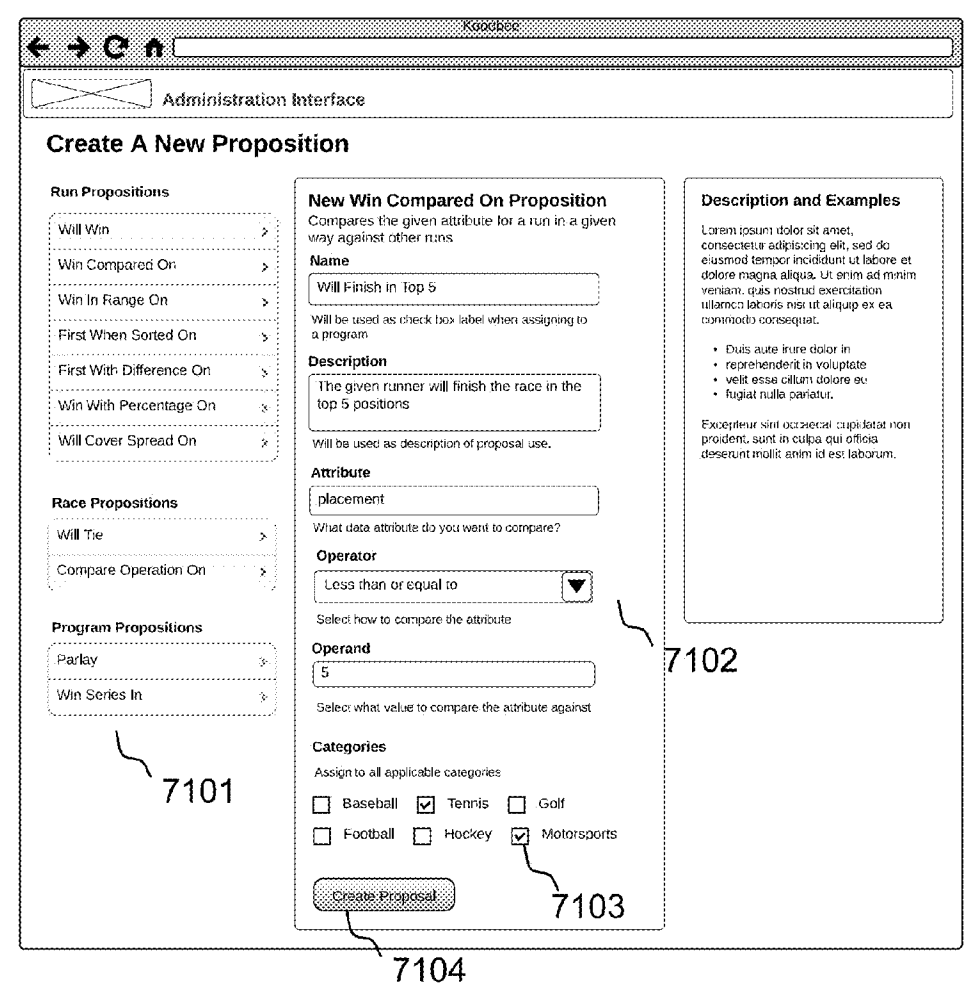

With reference now to FIG. 70, a proposition creation and assignment page wireframe is displayed. In certain instances, the left column displays a list of the proposal types available in the proposal framework 7101. When a proposal type is selected, the second column is populated with the appropriate choices for creating the proposal 7102. For example, the Compare On proposal requires a name, description, attribute, compare operator, and operand.

Proposals can be associated with categories. This association allows the system is to automatically generate propositions for events with a given category based on proposals associated with that category. In some embodiments, a user creating a proposal can associate the proposal with one or more categories by selecting the appropriate checkboxes 7103 and selecting the "Create Proposal" button 7104.

With reference now to FIG. 71, a game creation and proposition assignment page wireframe is displayed. In certain embodiments, the left column contains a list of data 7201 used in the game initialization process 2804 (from FIG. 28). The center column can contain a list of propositions 7202 appropriate for the game based on the game's category or parent program. The system can rely on the association to automatically generate valid predictions.

Figure 72:
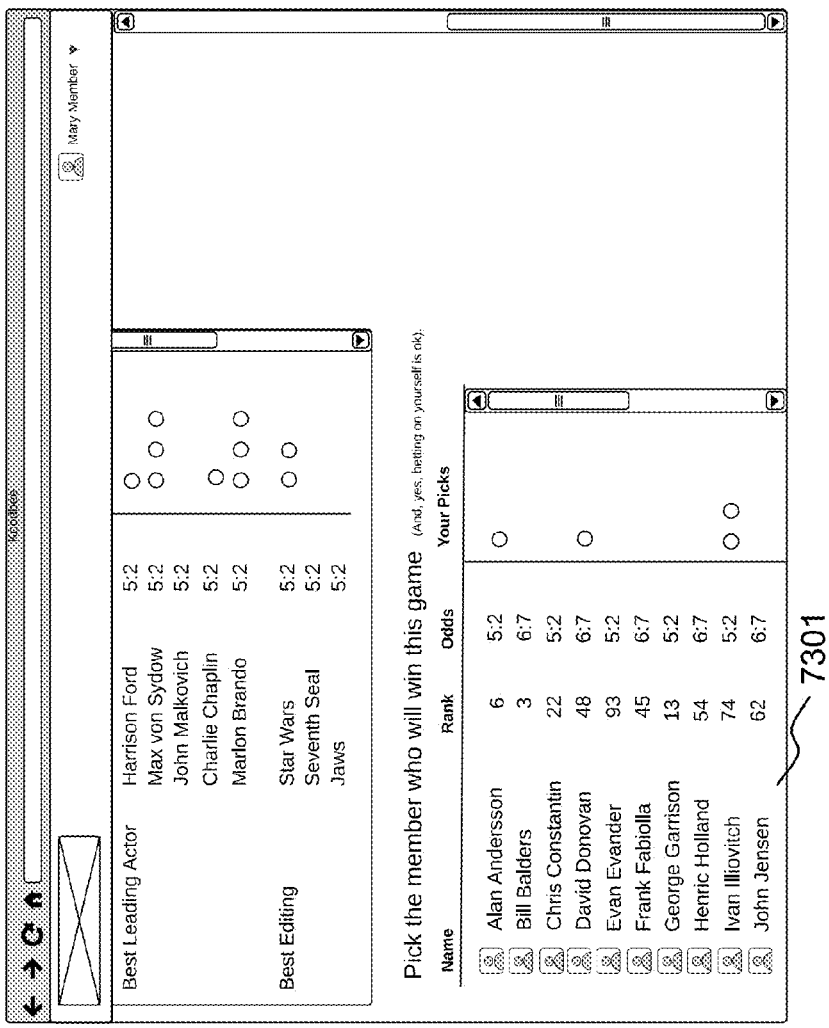
FIG. 72 is a wireframe showing the predicting of the performance of players in a game.

With reference now to FIG. 72, a wireframe of a pick member page is displayed. Users can make picks on the performance of one or more players participating in a particular game. The players are managed as runners in a race where the run is the player's performance in the game and the race is the set of runs by all players in the game. In some embodiments, player information is shown, such as, for example, the player's rank and the odds of their winning the game 7301.

The prediction processing system can monitor and offer prediction services for many different types of events such as, for example, sporting events, awards programs, talent shows, celebrity news, jury verdicts, political elections, judicial decisions, and/or business milestones. The reliable odds and/or derivative data relating to real-world outcomes generated by the prediction processing system is newsworthy content that can be distributed in various formats such as, for example, subscription feeds and/or reports. Derivation data, particularly high-accuracy and/or high-reliability data derived from better-performing groups of predictors, can, in some instances, be offered at a premium price.

In some embodiments, advertising revenue can be generated by charging advertisers, sponsors and affiliates a fee to display and/or communicate advertising to users of the prediction processing system. In some embodiments, the association of certain tags with a user can drive the appearance of advertising. Advertising can also be driven by a user's profile information, the category of one or more programs, and/or other data attributes stored in the persistence layer 106 (from FIG. 3). In certain applications, the feed service 86 (from FIG. 3) can include advertising content in data feeds. Additional news about competitive events across a variety of sparsely-covered subjects can be generated and distributed or a fee.

It is typical for the host or producer of a major event to offer promotions to stimulate interest in advance. In some instances, the prediction processing system can provide prediction games for such events, including, for example, the Oscars® and March Madness®. Sports media often provide prediction games to their audiences as well. In both such cases, the prediction system can be provided as a hosted promotion solution for a fee.

In some embodiments, in-game purchase can be a source of revenue. Users can purchase in-game currency such as, for example, virtual goods and/or coins for use in making picks and/or social activities. In some instances, a premium level of play offering highly competitive games, additional information, and/or access to better-performing players can be offered for a fee without regard to a user's performance. In some instances, these premium benefits are generally available to players exceeding a defined performance threshold.

In certain instances, the prediction processing system can be offered as a for-fee hosted system to businesses, non-profit organizations, schools, government, or other interested parties. Trade media, for example, can provide, to their readers, prediction games relating to events affecting their industry. This type of engagement can promote a connection with a motivated audience on a dynamic basis. The information generated by the activity of the game play and social interaction can be used as searchable content on subjects that are of interest to industry participants.

Like readership for trade media, employees can be a source of business intelligence for employers. In some instances, use of the prediction processing system can be offered to employers and by consultants for a fee. Fear of attribution and retribution can inhibit open and honest assessments of corporate plans and actions. In some embodiments, employees can make anonymous predictions on matters of interest to their employer including, for example, assessments of such corporate plans and actions. In certain applications, anonymous subpools of the best predictors can be identified that may generate accurate information of interest to the employer.

Figure 73:
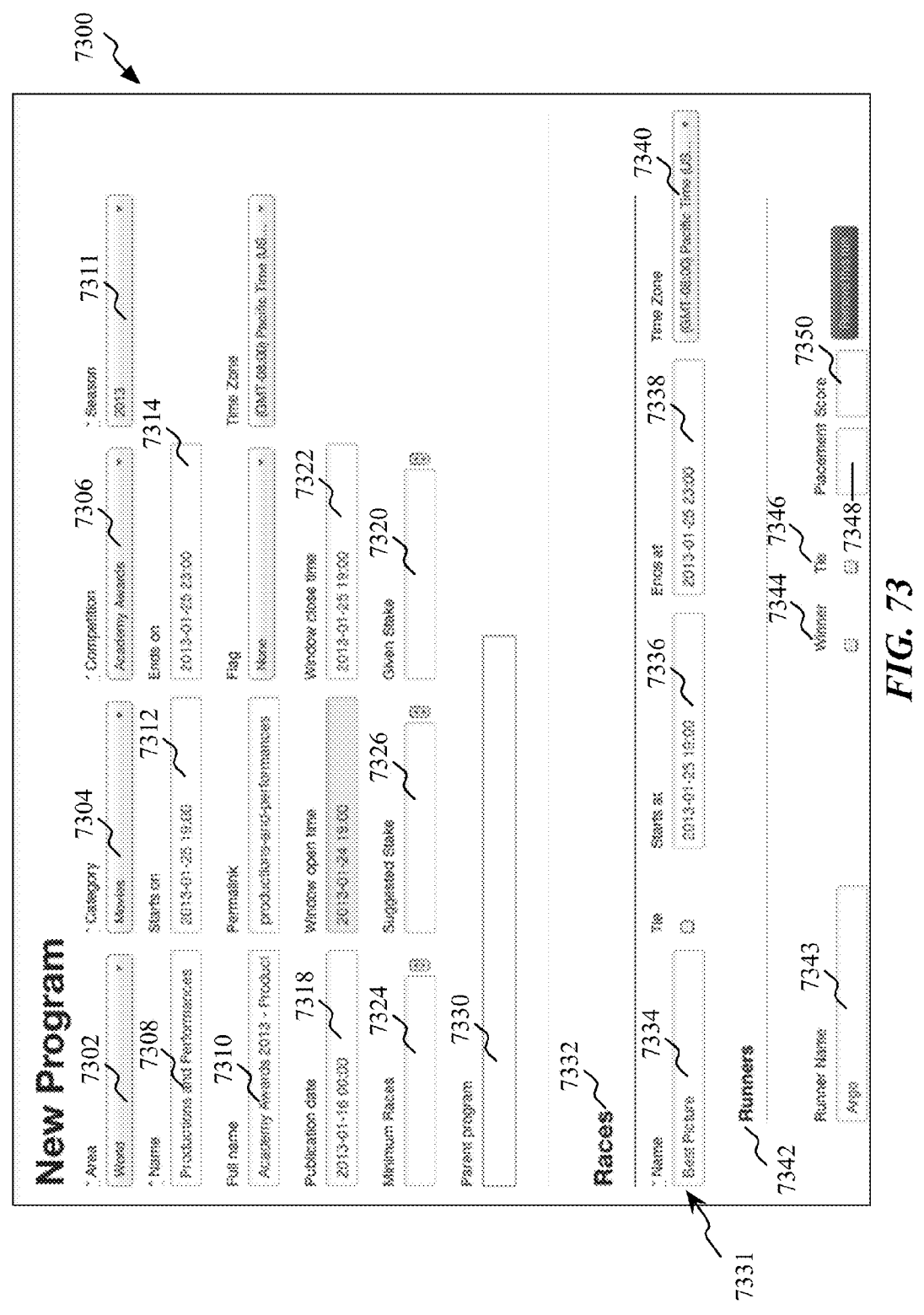

Referring now to FIG. 73, the system can provide a novel system administrator interface, generally 7300, through which a system administrator enters information to establish a new program, sometimes at the request of an End User. The system administrator enters context for the program, such as geographic Area 7302, Category 7304, and type of Competition 7306. The System administrator enters a general category Name 7308 and specific Full Name 7310 for the program. If the program is recurring, the system administrator may define (i) a Season 7311 having Starts On 7312 and Ends On 7314 dates and times for the program and (ii) the applicable Time Zone 7316. The system administrator may enter a string for inclusion in a permalink address, such as a fixed URL, for distribution to players of the program. The system administrator can also enter when the program can be visible to End Users 7318 along with the pick window Opening 7320 and Closing 7322 dates and times for players to create, edit, and/or cancel tickets. In addition, the System administrator can establish a Minimum required number of Race predictions 7324 for the program, the Suggested Stake 7326 to be provided by players themselves when making predictions during game play, and any Given Stake 7328 provided by the system to players when the player commences play within the program. In some embodiments, the stake is a fixed equal amount provided to all players of the program. Finally, the system administrator can identify a Parent Program 7330 of which this program is a sub-part.

Next, the system administrator can establish one or more Races 7332 within the Program. For each race, e.g., 7331, 7333 (see FIG. 74), the system administrator enters the Name of a race, e.g., 7334, when the applicable race Starts 7336 and Ends 7338, and the applicable Time Zone 7340 for the race. Each Race 7332 may have one or more Runners 7342. Within the Race 7332, the system administrator can then enter information about each of the Runners, such as the Runner Name 7343. For each Runner, upon completion of the race, the System administrator can identify if the runner is a Winner 7344 if applicable, if the runner was in a Tie condition with another runner 7346 if applicable, and the applicable runner Placement 7348 and Score 7350 as applicable.

Figure 74:
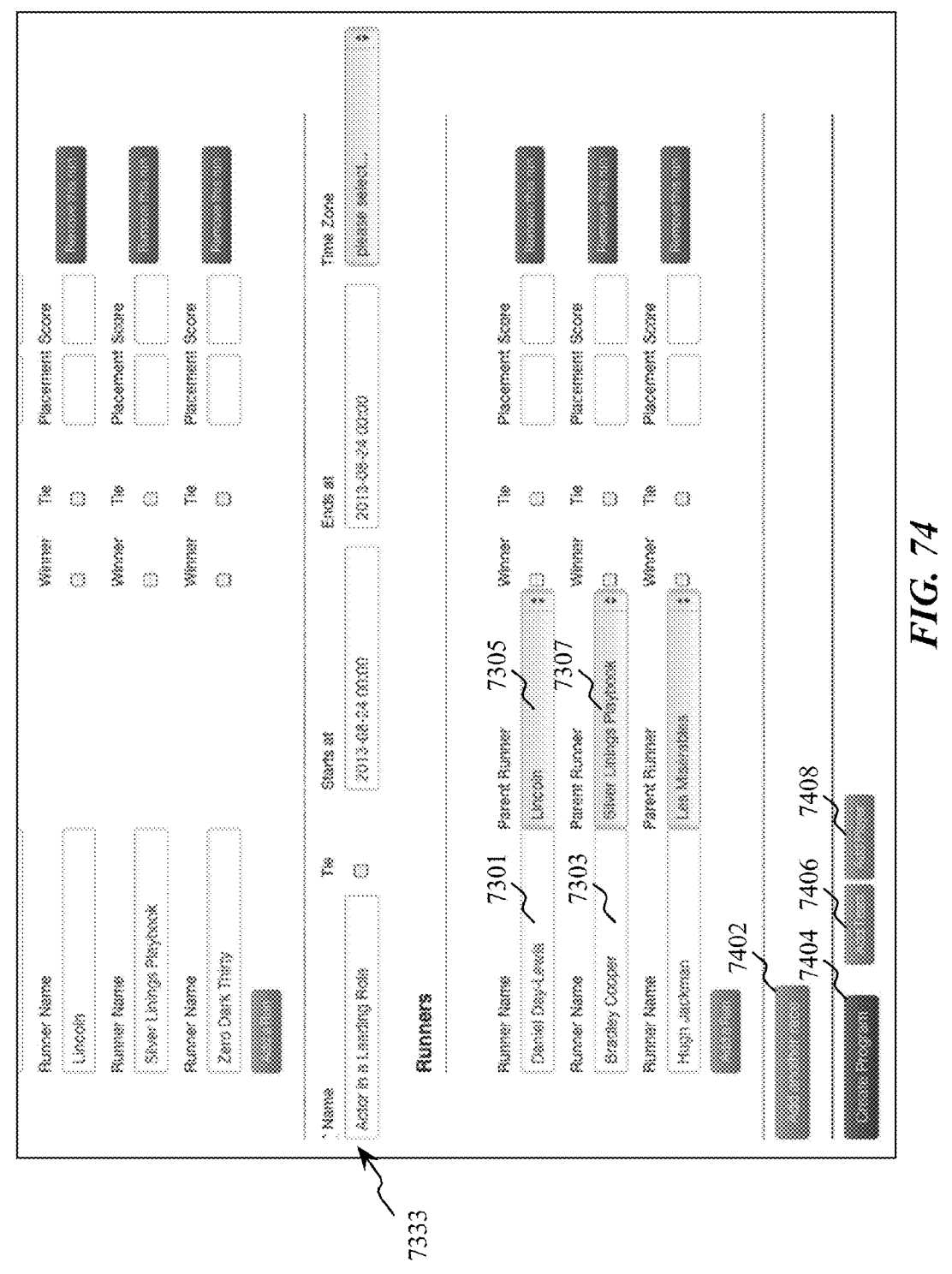

Referring now to FIG. 74, the Races section (see 7332 in FIG. 73) can allow runners to participate in more than one team. The association between a given runner 7301, 7303 and a given team 7305, 7307 for a specific race can be set explicitly. The DIY interface also allows the system administrator to Add another race 7402. The system administrator can also click on a Create Program button 7404 to create another program, an Add Team 7406 button 7406 to create a team or runners, and an Add Player button 7408 to add a player within the program.

When the system administrator clicks on the Add Team button 7406, a Create Team window, generally 7500, appears as shown in FIG. 75. With continuing reference to FIG. 75, the system administrator enters the team Name 7502, team Nationality 7504, and team Category 7506. The system administrator can enter Notes 7508 about the team, and when the team is part of a larger team (e.g., a team of screenwriters on a movie-making team), the system administrator can enter the Parent Team 7510. The system administrator may enter a string for inclusion in a Permalink 7503 address, such as a fixed URL, for distribution to players of the program.

The system administrator can also add information related to the team such as the type of team involved 7512, the context of the team 7514, and image 7516 and reference 7518 url links. The system administrator forces the system to store information entered in this screen by clicking on the Create Team button 7520. The system administrator can exit this window 7500 by clicking on the Close button 7522.

When the System administrator clicks on the Add Player button 7408, an add player window, generally 7600, appears. In this window 7600, the system administrator enters information about a player. That information includes at least (see asterisks): player Name 7602 and player Category 7604. The information can also include as applicable: the player's Gender 7606, Date of Birth 7608, Nationality 7610, Country of Birth 7612, Team 7614, Notes about the player 7616, and various Tags, such as the type of player 7618, links to player context 7620, and player image 7622 and reference 7624 urls. The system administrator may enter a string for inclusion in a Permalink 7605 address, such as a fixed URL, for distribution to players of the program. The information can be saved by clicking the Create Player button 7626, and the system administrator can exit the window 7600 by clicking on the Close button 7628.

Figure 77:
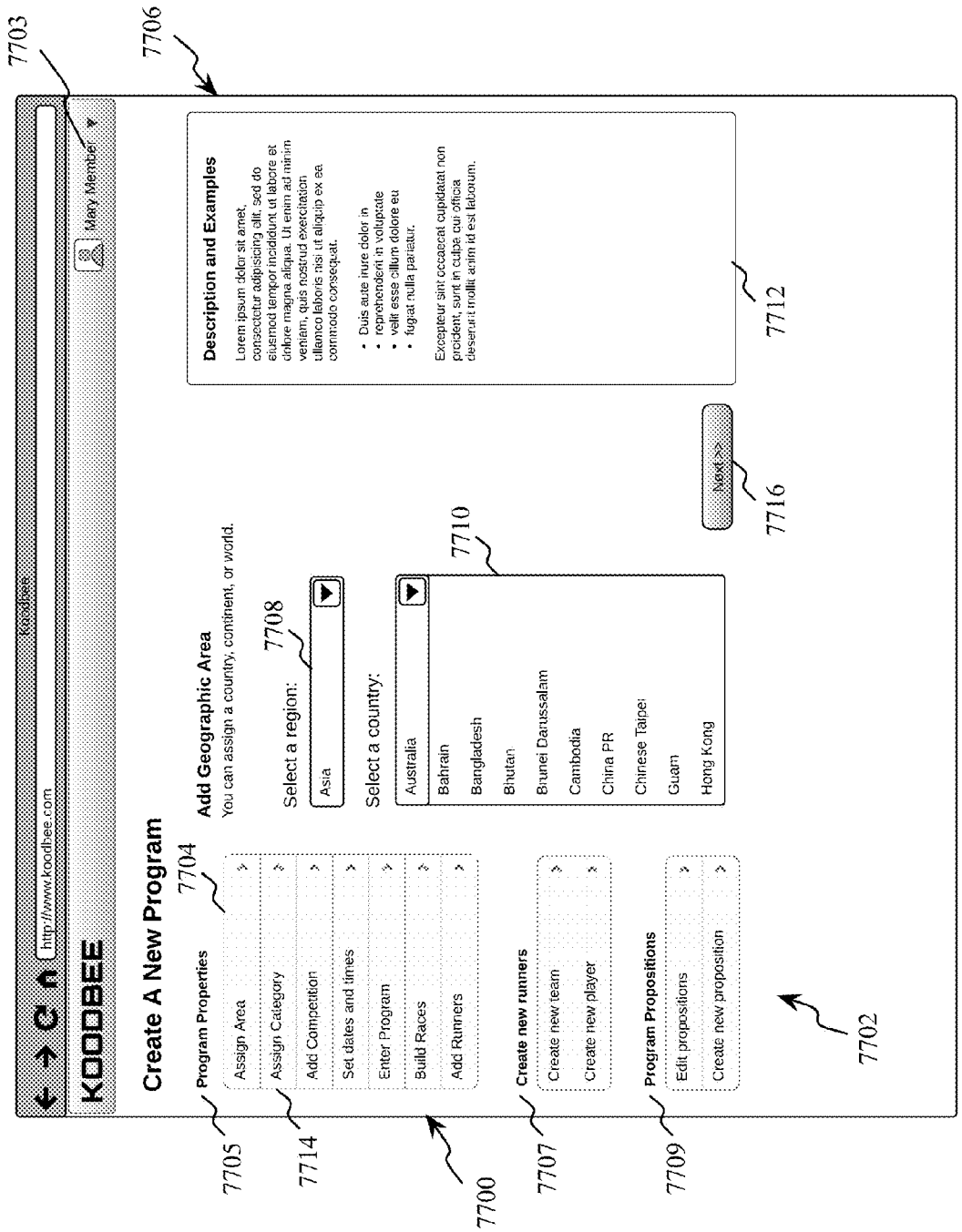
FIG. 77 is a wireframe of an End User Do-It-Yourself ("DIY") interface, which also is generated by the crowd service of FIG. 3, for an End User to assign a geographic area to an End User's prediction program to be provided by the prediction system.

With reference now to FIGS. 77-86 generally, the system can also provide a DIY interface for End Users, such as an organization that may want to establish its own prediction program. The End User must have signed in as a User of the system, and the particular End User's name is shown (e.g., 7701 in FIG. 77) on the DIY interface. Further information about the particular End User can be seen by clicking on the arrow (id.). As shown in FIGS. 77-86, all DIY screens include a Description and Examples section (e.g., 7712 in FIG. 77) providing descriptions and examples of the type of information that can be entered in the screens respectively. With reference to FIG. 77 for example, the End User must first enter information in the Program Properties section 7705 of the DIY interface before being able to enter information in the Create New Runners section 7707 and the Program Propositions section 7709.

With continuing reference to FIG. 77, the DIY interface, generally 7700, includes a listing of types of program properties and information 7702 that an End User can enter to establish a DIY program through the prediction system. When the End User clicks on the Assign Area button 7704, the Add Geographic Area screen 7706 appears. The End User can then select the geographic region 7708 and country 7710 for the competition.

Figure 78:
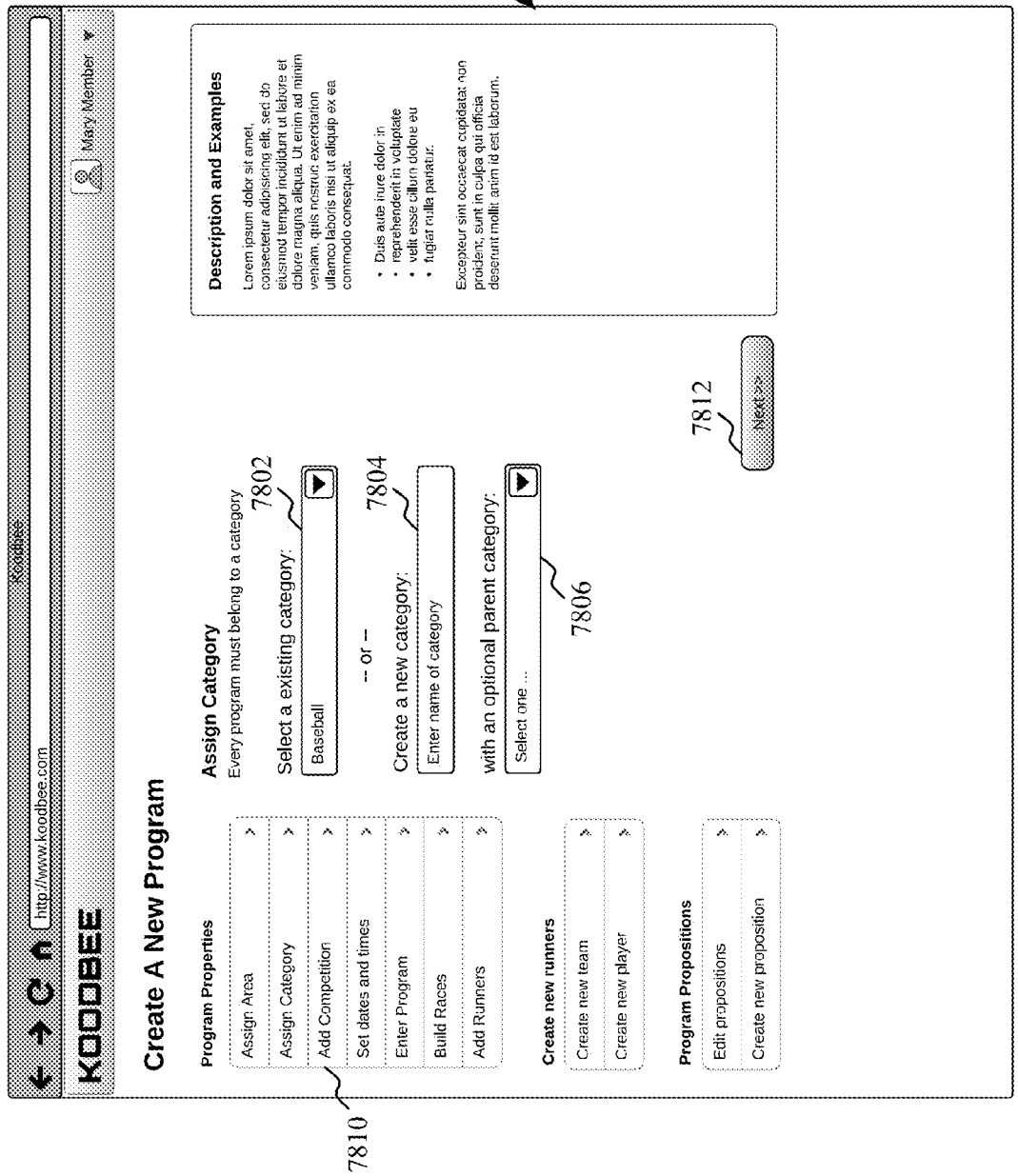
FIG. 78 is wireframe of the End User DIY interface for assigning a category to an End User's prediction program.

When the DIY interface depicts the Add Geographic Area 7706 screen as shown in FIG. 77, the End User can click on the Assign Category button 7714 or click on the Next button 7716 to display, as shown in FIG. 78, the Assign Category screen, generally 7800. With continuing reference to FIG. 78, in this screen 7800 the End User can select a category 7802 identifying the type of competition involved, or create a new custom category 7804. The End User can also identify a parent category 7806 for the competition. The End User can click on the Add Competition button 7810 or click on the Next button 7812 to display, as shown in FIG. 79, the Assign Competition screen, generally 7900.

With continuing reference to FIG. 79, in this screen 7900 the End User can select from a pre-determined list of types of competitions 7902, enter a custom type of competition 7904, identify whether the competition is recurring 7906 and, if so, how often 7908, and enter a name for the season 7910. The End User can click on the Set dates and times button 7910 or click on the Next button 7812 to display, as shown in FIG. 80, the Assign Competition screen, generally 8000.

Figure 80:
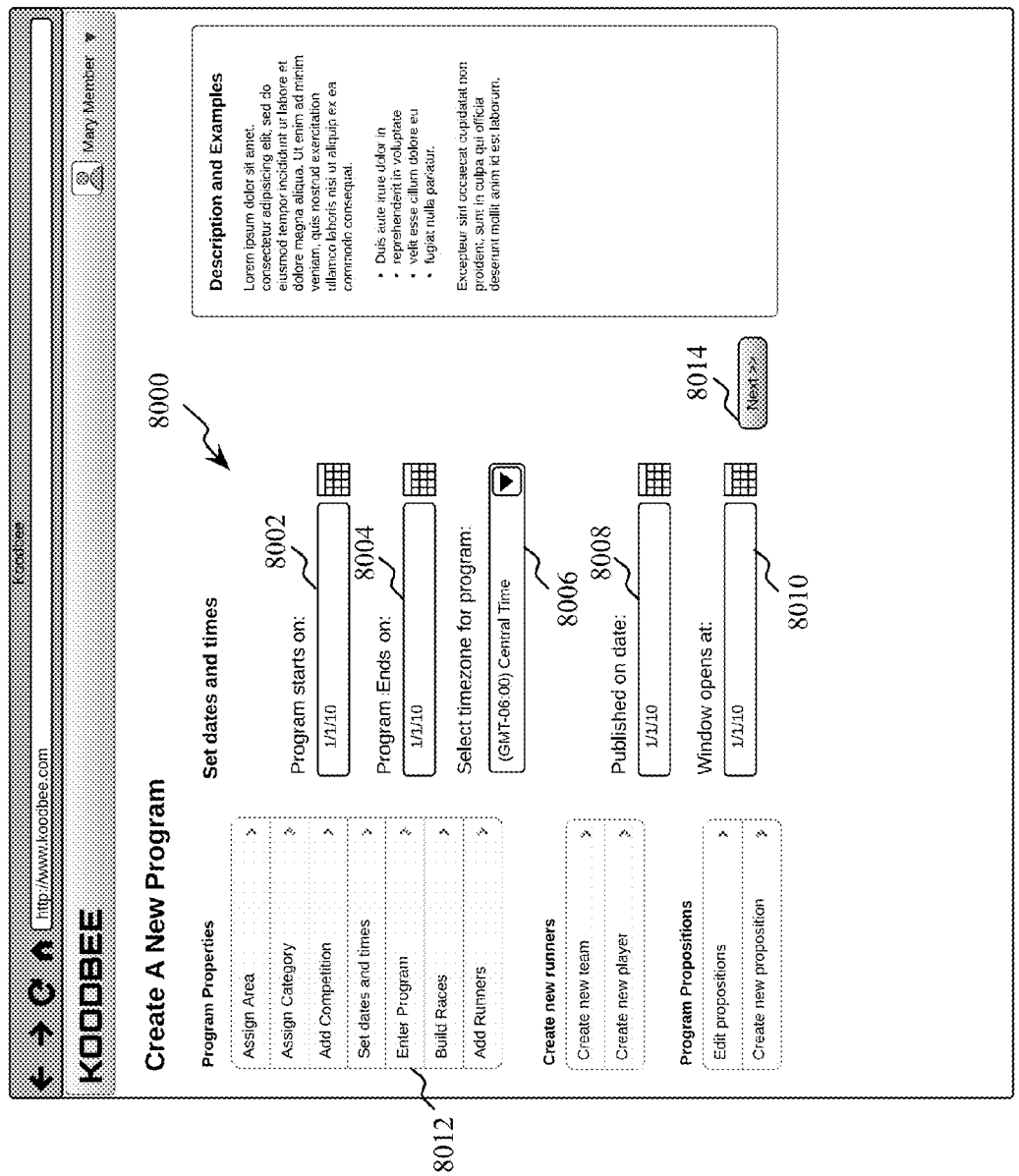
FIG. 80 is a wireframe of the End User DIY interface for setting dates and times for an End User's prediction program.

With continuing reference to FIG. 80, in this screen 8000, the End User can select the Program start date 8002, Program end date 8004, the program time zone 8006, the date the program will first be published by the prediction system 8008, and the date that players may commence making predictions for the program 8810. The End User can click on the Enter Program button 8012 or click on the Next button 8014 to display, as shown in FIG. 81, the Describe the program screen, generally 8100.

Figure 81:
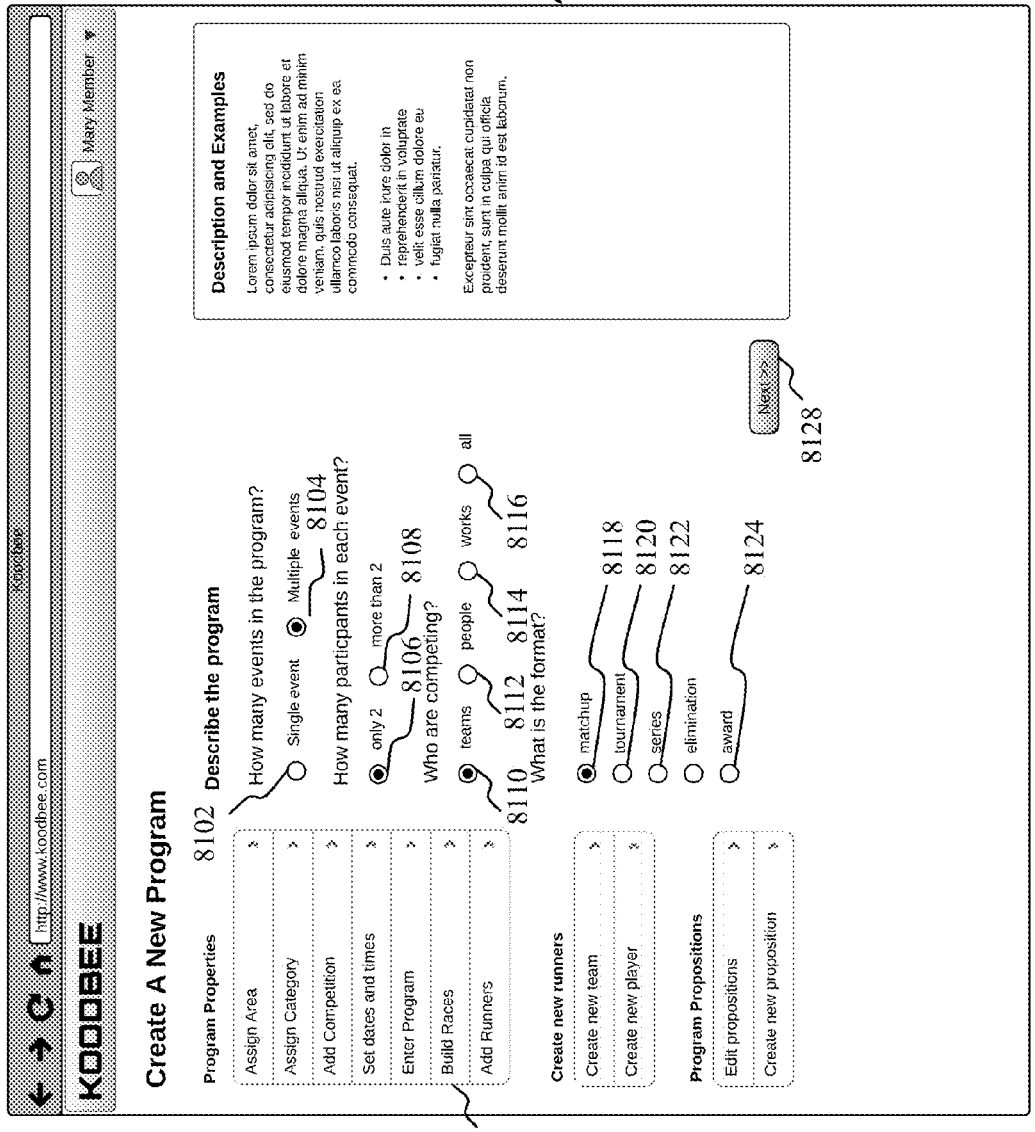
FIG. 81 is a wireframe of the End User DIY interface for entering program information for an End User's prediction program.

With continuing reference to FIG. 81, the program attributes displayed are determined, in part, by the format selection. For example, selection of the matchup radio button 8118 will generally involve two or more participants. The participant selection controls 8106, 8108 reflect this dependency. In this matchup example Describe the program screen, 8100 the End User can select whether the program includes a single 8102 or multiple 8104 events, whether each event includes two participants 8106 or more 8108, the types of competitors 8110, 8112, 8114, 8116. The End user can also change the format of each event by selecting the corresponding format radio button 8118, 8120, 8122, 8124. The End User can click on the Build Races button 8126 or click on the Next button 8128 to display differing types of race entry screens depending on, as shown in FIG. 78, the particular category 7802 and format 8118, 8120, 8122, 8124 selected by the End User. In this particular example shown in FIG. 82, the Add match-ups and teams screen, generally 8200, is displayed.

Figure 82:
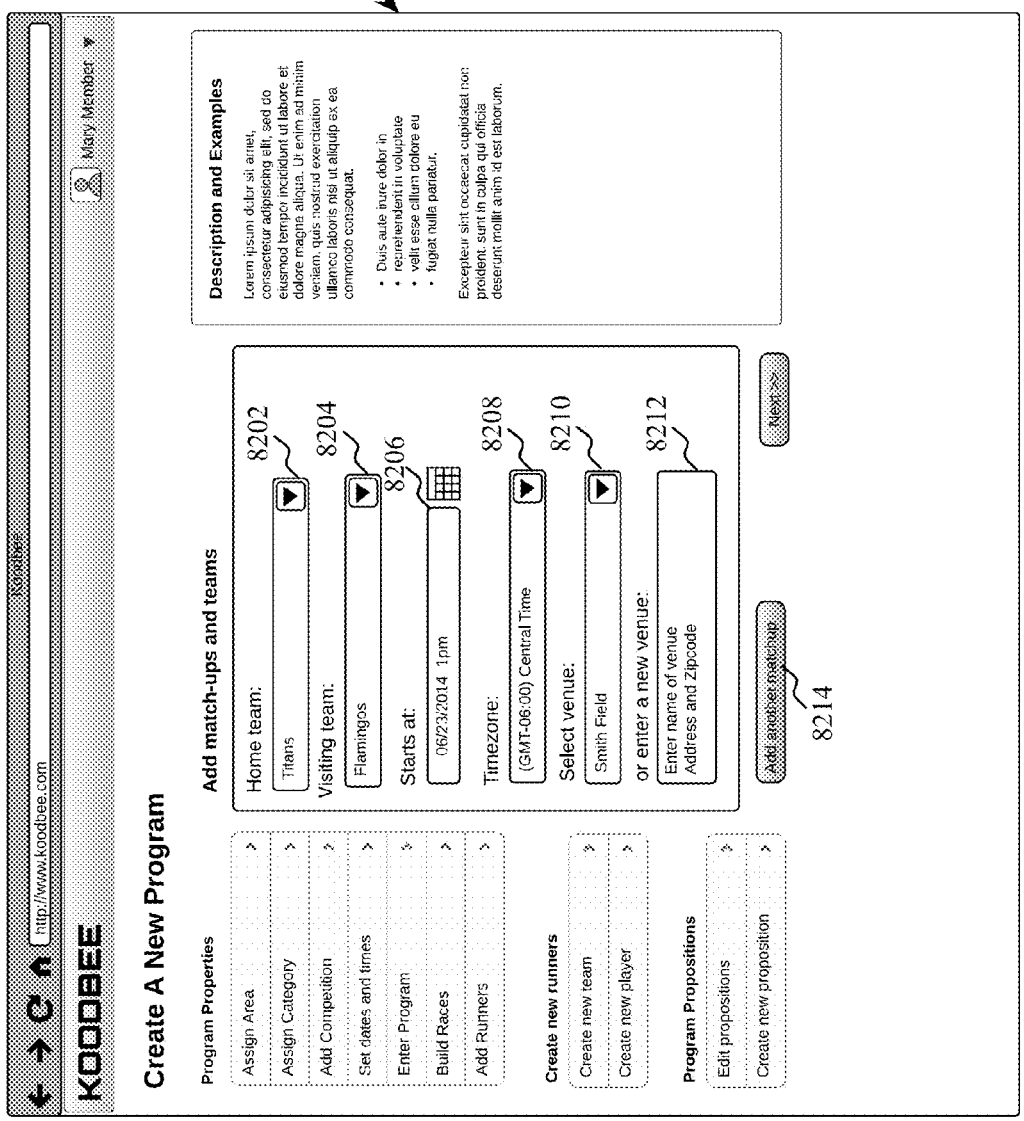
FIG. 82 is a wireframe of the End User DIY interface for building races for an End User's prediction program.

With continuing reference to FIG. 82, in this screen 8200 the End User can select the Home team 8202 and the Visiting team 8204. The End User can also select the Start date 8206 for this match-up, the Time zone 8208 for this matchup, or the Venue 8210 for the match-up. Alternatively, the End User can enter a custom venue 8212. The End User can also click the Add another match-up button 8214 to access a new screen (not shown) to add match-ups and teams.

The End User can click on the Add Runners button 8216 or click on the Next button 8218 to display differing types of runner entry screens depending on, as shown in FIG. 78, the category 7802 selected by the End User. In the particular example of FIG. 83, the Add categories and nominees screen, generally 8300, is displayed.

Figure 83:
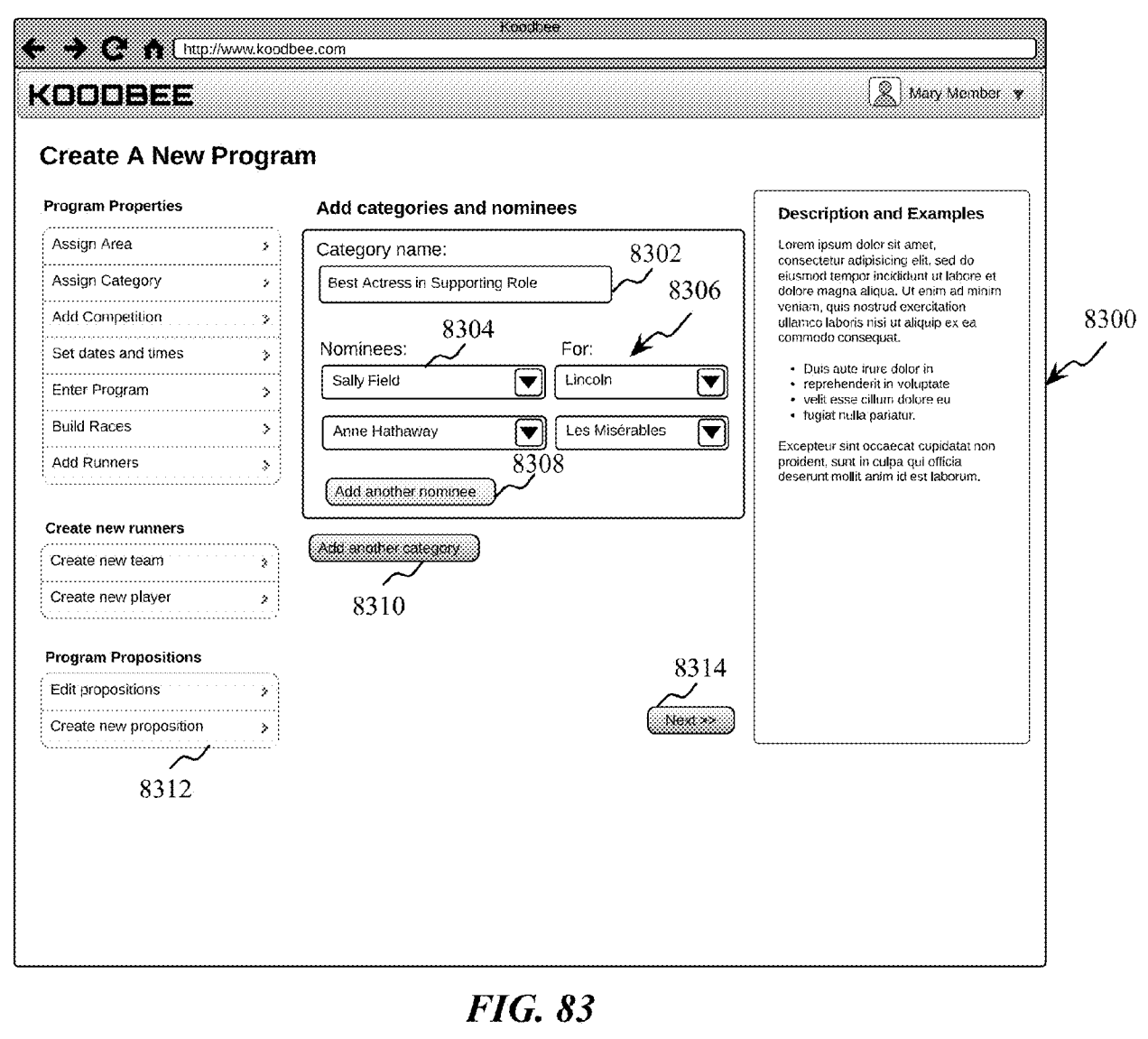

With continuing reference to FIG. 83, this screen 8300 automatically displays 8302, as shown in FIG. 78, the particular category 7802 selected by the End User. In the Add categories and nominees screen 8300, the End User can enter runners such as nominees 8304 and associate nominees with the awards 8306 for which each nominee has been nominated respectively. The End User can click the Add another nominee button 8308 to add additional nominees and associated possible awards for each additional nominee. The End User also can click on the Add another category button 8310 to display another Assign Category screen 8200 as shown in FIG. 82. In addition, the End User can click on the Create new proposition button 8312 to display differing types of create new proposition screens depending, in part, on, as shown in FIG. 78, the category 7802 selected by the End User. In this example, the particular create new proposition screen 8400 displays, as shown in FIG. 84, the Add questions and answers screen, generally 8400.

Figure 84:
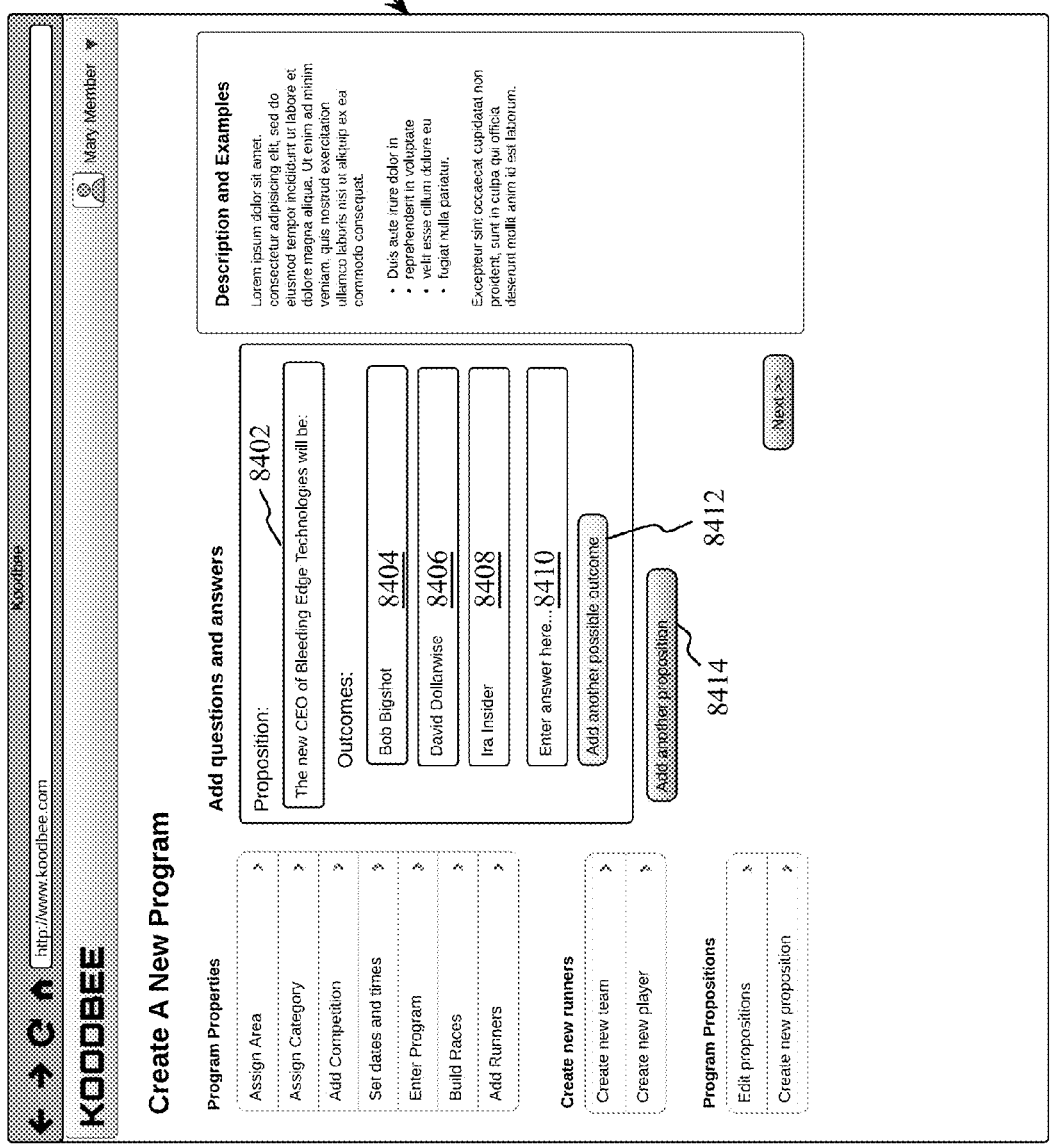
FIG. 84 is a wireframe of the End User DIY interface for creating a new proposition for an End User's prediction program.

With continuing reference to FIG. 84, in this particular example screen 8400, the End User can enter a proposition, 8402, and possible outcomes, e.g., 8404, 8406, 8408 in this example, for the proposition. The End User can click on the Add another possible outcome button 8412 to display additional outcomes edit boxes (not shown). The End User also can click on the Add another proposition button 8414 to display another Add questions and answers screen (not shown).

In addition, the End User can click on the Create new team button 8216 to display differing types of create a new team screens depending on, as shown in FIG. 78, the category 7802 selected by the End User. In the particular example of FIG. 85, the Create a new team screen, generally 8500, is displayed.

Figure 85:
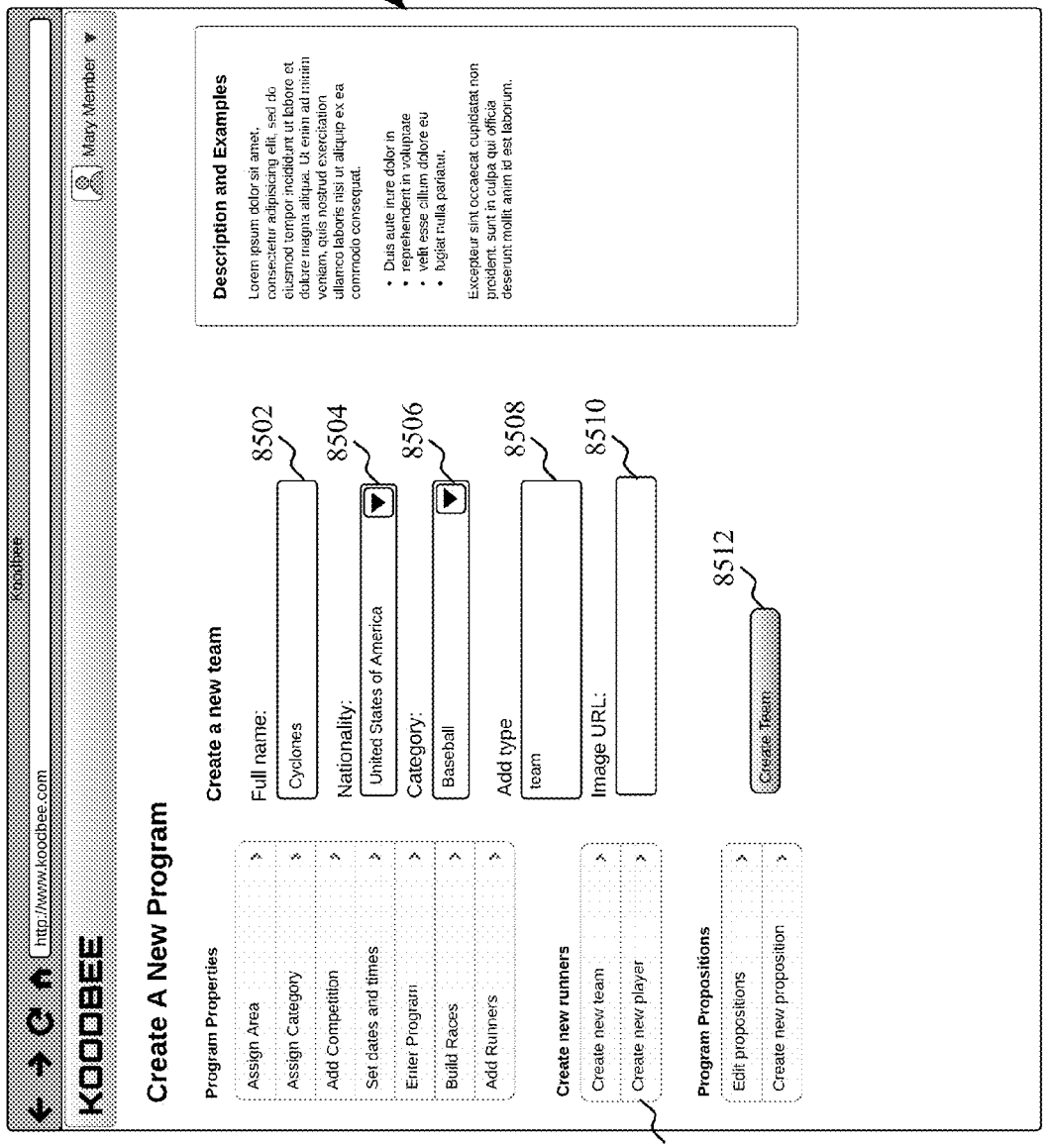
FIG. 85 is a wireframe of the End User DIY interface for creating a new team for an End User's prediction program.

With continuing reference to FIG. 85, in this screen 8500, the End User can enter a team name 8502, select the team nationality 8504 and type or category of the team 8506, enter further information about the team type 8508, and enter a URL 8510 linking to an image associated with the team. The End User can also click on the Create Team button 8512 to create another team.

In addition, the End User can click on the Create new player button 8216 to display differing types of create a new player screens depending on, as shown in FIG. 78, the category 7802 selected by the End User. In the particular example of FIG. 86, the Create a new team screen, generally 8600, is displayed.

Figure 86:
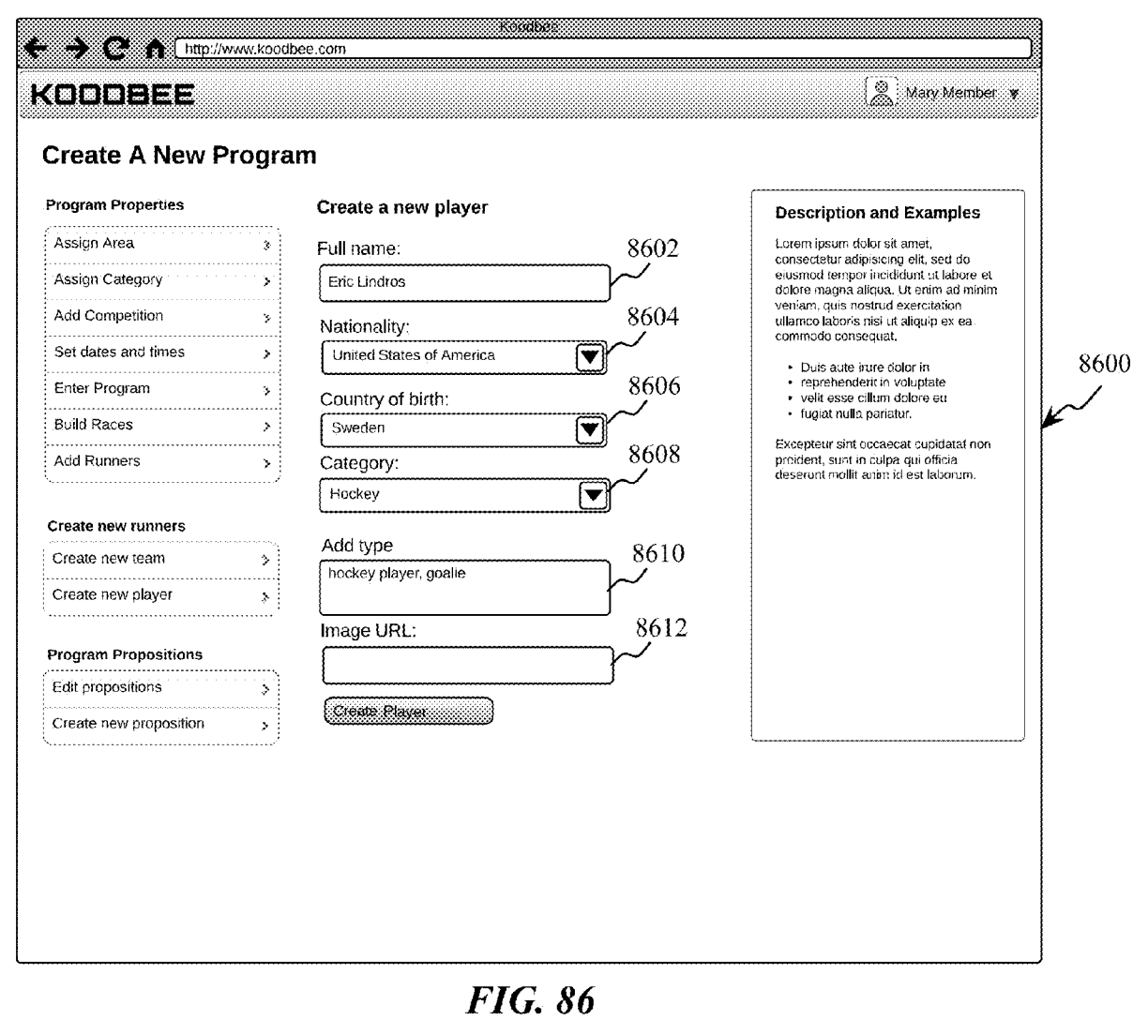

With continuing reference to FIG. 86, in this screen 8600, the End User can enter the Full name 8602 of a player, select the player's nationality 8604, country of birth 8606, and category for the type of player 8608. The End User also can enter further information about the player type 8610 and a URL link 8612 to an image associated with the player. The End User can also click the Create player button 9812 to display another create new player screen (not shown).

Through the DIY interface of FIGS. 77-86, End Users or others can establish their own custom programs, races, runners, teams, and players. For example, a company can establish its own such programs for matters of interest to the company, such as for sales predictions. A meteorology class can establish its own program for class members using differing techniques to predict weather. A fraternity system can establish a program for fraternity members to predictions about the outcome of interfraternity athetic games. A little league participant or another connected with the league, such as a league player parent for example, can establish prediction programs for the league games, season results, or league player performance.

The DIY system thus provides a wide range of opportunities for Users to establish custom private or public prediction games for custom events. The information input through the DIY interface is then processed by the system, such as described above in connection with administrator-established prediction programs and games. In this manner, DIY-established game players procure access to DIY race and runner identification screens so that the game players may then make predictions through the system. Information input through the DIY interface, such as stakes and prediction winners for example, is processed and reported also as described above. In-Game or other awards as applicable can also be provided as described above as well.

The DIY interface can be altered in many ways. For example, the interface can be altered to allow Users or other to enter many other types of information about races, runners, teams, and players. As but one example, the interface can include other links to sources of information about races or an overall program established through the DIY interface.

The foregoing is a detailed description of some embodiments and aspects of this specification and is not intended to be limiting. Many other embodiments are possible and within the skill of those in the art.

We claim:

1. An automated prediction program establishing method comprising in combination:
   providing an automated race-generating display interface over a communications network:
   automatically receiving in the automated race-generating display an end-user-entered future race and end-user-entered plurality of race runners in the future race;
   automatically receiving in the automated race-generating display at least one end-user-entered prediction-providing player; and
   automatically establishing a prediction game display interface identifying the future race, the plurality of runners, and at least one prediction-providing player.

2. The automated prediction program establishing method of claim 1 further comprising:
   automatically providing the at least one prediction-providing player access to the prediction game display interface.

3. The automated prediction program establishing method of claim 1 further comprising:
   automatically receiving in the prediction game display interface a race prediction for a prediction-providing player.

4. The automated prediction program establishing method of claim 2 further comprising:
   automatically receiving in the prediction game display interface a race prediction for a prediction-providing player.

5. The automated prediction program establishing method of claim 1 wherein the prediction game display interface further identifies a race prediction by the prediction-providing player.

6. The automated prediction program establishing method of claim 2 wherein the prediction game display interface further identifies a race prediction by the prediction-providing player.

7. The automated prediction program establishing method of claim 3 wherein the prediction game display interface further identifies a race prediction by the prediction-providing player.

8. The automated prediction program establishing method of claim 4 wherein the prediction game display interface further identifies a race prediction by the prediction-providing player.

9. The automated prediction program establishing method of claim 1 further comprising:
   automatically receiving in the automated race-generating display an end-user entered race categorization.

10. The automated prediction program establishing method of claim 8 further comprising:
    automatically receiving in the automated race-generating display an end-user entered race categorization.

11. The automated prediction program establishing method of claim 1 further comprising:
    automatically receiving in the automated race-generating display game end-user entered player stake information.

12. The automated prediction program establishing method of claim 10 further comprising:
    automatically receiving in the automated race-generating display an end-user entered game player stake information.

13. An automated prediction program establishing method comprising in combination:
    providing an automated race-generating display interface over a communications network:
    automatically receiving in the automated race-generating display an end-user-entered future race and end-user-entered plurality of race runners in the future race; and
    automatically receiving in the automated race-generating display a plurality of end-user-entered prediction-providing players.

14. The automated prediction program establishing method of claim 13 further comprising:
    automatically receiving in the automated race-generating display an end-user entered race categorization.

15. The automated prediction program establishing method of claim 13 further comprising:
    automatically receiving in the automated race-generating display end-user entered game player stake information.

16. The automated prediction program establishing method of claim 14 further comprising:
    automatically receiving in the automated race-generating display end-user entered game player stake information.

17. The automated prediction program establishing method of claim 13 further comprising:
    automatically receiving in the automated race-generating display an end-user entered identification of a team and its plurality of team members.

18. The automated prediction program establishing method of claim 13 further comprising:
    automatically receiving in the automated race-generating display an end-user entered identification of a team of a plurality of race runners.

19. The automated prediction program establishing method of claim 17 further comprising:
    automatically receiving in the automated race-generating display an end-user entered identification of a team of a plurality of race runners.

20. The automated prediction program establishing method of claim 18 further comprising:
    automatically providing in the automated race-generating display links to additional indicia about one among a race, race runner, and the or another team.

* * * * *